United States Patent
Bhattad et al.

(10) Patent No.: US 10,454,659 B2
(45) Date of Patent: Oct. 22, 2019

(54) NARROWBAND TIME-DIVISION DUPLEX FRAME STRUCTURE FOR NARROWBAND COMMUNICATIONS

(71) Applicant: QUALCOMM Incorporated, San Diego, CA (US)

(72) Inventors: Kapil Bhattad, Bangalore (IN); Xiao feng Wang, San Diego, CA (US); Alberto Rico Alvarino, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/710,748

(22) Filed: Sep. 20, 2017

(65) Prior Publication Data
US 2018/0248675 A1    Aug. 30, 2018

(30) Foreign Application Priority Data
Feb. 28, 2017    (IN) .............................. 201741007075

(51) Int. Cl.
*H04L 5/14*    (2006.01)
*H04L 5/22*    (2006.01)
(Continued)

(52) U.S. Cl.
CPC .............. *H04L 5/14* (2013.01); *H04L 1/0067* (2013.01); *H04L 1/0068* (2013.01); *H04L 1/08* (2013.01);
(Continued)

(58) Field of Classification Search
CPC ....... H04L 5/14; H04L 5/1469; H04L 5/0048; H04L 5/0053; H04L 5/0055;
(Continued)

(56) References Cited

U.S. PATENT DOCUMENTS

| 8,483,258 B2 | 7/2013 | Cho et al. |
| 9,191,326 B2 | 11/2015 | Han et al. |

(Continued)

FOREIGN PATENT DOCUMENTS

| EP | 3313015 A1 | 4/2018 |
| WO | 2016208897 A1 | 12/2016 |

OTHER PUBLICATIONS

Ericsson: "Introduction of NB-IoT," 3GPP Draft; 36211 CR0224R8_(REL-13) R1-165971, 3rd Generation Partnership Project (3GPP), Mobile Competence Centre; 650, Route Des Lucioles; F-06921 Sophia-Antipolis Cedex; France, vol. RAN WG1, no. Nanjing, China; May 22, 2016-May 26, 2016, Jun. 12, 2016, 23 pages, XP051102563, Retrieved from the Internet: URL: http://www.3gpp.org/ftp/Meetings_3GPP_SYNC/RAN/Docs/ [retrieved on Jun. 12, 2016].

(Continued)

*Primary Examiner* — Afshawn M Towfighi
(74) *Attorney, Agent, or Firm* — Nerrie M. Zohn

(57) ABSTRACT

There is a need to support narrowband TDD frame structure for narrowband communications. The present disclosure provides a solution by supporting one or more narrowband TDD frame structure(s) for narrowband communications. In an aspect of the disclosure, a method, a computer-readable medium, and an apparatus are provided. The apparatus may receive information associated with a narrowband TDD frame structure for narrowband communications. The apparatus may transmit a first symbol group of a first narrowband physical random access channel (NPRACH) preamble to a base station. In one aspect, a first length of the first symbol group may be associated with the narrowband TDD frame structure.

52 Claims, 42 Drawing Sheets

(51) Int. Cl.

| | | |
|---|---|---|
| *H04W 72/04* | (2009.01) | |
| *H04L 27/26* | (2006.01) | |
| *H04L 5/00* | (2006.01) | |
| *H04L 1/00* | (2006.01) | |
| *H04W 74/08* | (2009.01) | |
| *H04L 5/26* | (2006.01) | |
| *H04L 25/02* | (2006.01) | |
| *H04L 1/08* | (2006.01) | |

(52) U.S. Cl.
CPC .......... *H04L 5/0005* (2013.01); *H04L 5/0007* (2013.01); *H04L 5/0012* (2013.01); *H04L 5/0048* (2013.01); *H04L 5/0092* (2013.01); *H04L 5/1469* (2013.01); *H04L 5/22* (2013.01); *H04L 5/26* (2013.01); *H04L 25/02* (2013.01); *H04L 27/261* (2013.01); *H04L 27/2613* (2013.01); *H04W 72/0413* (2013.01); *H04W 72/0446* (2013.01); *H04W 72/0466* (2013.01); *H04W 74/0833* (2013.01); *H04L 5/001* (2013.01); *H04L 5/0026* (2013.01); *H04W 72/042* (2013.01); *H04W 72/0453* (2013.01)

(58) Field of Classification Search
CPC ....... H04L 1/0068; H04L 5/26; H04L 5/0007; H04L 5/0005; H04L 5/22; H04L 5/0012; H04L 27/261; H04W 72/0413; H04W 72/0466; H04W 74/0833; H04W 72/0446; H04W 72/042; H04W 72/0453
See application file for complete search history.

(56) References Cited

U.S. PATENT DOCUMENTS

| | | |
|---|---|---|
| 9,397,945 B2 | 7/2016 | Han et al. |
| 9,722,760 B2 | 8/2017 | Stern-Berkowitz et al. |
| 10,103,847 B2 | 10/2018 | Xiong et al. |
| 2003/0026223 A1 | 2/2003 | Eriksson et al. |
| 2010/0238847 A1 | 9/2010 | Suo et al. |
| 2011/0134747 A1 | 6/2011 | Kwon et al. |
| 2011/0235682 A1 | 9/2011 | He et al. |
| 2011/0255519 A1 | 10/2011 | Tamaki et al. |
| 2012/0069793 A1 | 3/2012 | Chung et al. |
| 2013/0223374 A1 | 8/2013 | Iwai et al. |
| 2014/0126517 A1 | 5/2014 | Choi et al. |
| 2015/0085795 A1 | 3/2015 | Papasakellariou et al. |
| 2015/0333880 A1 | 11/2015 | Yi et al. |
| 2016/0080986 A1 | 3/2016 | Wang et al. |
| 2016/0143038 A1 | 5/2016 | Goto et al. |
| 2016/0337103 A1 | 11/2016 | Kim et al. |
| 2017/0134199 A1* | 5/2017 | Wang ................. H04W 74/0833 |
| 2017/0171865 A1 | 6/2017 | Hwang et al. |
| 2017/0187563 A1 | 6/2017 | Shin et al. |
| 2017/0230962 A1 | 8/2017 | Park et al. |
| 2017/0273079 A1 | 9/2017 | Park et al. |
| 2018/0020360 A1 | 1/2018 | Yerramalli et al. |
| 2018/0020452 A1 | 1/2018 | Yerramalli et al. |
| 2018/0035424 A1 | 2/2018 | Sun et al. |
| 2018/0069589 A1 | 3/2018 | Liu et al. |
| 2018/0069675 A1 | 3/2018 | Chang et al. |
| 2018/0131547 A1* | 5/2018 | Wang ..................... H04W 4/70 |
| 2018/0145802 A1 | 5/2018 | Hwang et al. |
| 2018/0152271 A1 | 5/2018 | You et al. |
| 2018/0213525 A1 | 7/2018 | Nan et al. |
| 2018/0234169 A1 | 8/2018 | Sridharan et al. |
| 2018/0234951 A1 | 8/2018 | Somichetty et al. |
| 2018/0248668 A1 | 8/2018 | Hwang et al. |
| 2018/0248671 A1 | 8/2018 | Bhattad et al. |
| 2018/0248672 A1 | 8/2018 | Bhattad et al. |
| 2018/0248673 A1 | 8/2018 | Bhattad et al. |
| 2018/0248674 A1 | 8/2018 | Bhattad et al. |
| 2018/0287761 A1 | 10/2018 | You et al. |
| 2018/0332566 A1 | 11/2018 | You et al. |
| 2019/0020461 A1 | 1/2019 | Yerramalli et al. |
| 2019/0053205 A1 | 2/2019 | Tomeba et al. |
| 2019/0098659 A1* | 3/2019 | Reddy ................. H04W 74/004 |
| 2019/0159248 A1* | 5/2019 | Shin .................... H04W 74/085 |

OTHER PUBLICATIONS

Ericsson: "NB-IoT—Design Considerations for Zadoff-Chu Sequences Based NB-PRACH", 3GPP draft; R1-160094—NB-IoT—Design Considerations for Zadoff-Chu Sequences Based NB-PRACH, 3rd Generation Partnership Project (3GPP), Mobile Competence Centre; 650, Route Des Lucioles; F-06921 vol. RAN WG1, no. Budapest, HU; Jan. 18, 2016-Jan. 20, 2016, Jan. 17, 2016 (Jan. 17, 2016), pp. 1-8, XP051053414, Retrieved from the Internet: URL: http://www.3gpp.org/ftp/Meetings_3GPP_SYNC/RAN1/Docs/ [retrieved on Jan. 17, 2016].

Fujitsu: "NR Sub-carrier Spacing," 3GPP TSG RAN WG1 Meeting #85, R1-164330, May 23-27, 2016, vol. RAN WG1, no. Nanjing, China; May 23, 2016-May 27, 2016, May 13, 2016, XP051090161, 4 pages, Retrieved from the Internet: URL: http://www.3gpp.org/ftp/tsg_ran/WG1_RL1/TSGR1_85/Docs/ [retrieved on May 13, 2016].

Huawei et al., "Draft TS 36.300 Section 5 for NB-IoT", 3GPP Draft; R1-161431 Draft TS 36.300 Section 5 for Nb-IoT_V2, 3rd Generation Partnership Project (3GPP), Mobile Competence Centre, 650, Route Des Lucioles, F-06921 Sophia-Antipolis Cedex, France, vol. RAN WG1, No. St Julian's, Malta; Feb. 15, 2016-Feb. 19, 2016 Feb. 24, 2016, XP051079352, Retrieved from the Internet: URL:http://www.3gpp.org/ftp/tsg_ran/WG1_RL1/TSGR1_84/Docs/ [retrieved on Feb. 24, 2016].

Huawei et al., "Further Analysis and Evaluation for PBCH Coverage Improvement for MTC", 3GPP Draft; R1-130886, vol. RAN WG1, No. Chicago, USA; Apr. 15, 2013-Apr. 19, 2013 Apr. 6, 2013 (Apr. 6, 2013), XP050696887, URL: http://www.3gpp.org/ftp/tsg_ran/WG1_RL1/TSGR1_72b/Docs/ [retrieved on Apr. 6, 2013], 6 pages.

Huawei, et al., "TDD Support for NB-IoT in Rel-15", 3GPP draft; RP-162161, 3rd Generation Partnership Project (3GPP), Mobile Competence Centre; 650, Route Des Lucioles; F-06921 Sophia-Antipolis CEDEX; France, vol. TSG RAN, No. Vienna, Austria; Dec. 5, 2016-Dec. 8, 2016, Dec. 4, 2016 (Dec. 4, 2016), XP051183589, pp. 1-9, Retrieved from the Internet:URL:http://www.3gpp.org/ftp/Meetings_3GPP_SYNC/RAN/Docs/ [retrieved on Dec. 4, 2016].

Intel Corporation: "NB-IoT Uplink Shared Channel Design", 3GPP Draft; R1-160131—NB-PUSCH, 3rd Generation Partnership Project (3GPP), Mobile Competence Centre ; 650, Route Des Lucioles; F-06921 Sophia-Antipolis Cedex; France, vol. RAN WG1, No. Budapest, HU; Jan. 18, 2016-Jan. 20, 2016 Jan. 17, 2016, XP051053450, Retrieved from the Internet: URL:http://www.3gpp.org/ftp/Meetings_3GPP_SYNC/RAN1/Docs/ [retrieved on Jan. 17, 2016], 9 pages.

International Search Report and Written Opinion—PCT/US2018/019224—ISA/EPO—dated Jun. 4, 2018.

Mediatek Inc: "Frame Structure Design for 3.75kHz," 3GPP TSG RAN WG1 NB-IoT Ad-Hoc Meeting, R1-160163, Jan. 18-20, 2016, vol. RAN WG1, no. Budapest, HU; Jan. 18, 2016-Jan. 20, 2016, Jan. 17, 2016, XP051053482, 6 pages, Retrieved from the Internet: URL: http://www.3gpp.org/ftp/Meetings_3GPP_SYNC/RAN1/Docs/ [retrieved on Jan. 17, 2016].

Mediatek Inc: "UL Numerology and Frame Structure Design," 3GPP TSG RAN WG1 Meeting #83, R1-157370, Nov. 15-22, 2015, vol. RAN WG1, no. Anaheim, USA; Nov. 15, 2015-Nov. 22, 2015, Nov. 15, 2015, XP051003555, 4 pages, Retrieved from the Internet: URL: http://www.3gpp.org/ftp/Meetings_3GPP_SYNC/RAN1/Docs/ [retrieved on Nov. 15, 2015].

Nokia Networks: "On the TDD Support for NB-IoT," 3GPP Draft; R1-160011, 3rd Generation Partnership Project (3GPP), Mobile Competence Centre; 650, Route Des Lucioles; F-06921 Sophia-Antipolis Cedex; France, vol. Ran WG1, no. Budapest, HU; Jan. 17, 2016, XP051053334, Retrieved from the Internet: URL: http://www.3gpp.org/ftp/Meetings_3GPP_SYNC/RAN1/Docs/ [retrieved on Jan. 17, 2016].

Qualcomm Incorporated: "UL Data Channel Design", 3GPP Draft; R1-161117 UL Data Channel Design, 3rd Generation Partnership Project (3GPP), Mobile Competence Centre, 650, Route Des Lucioles,

(56) References Cited

OTHER PUBLICATIONS

F-06921 Sophia-Antipolis Cedex, France, vol. RAN WG1, No. St Julian's, Malta; Feb. 15, 2016-Feb. 19, 2016 Feb. 14, 2016, XP051064556, Retrieved from the Internet: URL:http://www.3gpp.org/ftp/tsg_ran/WG1_RL1/TSGR1_84/Docs/ [retrieved on Feb. 14, 2016], 11 pages.

Qualcomm Incorporateo: "NB-PBCH Design", 3GPP Draft; R1-160875, vol. RAN WG1, No. St Julian's, Malta; Feb. 15, 2016-Feb. 19, 2016 Feb. 14, 2016, XP051054199, URL: http://www.3gpp.org/ftp/Meetings_3GPP_SYNC/RAN1/Docs/ [retrieved on Feb. 14, 2016], 16 pages.

"16 UE Procedures Related to Narrowband IoT", 3GPP Draft; 36213_E10_S16 NB-IOT R1-1703434, 3rd Generation Partnership Project (3GPP), Mobile Competence Centre; 650, Route Des Lucioles; F-06921 Sophia-Antipolis Cedex; France, Feb. 15, 2017, XP051222020, Retrieved from the Internet: URL:http://www.3gpp.org/ftp/tsg_ran/WG1_RL1/TSGR1_88/Docs/ [retrieved on Feb. 15, 2017].

Nokia: "BS PUSCH Simulation Assumptions", 3GPP Draft; R4-164316 NB-IOT BS PUSCH Simulation Assumptions, 3rd Generation Partnership Project (3GPP), Mobile Competence Centre; 650, Route Des Lucioles; F-06921 Sophia-Antipolis Cedex; France, vol. RAN WG4, no. Nanjing, China; May 23, 2016-May 27, 2016 May 22, 2016, XP051107168, Retrieved from the Internet: URL:http://www.3gpp.org/ftp/Meetings_3GPP_SYNC/RAN4/Docs/ [retrieved on May 22, 2016], 3 pages.

Qualcomm Incorporated: "UL Data Channel Design", 3GPP Draft; R1-160107 Uplink Data Channel Design, 3rd Generation Partnership Project (3GPP), Mobile Competence Centre; 650, Route Des Lucioles; F-06921 Sophia-Antipolis Cedex; France, vol. RAN WG1, No. Budapest, HU; Jan. 18, 2016-Jan. 20, 2016 Jan. 12, 2016, XP051064720, Retrieved from the Internet: URL:http://www.3gpp.org/ftp/tsg_ran/WG1_RL1/TSGR1_AH/LTE_NB-IoT_1601/Docs/ [retrieved on Jan. 12, 2016], 5 pages.

\* cited by examiner

NARROWBAND TIME-DIVISION DUPLEX FRAME STRUCTURE FOR NARROWBAND COMMUNICATIONS

CROSS-REFERENCE TO RELATED APPLICATION

This application claims the benefit of Indian Application Serial No. 201741007075, entitled "NARROWBAND TIME-DIVISION DUPLEX FRAME STRUCTURE FOR NARROWBAND COMMUNICATIONS" and filed on Feb. 28, 2017, which is expressly incorporated by reference herein in its entirety.

BACKGROUND

Field

The present disclosure relates generally to communication systems, and more particularly, to a narrowband time-division duplex (TDD) frame structure for narrowband communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Narrowband communications involve communicating with a limited frequency bandwidth as compared to the frequency bandwidth used for LTE communications. One example of narrowband communication is narrowband (NB) IoT (NB-IoT) communication, which is limited to a single resource block (RB) of system bandwidth, e.g., 180 kHz. Another example of narrowband communication is enhanced machine-type communication (eMTC), which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. There is a need to support narrowband TDD frame structure for narrowband communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. Another example of narrowband communication is eMTC, which is limited to six RBs of system bandwidth, e.g., 1.08 MHz.

NB-IoT communication and eMTC may reduce device complexity, enable multi-year battery life, and provide deeper coverage to reach challenging locations such as deep inside buildings. However, because the coverage provided by narrowband communications may include reaching challenging locations (e.g., a smart gas meter located in the basement of a building) there is an increased chance that one or more transmissions will not be properly received. Consequently, narrowband communications may include a predetermined number of repeated transmissions to increase the chance of having the transmission properly decoded. There is a need to support narrowband TDD frame structure for narrowband communications.

The present disclosure provides a solution by supporting one or more narrowband TDD frame structure(s) for narrowband communications. In an aspect of the disclosure, a method, a computer-readable medium, and an apparatus are provided. The apparatus may determine a narrowband TDD frame structure for narrowband communications. The apparatus may also determine a PUSCH format of a group of PUSCH formats for allocating at least one resource unit (RU) to a UE for a narrowband physical uplink control channel (NPUCCH). In addition, the apparatus may allocate the at least one RU to the UE using the determined physical uplink shared channel (PUSCH) format, the RU including multiple subcarriers in each of one or more slots.

In addition, the apparatus may determine a narrowband TDD frame structure including at least a predetermined number of contiguous uplink subframes. The apparatus may also determine a first number of symbols in each of a second number of slots to use in allocating at least one RU to a user equipment (UE) for a narrowband PUSCH (NPUSCH). In one aspect, the first number of symbols and the second number of slots may be based on the predetermined number of contiguous uplink subframes. The apparatus may allocate the at least one RU to the UE.

In a further aspect, the apparatus may receive information associated with a narrowband TDD frame structure having a first set of contiguous uplink subframes. In one aspect, the first set of contiguous uplink subframes may include a first number of slots. The apparatus may also transmit a first portion of an uplink transmission using at least a portion of the first number of slots in the first set of contiguous uplink subframes, wherein the uplink transmission has a duration longer than the first set of contiguous uplink subframes.

In one aspect, the apparatus may receive information associated with a narrowband TDD frame structure. The apparatus may also transmit an uplink transmission a predetermined number of times using a first scrambling sequence. In one aspect, the first scrambling sequence may include a first number of least significant bits (LSBs) associated with a first radio frame. In another aspect, the first number of LSBs may be larger than a second number of LSBs used in a second scrambling sequence associated with a narrowband frequency-division duplex (FDD) uplink transmission.

In a further aspect, the apparatus may receive information associated with a narrowband TDD frame structure for narrowband communications. In addition, the apparatus may determine to repeat an uplink transmission in a first set of radio frames and a second set of radio frames. The apparatus may determine not to monitor downlink subframes in the first set of radio frames and the second set of radio frames. The apparatus may also perform one or more of a timing estimation or a frequency estimation using at least one downlink subframe in one or more of the first set of radio frames or the second set of radio frames.

In another aspect, the apparatus may receive information associated with a narrowband TDD frame structure for narrowband communications. In addition, the apparatus may transmit a narrowband sounding reference signal (NB-SRS) to a base station using the narrowband TDD frame structure.

In one aspect, the apparatus may receive information associated with a narrowband TDD frame structure for narrowband communications, the narrowband TDD frame structure including a set of contiguous uplink subframes. The apparatus may also determine an orthogonal sequence length associated with a reference signal (RS) based on at least one of a number of uplink subframes or a number of slots in the set of contiguous uplink subframes. In addition, the apparatus may transmit the RS using the determined orthogonal sequence length.

In a further aspect, the apparatus may receive information associated with a narrowband TDD frame structure for narrowband communications. The apparatus may also determine a sequence hopping pattern associated with a RS based on at least one of a number of uplink subframes, a number of slots in the set of contiguous uplink subframes, or a radio frame number. In addition, the apparatus may transmit the RS using the determined sequence hopping pattern.

In another aspect, the apparatus may receive information associated with a narrowband TDD frame structure for narrowband communications. The apparatus may transmit a first symbol group of a first narrowband physical random access channel (NPRACH) preamble to a base station. In one aspect, a first length of the first symbol group may be associated with the narrowband TDD frame structure.

In one aspect, the apparatus may receive information associated with a narrowband TDD frame structure for narrowband communications. In another aspect, the apparatus may determine a maximum number of symbol groups in a plurality of symbol groups associated with a NPRACH preamble that fit in an uplink occasion in the narrowband TDD frame structure. In a further aspect, the apparatus may transmit a first subset of the plurality of symbol groups associated with the NPRACH preamble in a first uplink occasion in the narrowband TDD frame structure and a second subset of the plurality of symbol groups associated with the NPRACH preamble in a second uplink occasion in the narrowband TDD frame structure. In one aspect, the first subset may include the maximum number of symbol groups. In another aspect, the second subset may include any remaining symbol groups in the plurality of symbol groups or the maximum number of symbol groups.

In another aspect, the apparatus receive information associated with a narrowband TDD frame structure for narrowband communications. The apparatus may also determine a first number of symbol groups of a NPRACH preamble to transmit in a first uplink occasion in the narrowband TDD frame structure. In one aspect, the first number of symbol groups may include either two symbol groups or three symbol groups.

In a further aspect, the apparatus may receive information associated with a narrowband TDD frame structure for narrowband communications. In addition, the apparatus may determine a hopping pattern associated with two pairs of symbol groups of a NPRACH transmitted in one or more uplink occasions using the narrowband TDD frame structure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
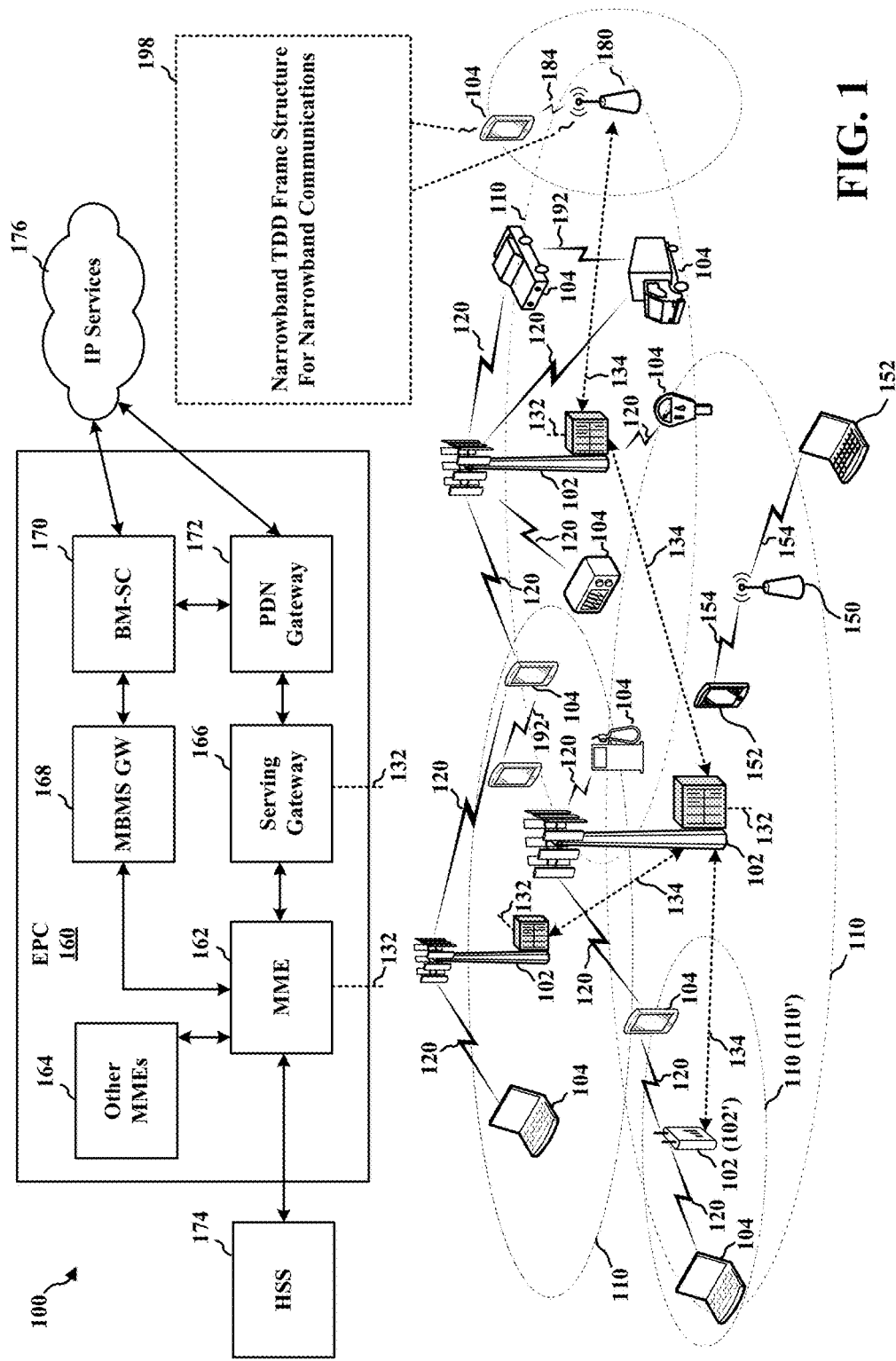
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, an eNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/UE 104 may be configured to support one or more narrowband TDD frame structure(s) for narrowband communications (198), e.g., as described below in connection to any of FIGS. 4A-36.

Figure 2:
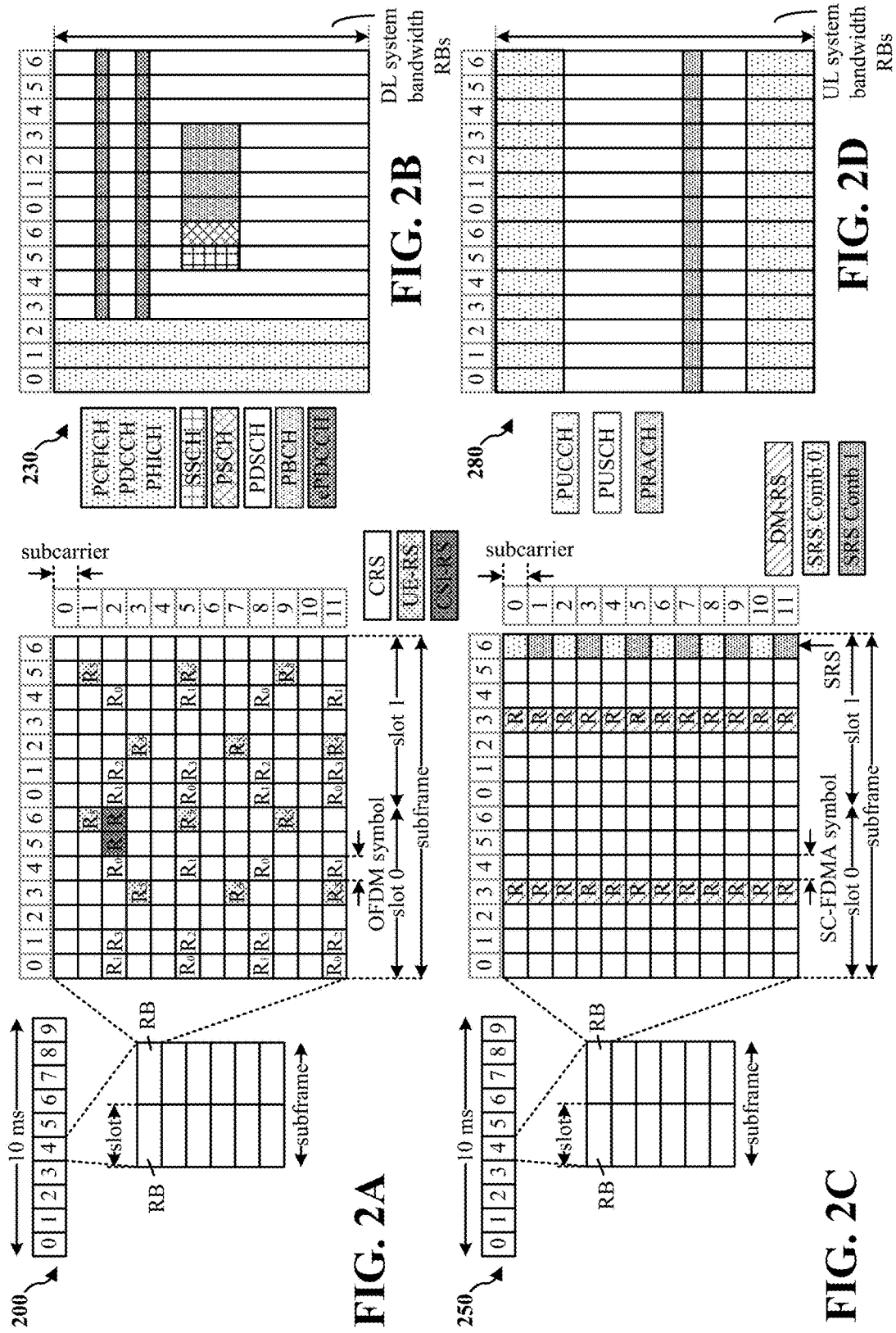
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a PSS that is used by a UE to determine subframe timing and a physical layer identity. The secondary synchronization channel (SSCH) is within symbol 5 of slot 0 within subframes 0 and 5 of a frame, and carries an SSS that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
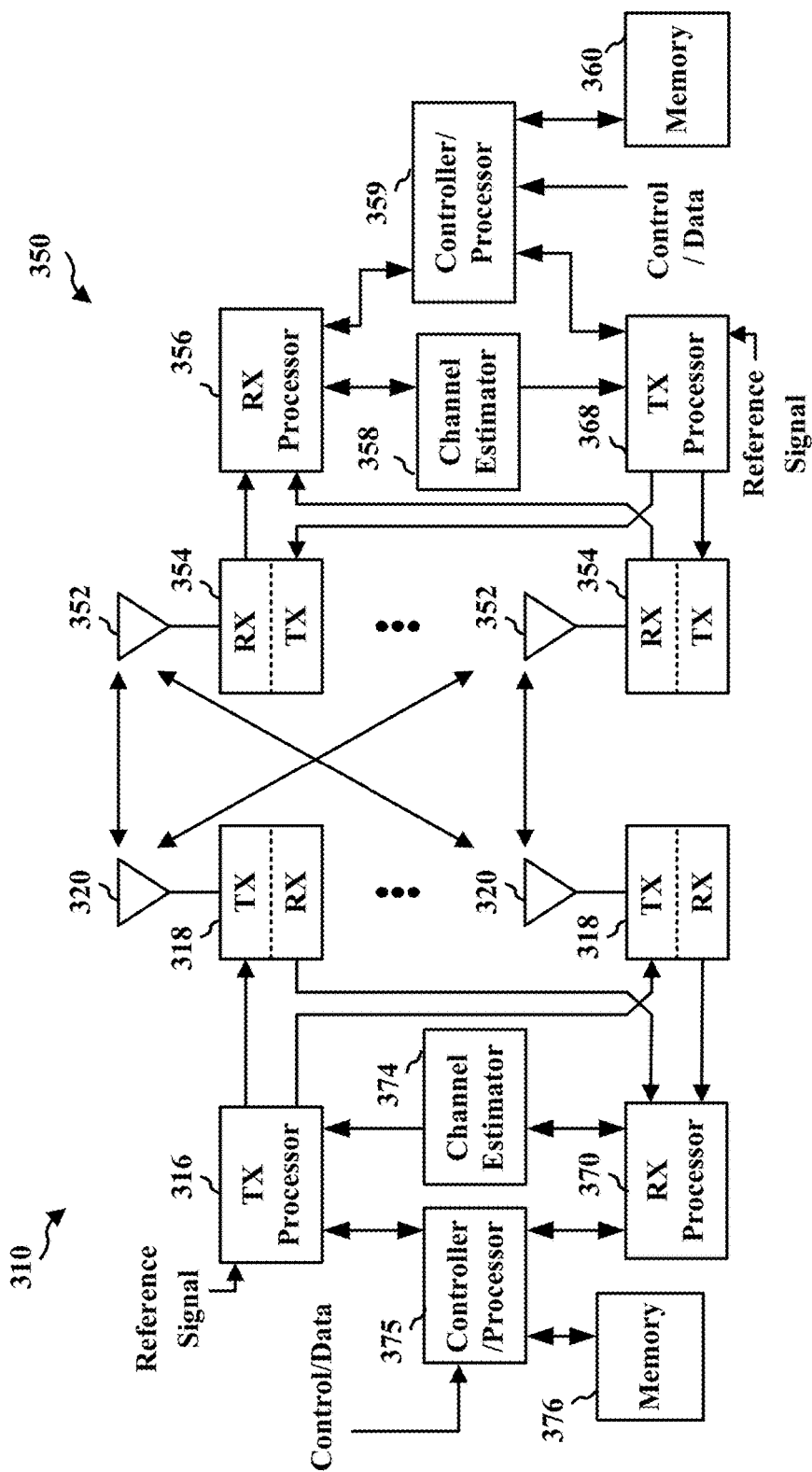
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Narrowband communications involve communicating with a limited frequency bandwidth as compared to the frequency bandwidth used for LTE communications. One example of narrowband communication is NB-IoT communication, which is limited to a single RB of system bandwidth, e.g., 180 kHz. Another example of narrowband communication is eMTC, which is limited to six RBs of system bandwidth.

NB-IoT communication and eMTC may reduce device complexity, enable multi-year battery life, and provide deeper coverage to reach challenging locations such as deep inside buildings. However, because the coverage provided by narrowband communications may include reaching challenging locations (e.g., a smart gas meter located in the basement of a building) there is an increased chance that one or more transmissions will not be properly received. Consequently, narrowband communications may include a predetermined number of repeated transmissions to increase the chance of having the transmission properly decoded. There is a need to support narrowband TDD frame structure for narrowband communications.

The present disclosure provides a solution by supporting NPDCCH, NPDSCH, NPUCCH, and/or NPUSCH transmissions that use a narrowband TDD frame structure.

Figure 4A:
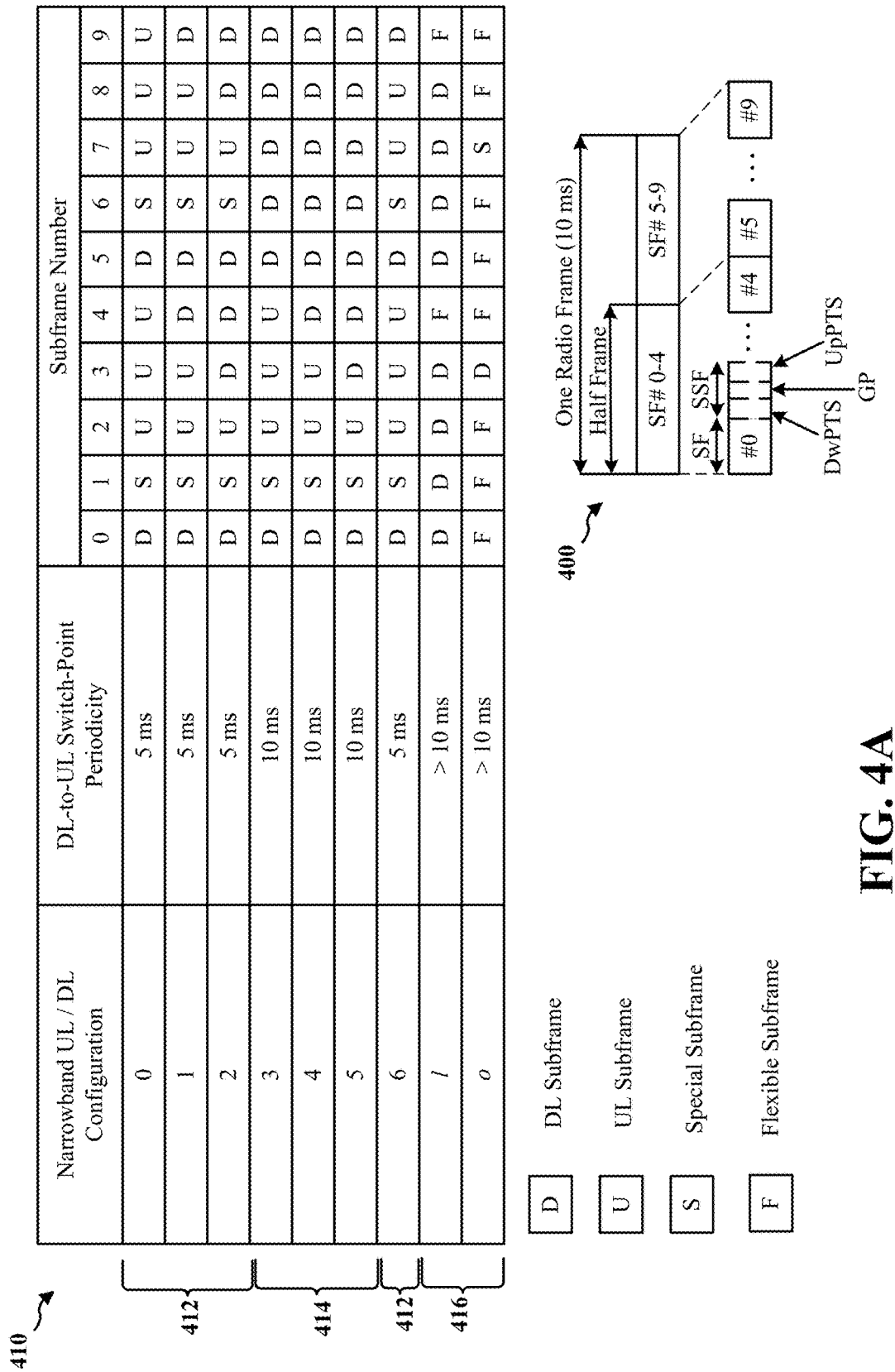
FIG. 4A is a diagram illustrating example narrowband TDD frame structures in accordance with certain aspects of the disclosure.

FIG. 4A is a diagram illustrating a narrowband TDD frame structure 400 that may be used for narrowband communications in accordance with certain aspects of the disclosure. In an aspect, the narrowband TDD frame structure 400 may be determined from the group of narrowband TDD frame structures (e.g., configuration 0-configuration o) listed in table 410. For example, a base station may determine the narrowband TDD frame structure based on higher layer signaling (e.g., RRC messaging) received from the network. Additionally and/or alternatively, the base station may determine the narrowband TDD frame structure based on channel conditions.

In one aspect, the narrowband TDD frame structure 400 may include a 10 ms frame split into two half frames, each 5 ms long. The half-frames may be further split into five subframes, each 1 ms long. The narrowband TDD frame structure 400 may include any one of the narrowband configurations listed in table 410.

Switching periodicity refers to the time a UE may need to switch between monitoring a downlink subframe (e.g., for downlink transmissions from a base station) and sending a transmission using an uplink subframe, or vice versa. Depending on the determined narrowband TDD frame structure 400, the switching periodicity may be 5 ms, 10 ms, or more than 10 ms (e.g., 20 ms). For narrowband TDD frame structures 412 with a 5 ms switching periodicity, a special subframe (SSF) may exist in both half frames of the narrowband TDD frame structure 400. For narrowband TDD frame structures 414 with a 10 ms switching periodicity, the special subframe may exist in the first half frame but not in the second half frame. For narrowband TDD frame structures 416 with more than a 10 ms switching periodicity, special subframes may only be present when switching from DL to UL, and hence may not be present on all frames. In the narrowband TDD frame structures 412, 414 that include a special subframe (e.g., configurations 0, 1, 2, 3, 4, 5, and 6), subframes 0 and 5 as well as the Downlink Pilot Time Slot (DwPTS) in the special subframe may be reserved for downlink transmissions. Additionally and/or alternatively, in the narrowband TDD frame structures 412, 414 that include a special subframe, the Uplink Pilot Time Slot (UpPTS) in the special subframe and the subframe immediately following the special subframe may be reserved for the uplink transmission.

When operating in in-band mode and/or guard-band mode, the narrowband TDD frame structure 400 may reuse certain LTE TDD frame structures (e.g., see configurations 0, 1, 2, 3, 4, 5, 6 in FIG. 4A). Additionally and/or alternatively, some subframes in the narrowband TDD frame structure 400 may be marked as flexible subframes (e.g., see configuration l and o in FIG. 4A) and may be used as either a downlink subframe or an uplink subframe by a UE depending on the current grant received from the base station.

In certain aspects, a subset of the narrowband TDD configurations listed in table 410 in FIG. 4A may be used to support narrowband communications. For example, configuration 0 may not be suitable for narrowband communications because configuration 0 only has two downlink subframes. In one configuration, narrowband communications that use a narrowband TDD frame structure may only be supported in in-band mode and/or guard-band mode (e.g., but not standalone mode). In another configuration, narrowband communications that use a narrowband TDD frame structure may support in-band mode, guard-band mode, and standalone mode.

In addition, multiple narrowband downlink carriers and multiple narrowband uplink carriers may be used to enhance narrowband communication between a base station and a UE. Among the carriers, a narrowband anchor carrier may be used to provide synchronization, system information, paging, data and control for multi-carrier enabled UEs. Thereby, narrowband system information overhead may be reduced. For instance, synchronization and paging for a certain cell may not be provided on all narrowband carriers. Narrowband carriers that do not provide synchronization and/or paging may be referred to narrowband non-anchor carriers. Coordination between base stations for selecting anchor carriers that mitigate interference and for transmit power control for non-anchor carriers provide further network performance advantages.

Figure 4B:
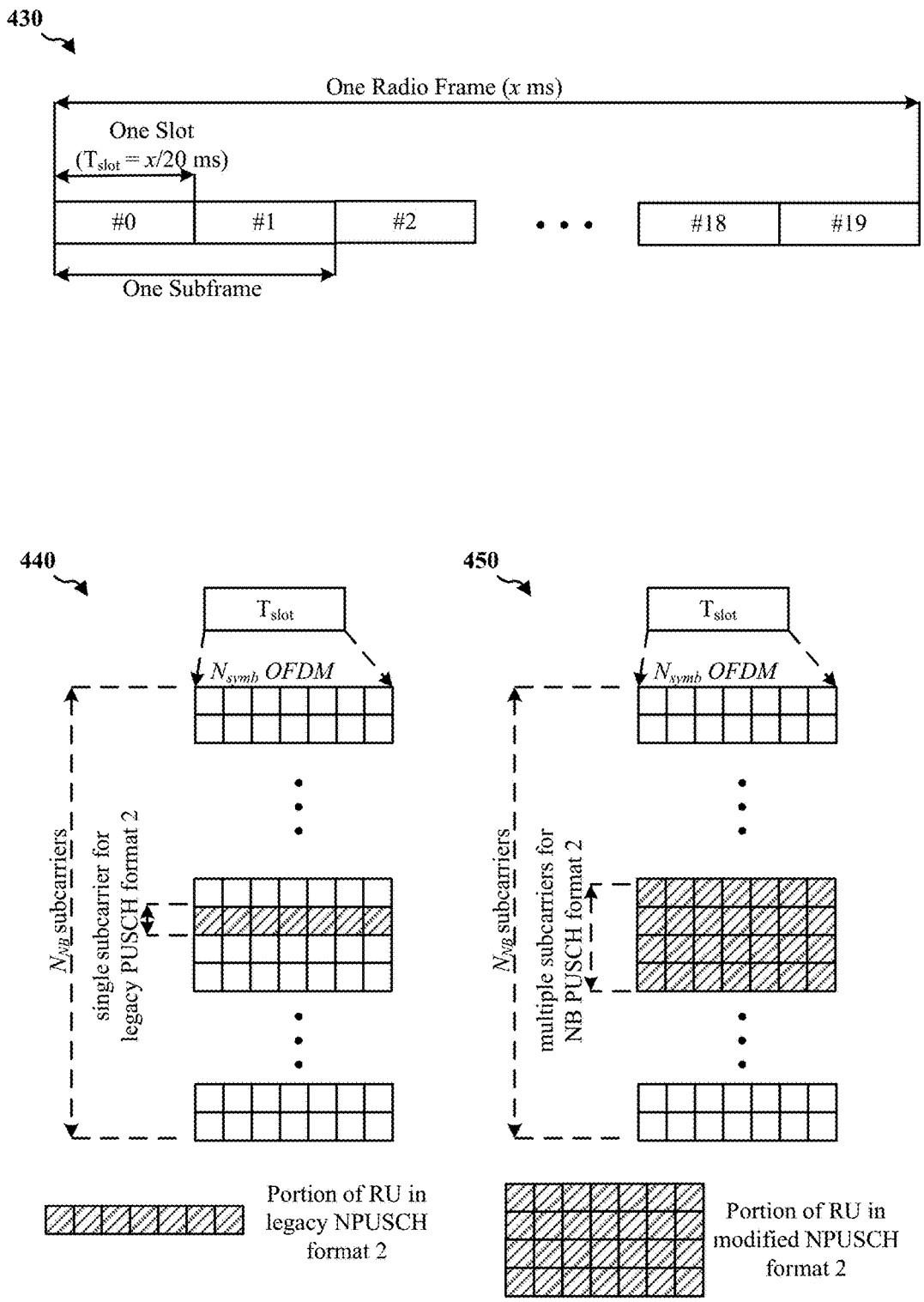
FIG. 4B is a diagram illustrating example narrowband PUSCH formats in accordance with certain aspects of the disclosure.

FIG. 4B is a diagram illustrating a radio frame 430 that may be used for narrowband communications in accordance with certain aspects of the disclosure.

Figure 4C:
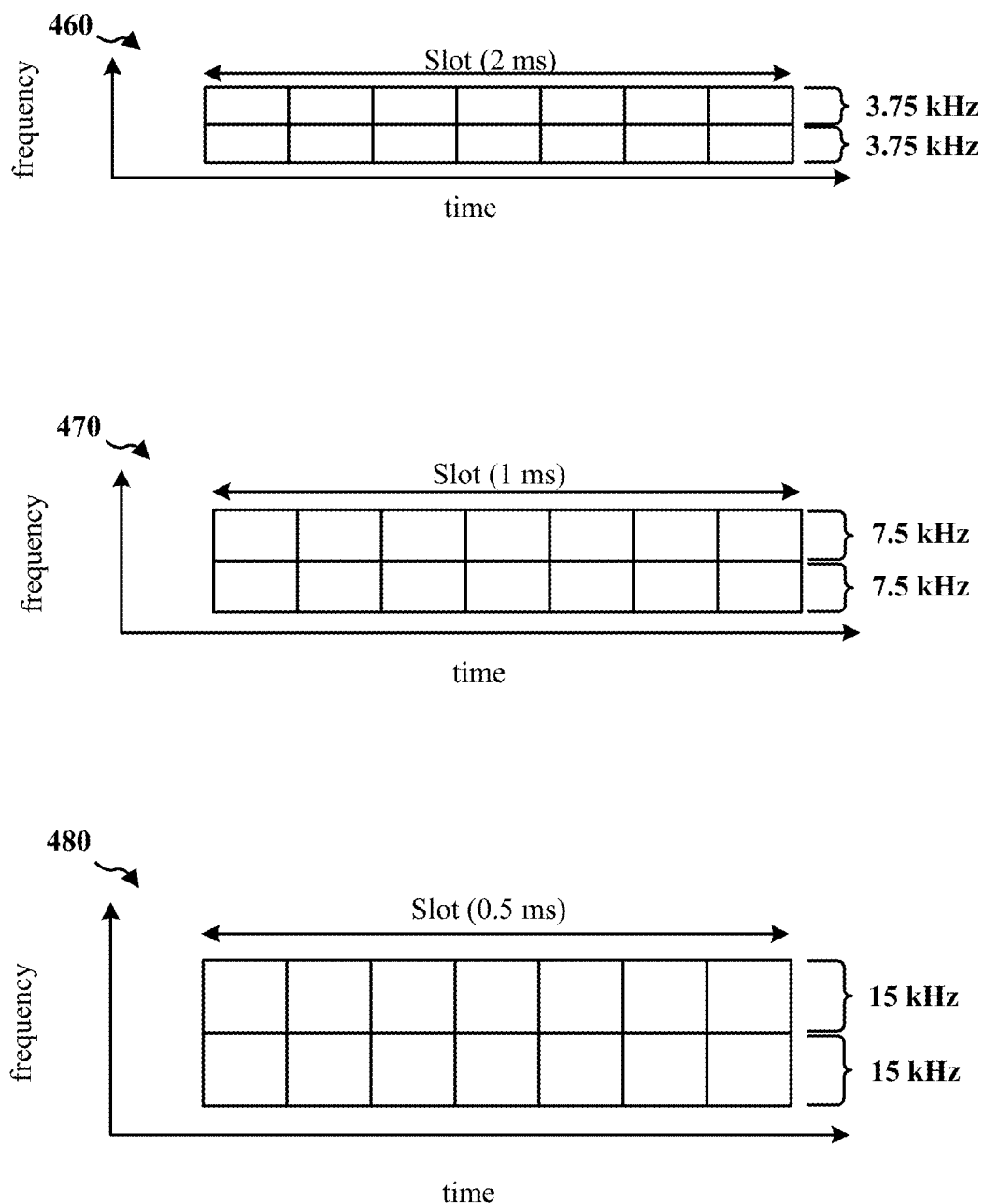
FIG. 4C is a diagram illustrating example narrowband subcarrier frequency spacing in accordance with certain aspects of the disclosure.

FIG. 4C is a diagram illustrating a 10 ms frame with a 15 kHz subcarrier spacing 480, a 20 ms frame with a 7.5 kHz subcarrier spacing 470, and a 40 ms frame with a 3.75 kHz spacing 460 in accordance with certain aspects of the disclosure.

Referring to FIGS. 4B and 4C, the radio frame 430 may include a 10 ms frame, a 20 ms frame, or a 40 ms frame depending on the subcarrier spacing. For example, a 10 ms frame may have a 15 kHz subcarrier spacing (e.g., see item 480 in FIG. 4C). In addition, a 20 ms frame may have a 7.5 kHz subcarrier spacing (see, item 470 in FIG. 4C). Further, a 40 ms frame may have a 3.75 kHz spacing (see, item 460 in FIG. 4C).

In certain configurations, the radio frame 430 may be split into 10 subframes that are each made up of 2 slots. Each of the slots may be x/20 ms in length depending on whether the frame is a 10 ms frame, a 20 ms frame, or a 40 ms frame.

In one aspect, x may be equal to the length of the frame (e.g., 10 ms, 20 ms, or 40 ms). In other words, each slot in a 10 ms frame (e.g., 15 kHz subcarrier spacing) may be 0.5 ms in duration, each slot in a 20 ms frame (e.g., 7.5 kHz subcarrier spacing) may be 1 ms in duration, and each slot in a 40 ms frame (e.g., 3.75 kHz subcarrier spacing) may be 2 ms in duration.

Referring to FIG. 4B, each slot may be divided into NNB number of subcarriers that each have the same subcarrier spacing (e.g., 3.75 kHz, 7.5 kHz, or 15 kHz) and $N_{symb}$ of orthogonal frequency division multiplex (OFDM) symbols (e.g., 7 OFDM symbols).

Various NPUSCH formats may be used by a base station to allocate resources for one or more uplink transmissions from a UE. For example, a base station may use NPUSCH format 1 to allocate resources for uplink data transmissions (e.g., NPUSCH). When resources for an acknowledgement (e.g., NPUCCH or ACK/NACK) to a downlink transmission are allocated to a UE, NPUSCH format 2 may be used. For example, when a base station transmits an NPDCCH, NPUSCH format 2 may be used to allocate resources for an ACK/NACK response from a UE. The smallest unit a base station may use to map a transport block (TB) for either an NPUSCH, NPUCCH, and/or ACK/NACK may be a resource unit (RU).

For legacy NPUSCH format 2 (e.g. in FDD NB-IoT systems), the RU may be composed of a single subcarrier with a length of 4 slots. Consequently, for 3.75 kHz subcarrier spacing the RU has an 8 ms duration and for 15 kHz subcarrier spacing the RU has a 2 ms duration. An example of a legacy NPUSCH format 2 with an RU allocated in a single subcarrier is illustrated in slot structure 440 in FIG. 4B.

Certain narrowband TDD frame structures may include only a few uplink subframes (e.g., see configuration 5 in FIG. 4A which has only one uplink subframe). When configuration 5 is used for the narrowband TDD frame structure a UE may send the uplink transmission in one uplink subframe (e.g., 2 slots) in a first radio frame and in another uplink subframe (e.g., 2 slots) in a second radio frame even in good signal-to-noise ratio (SNR) scenarios. Uplink transmissions that are transmitted over different radio frames may experience a change in channel conditions, and the base station may not be able to properly decode an uplink transmission sent over different radio frames. In addition, sending uplink transmissions over different radio frames may also introduce a large delay in decoding the channel. There is a need to modify the legacy NPUSCH format 2 such that an uplink transmission received over different radio frame in a narrowband TDD frame structure may be properly decoded by a base station.

To increase the chance of proper decoding at the base station, the present disclosure provides a modified NPUSCH format 2 structure may be used to allocate an RU in multiple subcarriers across multiple slots as illustrated in slot structure 450 in FIG. 4B. Although 4 subcarriers are illustrated in FIG. 4B as being allocated for the RU, any number of 2 or more subcarriers may be used for allocating the RU without departing from the scope of the present disclosure.

By increasing the number of carriers that are used for allocating an RU, the base station may have an increased chance of properly decoding an uplink transmission sent over different radio frames because more resource elements in each slot may be used to carry the uplink transmission and/or the RU may be allocated in one or two slots due to the increased number of resource elements allocated across multiple subcarriers, and hence, in some cases, avoid splitting the uplink transmission into discontinuous parts (e.g. spanning multiple radio frames).

Resource Units

Figure 5A:
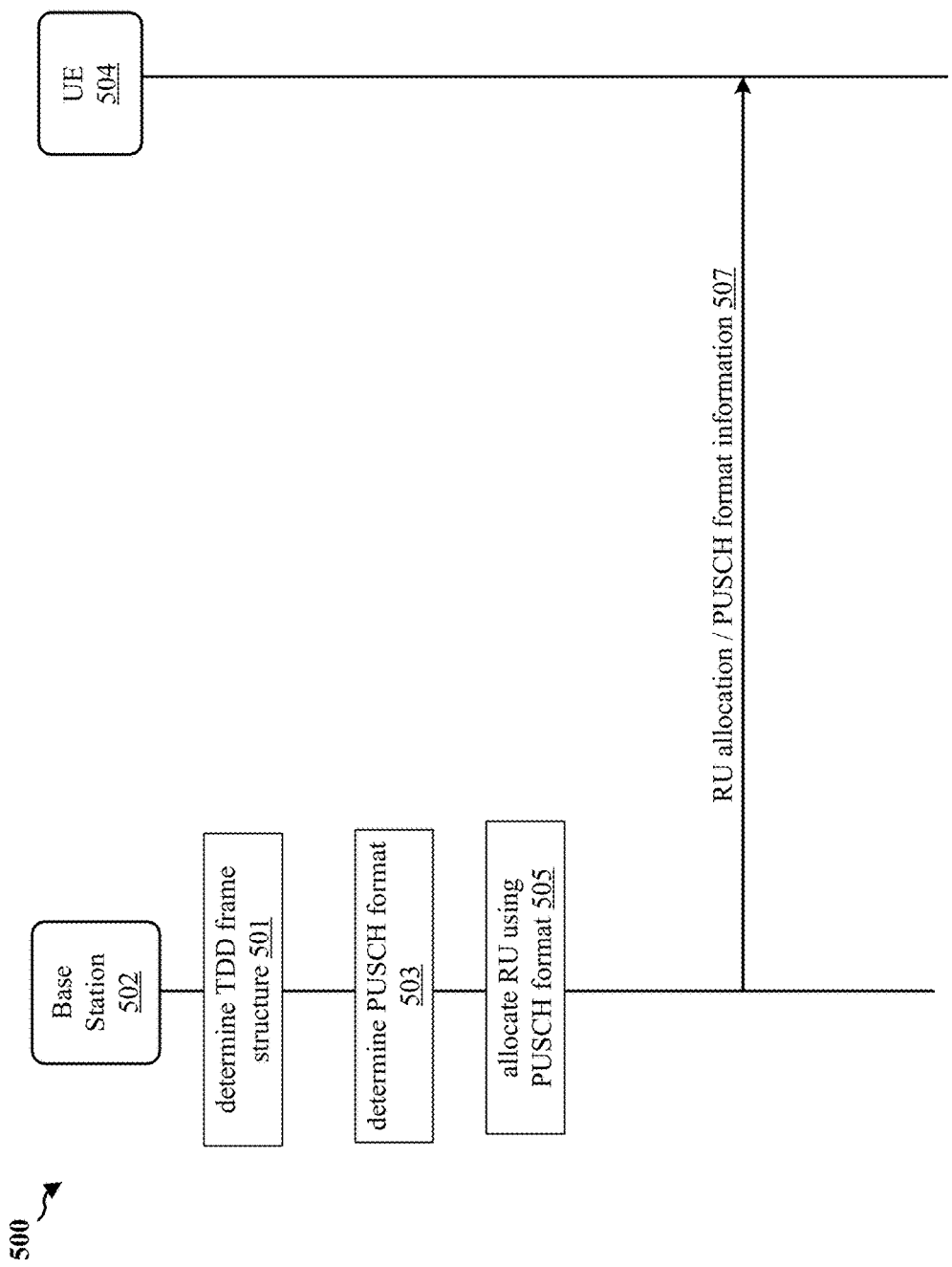
FIG. 5A illustrates a data flow for a narrowband communication system(s) that may support narrowband communications using narrowband TDD frame structures in accordance with certain aspects of the disclosure.

FIG. 5A illustrates a data flow 500 for base station 502 to allocate one or more RUs to UE 504 for an uplink transmission (e.g., NPUCCH and/or ACK/NACK) in accordance with certain aspects of the disclosure. Base station 502 may correspond to, e.g., base station 102, 180, 602, 702, 802, 902, 1002, 1102, 1202, 1302, 1402, 3150, 3350, 3550, eNB 310, the apparatus 1702/1702'. UE 504 may correspond to, e.g., UE 104, 350, 604, 704, 804, 904, 1004, 1104, 1204, 1304, 1404, the apparatus 2902/2902', 3102/3102', 3302/3302', 3502/3502'. In addition, the base station 502 and the UE 504 may be configured to communicate using narrowband communications (e.g., NB-IoT and/or eMTC). For example, the UE 504 may be an NB-IoT device and/or an eMTC device.

In one aspect, base station 502 may determine 501 a narrowband TDD frame structure for narrowband communications. For example, the base station 502 may determine 501 the narrowband TDD frame structure is one of configuration 0, 1, 2, 3, 4, 5, 6, 1, or o from table 410 in FIG. 4A.

In addition, base station 502 may determine 503 a PUSCH format (e.g., NPUSCH format 2 or modified PUSCH format 2) to allocate at least one RU to UE 504 for an NPUCCH (e.g., ACK/NACK). For example, base station 502 may determine to use modified NPUSCH format 2 (e.g., see 450 in FIG. 4B) to allocate one or more RUs to UE 504 for an NPUCCH across one or more subcarriers in one or more slots. In certain configurations, the determining the PUSCH format may be based on a number of uplink subframes in the narrowband TDD frame structure. In certain other configurations, a number of the one or more subcarriers in each of one or more slots may correspond to a number of uplink subframes in the narrowband TDD frame structure. In certain other configurations, a number of the one or more subcarriers in each of one or more slots may correspond to a maximum transmission delay or round trip timeline. In certain other configurations, a number of the one or more subcarriers in each of one or more slots may correspond to a number of RU used to transmit the determined PUSCH format in a predetermined number of slots.

In another aspect, base station 502 may allocate 505 the at least one RU to the UE 504 using the determined PUSCH format. In one aspect, the RU may include one or more subcarriers in each of one or more slots. In another aspect, each of the multiple subcarriers may have an associated subcarrier frequency spacing of 3.75 kHz, 5 kHz, 7.5 kHz, or 15 kHz. For example, base station 502 may allocate one or more subcarriers in one or more slots (e.g., four slots) to the UE 504 for an NPUCCH. If the subcarrier spacing of the narrowband TDD frame structure is 3.75 kHz, base station 502 may allocate one or more RUs in either a single slot or in two slots. In certain configurations, the associated subcarrier frequency spacing may correspond to a slot duration.

In addition, base station 502 may transmit information 507 indicating the NPUSCH format and the RUs allocated to the UE 504 for the NPUCCH. For example, the information 507 may indicate whether NPUSCH format 2 or modified PUSCH format 2 is used to allocate RU(s). The information may indicate how many subcarriers the RU(s) occupy when NPUSCH format 2 is the determined PUSCH format. In one aspect, the information 507 may be sent in DCI.

Figure 5B:
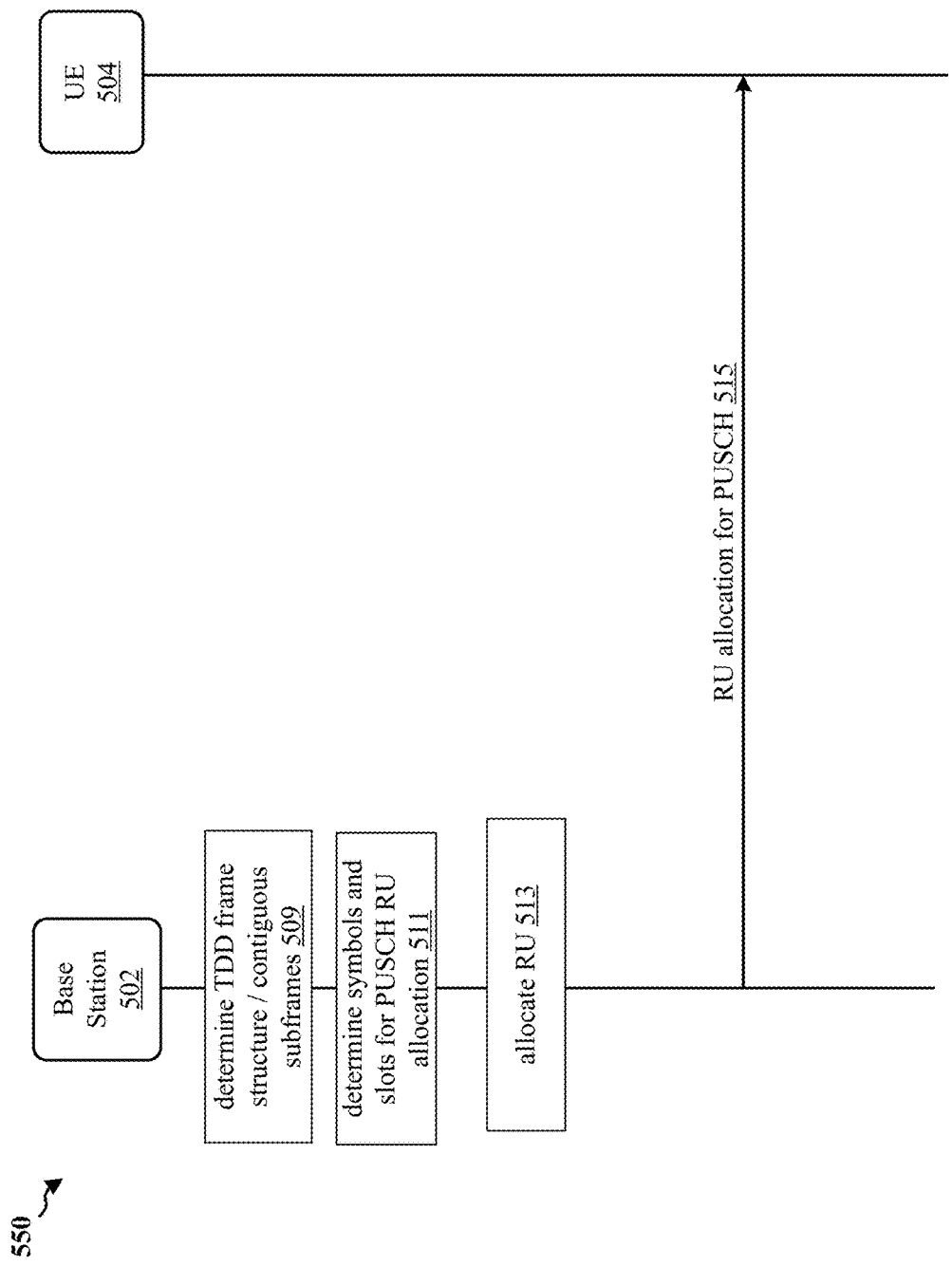
FIG. 5B illustrates a data flow for a narrowband communication system(s) that may support narrowband communications using narrowband TDD frame structures in accordance with certain aspects of the disclosure.

FIG. 5B illustrates a data flow 550 for base station 502 to allocate one or more RUs to UE 504 for an uplink transmission (e.g., NPUSCH) in accordance with certain aspects of the disclosure. Base station 502 may correspond to, e.g., base station 102, 180, 602, 702, 802, 902, 1002, 1102, 1202, 1302, 1402, 3150, 3350, 3550, eNB 310, the apparatus 1702/1702'. UE 504 may correspond to, e.g., UE 104, 350, 604, 704, 804, 904, 1004, 1104, 1204, 1304, 1404, the apparatus 2902/2902', 3102/3102', 3302/3302', 3502/3502'. In addition, the base station 502 and the UE 504 may be configured to communicate using narrowband communications (e.g., NB-IoT and/or eMTC). For example, the UE 504 may be an NB-IoT device and/or an eMTC device.

In one aspect, base station 502 may determine 509 a narrowband TDD frame structure including at least a predetermined number of contiguous uplink subframes. In one aspect, the predetermined number of subframes may include three contiguous uplink subframes each 1 ms in length (e.g., 15 kHz subcarrier spacing). For example, the base station 502 may determine 509 the narrowband TDD frame structure is one of configuration 0 or 6 from table 410 in FIG. 4A when the predetermined number of contiguous uplink subframes is three contiguous uplink subframes. In another aspect, the predetermined number of contiguous uplink subframes may include two contiguous uplink subframes or more than three contiguous uplink subframes.

In another aspect, base station 502 may determine 511 a first number of symbols in each of a second number of slots to use in allocating at least one RU to UE 504 for an NPUSCH. In one aspect, the first number of symbols and the second number of slots may be based on the predetermined number of contiguous uplink subframes. In another aspect, each slot in the second number of slots may have an associated subcarrier frequency spacing of 3.75 kHz, 5 kHz, 7.5 kHz, or 15 kHz. In a further aspect, the subcarrier frequency spacing may be a function of the configuration used for the narrowband TDD subframe structure. In certain configurations, the second number of slots may include 6 slots. In certain other configurations, the second number of slots may include 10 slots.

Legacy RU allocation may be in units of 2 slots (e.g., one uplink subframe), 4 slots (two uplink subframes), 8 slots (e.g., four uplink subframes), and/or 16 slots (e.g., eight uplink subframes). Each slot may have 7 OFDM symbols. When an RU is allocated in a narrowband TDD frame structure across 3 contiguous uplink subframes (e.g., 6 slots) with a 3 ms duration (e.g., 15 kHz subcarrier spacing), using legacy RU allocation units may leave resources unused. For example, an 4 slot legacy RU allocation may be used for a TDD configuration with a duration of 6 contiguous UL slots. Allocating 4 slots for an RU with a duration of 6 slots resources may leave the resources in fifth and sixth slots of the available UL slots unused.

In a first configuration, when configurations 0 or 3 are used as the narrowband TDD frame structure, 3 contiguous uplink subframes with a 3 ms duration are located in each radio frame. In other words, 6 uplink slots may be available in each radio frame for uplink transmission(s). Thus, RU allocation may include 6 slots (e.g., each with 7 OFDM symbols), which may use the available uplink resources in each radio frame more efficiently than by using legacy RU allocation units.

In a second configuration, when configuration 6 is used as the narrowband TDD frame structure, 3 contiguous subframes (e.g., 6 slots) are located in the first half frame of a radio frame and 2 contiguous uplink subframes (e.g., 4 slots) are located in the second half frame of the radio frame. In other words, 10 uplink slots may be available in each radio frame for uplink transmission(s). Thus, RU allocation may include 10 slots (e.g., each with 7 OFDM symbols), which may use the available uplink resources in each radio frame more efficiently than by using legacy RU allocation units.

In a third configuration, when uplink subframes with a 3.75 kHz subcarrier spacing are used for RU allocation, RU allocation units may include more or fewer than 16 slots (e.g., each with 7 OFDM symbols). An RU allocation of more or fewer than 16 slots may use the available uplink resources in each radio frame more efficiently than by using legacy RU allocation units.

In a further aspect, base station 502 may allocate 513 the at least one RU to the UE 504. In one aspect, the RU may include a single subcarrier or multiple subcarriers in each of one or more slots. In another aspect, each of the multiple subcarriers may have an associated subcarrier frequency spacing of 3.75 kHz, 5 kHz, 7.5 kHz, or 15 kHz. For example, base station 502 may allocate two or more subcarriers in six slots to the UE 504 for a NPUSCH.

In addition, base station 502 may transmit information 515 indicating the RUs allocated to the UE 504 for the NPUSCH. For example, the information 515 may be sent in DCI.

Uplink Transmissions

Figure 6:
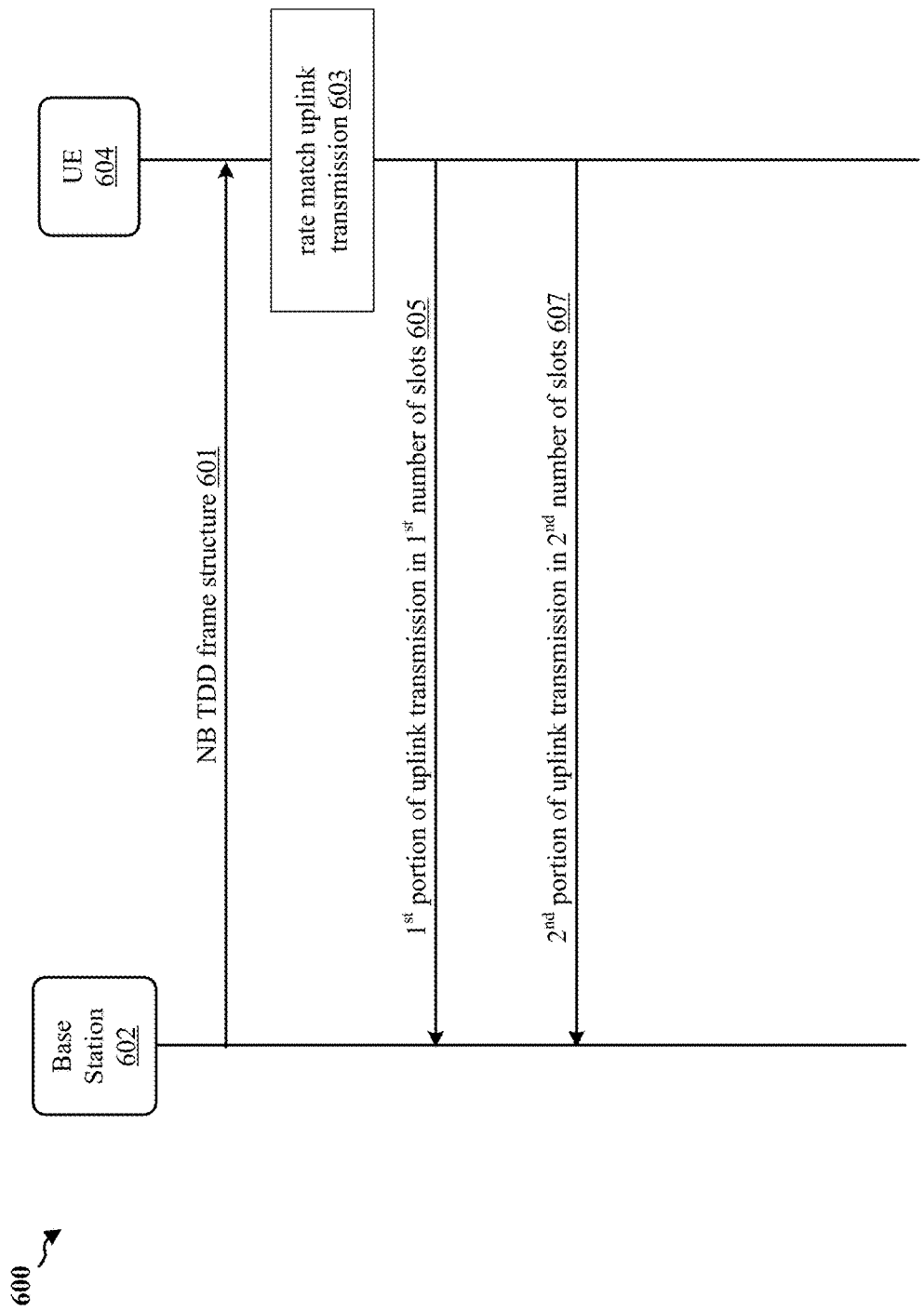
FIG. 6 illustrates a data flow for a narrowband communication system(s) that may support narrowband communications using narrowband TDD frame structures in accordance with certain aspects of the disclosure.

FIG. 6 illustrates a data flow 600 of an uplink transmission sent from a UE 604 to a base station 602 in accordance with certain aspects of the disclosure. Base station 602 may correspond to, e.g., base station 102, 180, 502, 702, 802, 902, 1002, 1102, 1202, 1302, 1402, 3150, 3350, 3550, eNB 310, the apparatus 1702/1702'. UE 604 may correspond to, e.g., UE 104, 350, 504, 704, 804, 904, 1004, 1104, 1204, 1304, 1404, the apparatus 2902/2902', 3102/3102', 3302/3302', 3502/3502'. In addition, the base station 602 and the UE 604 may be configured to communicate using narrowband communications (e.g., NB-IoT and/or eMTC). For example, the UE 604 may be an NB-IoT device and/or an eMTC device.

In one aspect, UE 604 may receive information 601 associated with a narrowband TDD frame structure that has a first set of contiguous uplink subframes with a first number of slots. For example, the narrowband TDD frame structure may be one of configuration 0, 1, 3, 4, or 6 from table 410 in FIG. 4A that each include contiguous uplink subframes. In one aspect, the narrowband TDD frame structure may include a first set of contiguous uplink subframes and a second set of contiguous uplink subframes. For example, the narrowband TDD frame structures that include a first and second set of contiguous uplink subframes may be configuration 0, 1, and/or 6 from table 410 in FIG. 4A. In another aspect, the narrowband TDD frame structure may include a single set of contiguous uplink subframes. For example, the narrowband TDD frame structures that include a single set of contiguous uplink subframes may be configuration 3 and/or 4 from table 410 in FIG. 4A. Such TDD configurations are defined for 10 ms frame, 15 kHz subcarrier spacing where each subframe is 1 ms long. In a system employing multiple subcarrier spacings, the TDD configuration can be thought of as specifying a duration of uplink transmissions and downlink transmissions.

When using a narrowband TDD frame structure, an uplink transmission may be sent over a plurality of slots. A slot, if defined as 7 OFDM symbols, is 0.5 ms long for 15 kHz subcarrier spacing, 1 ms long for 7.5 kHz subcarrier spacing and 2 ms long for 3.75 kHz subcarrier spacing. The UL transmission within a slot comprises both pilots and data and is meant to be self-decodable. Since the pilots within the slot are used to decode the data it is desirable to have all symbols in the slot transmitted together or in close proximity to each other. Transmitting a slot for example over two discontinuous UL durations may lead to a performance loss. In a first configuration, UE 604 may transmit a first portion of the uplink transmission using a maximum number of full slots that fit in a first contiguous uplink transmission duration and transmit a remaining portion of the uplink transmission using at least a portion of the next contiguous uplink transmission duration. In a second configuration, UE 604 may transmit a first portion of the uplink transmission using at least a partial slot in a first contiguous uplink transmission duration and a remaining portion of the uplink transmission using at least a partial slot in the next contiguous uplink transmission duration. In a third configuration, new slot formats may be defined with fewer symbols per slot as the subcarrier spacing decreases so that the duration is time for a slot is the same for all supported subcarrier spacing.

In the first configuration, UE 604 may transmit the first portion of the uplink transmission 605 using all full slots in the first set of contiguous uplink transmission duration. In other words, UE 604 may determine the number of slots that can be transmitted fully in the first contiguous UL transmission duration and transmit the first portion of the uplink transmission 605 using all available symbols in the determined number of slots in the first contiguous uplink transmission duration, and then move to the next uplink transmission duration to transmit a second portion (e.g., remaining portion) of the uplink transmission 607 using full slots that fit in the next contiguous uplink transmission duration. In a first example, assume that the information 601 received by UE 604 indicates that configuration 1 is used for the narrowband TDD frame structure, and that the duration of the uplink transmission is eight slots (e.g., four subframes) with each slot being 0.5 ms long. The first contiguous uplink transmission duration in configuration 1 may be 2 ms long (e.g., subframes 2 and 3), and the second set of contiguous uplink transmission duration in configuration 1 may be 2 ms long (e.g., subframes 7 and 8). Hence, in accordance with the first configuration, UE 604 may transmit the first portion of the uplink transmission 605 comprising 4 slots in first contiguous uplink transmission duration in a radio frame. UE 604 may transmit the second portion of the uplink transmission 607 comprising the remaining 4 slots using the second contiguous uplink transmission duration in the first radio frame. However, if the duration of the uplink transmission is 6 slots, then the UE 604 may transmit the first portion of the uplink transmission 605 with the first four slots of the first contiguous uplink transmission duration, and the remaining portion of the uplink transmission with the last two slots of the second contiguous uplink transmission duration and potentially not transmit anything in the remaining portion.

In a second example, assume that the information 601 received by UE 604 indicates that configuration 6 is used for the narrowband TDD frame structure, and that the duration of the uplink transmission is 4 ms and that each slot has a 2 ms duration (e.g., 3.75 kHz subcarrier spacing). For an uplink transmission starting with the radio frame, the first contiguous uplink duration in configuration 6 is 3 ms long and the second uplink duration in configuration 6 is 2 ms long (not considering the special subframe). Therefore, only one uplink full slot will fit within the first contiguous uplink transmission duration. In accordance with the first configuration UE 604 may transmit the first slot in the first contiguous uplink duration and transmit the second slot in the next contiguous uplink duration. In accordance with the second configuration, UE 604 may transmit the first portion of the uplink transmission 605 using all the symbols corresponding to the first slot and a portion of the symbols (e.g., partial slot/fewer than 7 OFDM symbols) of the second slot. UE 604 may transmit the second portion of the uplink transmission 607 using a portion of the symbols (e.g., remaining portion of the partial slot/fewer than 7 OFDM symbols) in the next uplink duration, or the UE 604 may puncture the rest of the previous partial slot (e.g. not transmit the punctured slots) and start transmission of a new slot in the next uplink duration. Unused portions of the second uplink transmission duration may be punctured. Note that the first and second uplink transmission duration are with respect to when the UE 604 starts an uplink transmission. If the UE 604 starts the uplink transmission in the second half of the radio frame for TDD configuration 6, corresponding to that transmission, the first uplink duration would be 2 ms and second uplink duration would be 3 ms.

In a first aspect of the second configuration, UE 604 may rate match 603 a first portion of an uplink transmission in the first uplink transmission duration based on a total number of symbols in the first contiguous uplink transmission duration. In a second aspect of the second configuration, UE 604 may rate match 603 the first portion of the uplink transmission 605 in the first contiguous uplink transmission duration based on a total number of symbols (e.g., 7 OFDM symbols) in the first slot and the first subset of symbols in the second slot. In one aspect, the first portion of the uplink transmission 605 may be transmitted using a pilot pattern based on all the symbols (e.g., 7 OFDM symbols) in the first slot and the first subset of symbols (e.g., fewer than 7 OFDM symbols) in the second slot. In either the first aspect or the second aspect of the second configuration, UE 604 may transmit the first portion of the uplink transmission 605 using all symbols in a first slot in the first number of slots and a first subset of symbols in a second slot in the first number of slots. In certain configurations, UE 604 may perform rate matching by assuming the entire slot is transmitted and then puncturing the symbols that do not actually get transmitted. In certain other configurations, the UE 604 may perform rate matching by assuming the reduced number of symbols due to the partial slot. In certain aspects, a new pilot pattern may be defined for the new partial slot structure. Alternately, the pilot pattern corresponding to the full slot may be used with puncturing. That is, if the partial slot has N symbols, the pilot symbols outside the N symbols are punctured.

In addition, UE 604 may transmit a second portion of the uplink transmission 607 using a second subset of symbols in a third slot located in a second contiguous uplink transmission duration. In one aspect, the first subset of symbols and the second subset of symbols may be equal to all symbols in an uplink subframe. In another aspect, the second subset of symbols may be associated with a second contiguous uplink transmission duration.

Scrambling/Repetitions

Data scrambling may be used to transpose and/or invert signals or otherwise encode an uplink transmission (e.g., NPUCCH and/or NPUSCH) with a predetermined scrambling sequence. The scrambling sequence may be unintelligible to a device (e.g., base station and/or UE) not equipped with an appropriately set descrambler, and hence only an intended device may properly decode the uplink transmission. The scrambling also helps make interference from other devices random.

Using a narrowband FDD frame structure, the scrambling sequence for the uplink transmission may remain the same for a predetermined number of repeated transmissions across a set of uplink subframes. The use of the same scrambling across repetitions may simplify receiver implementation since the same scrambling across repetitions may combine the different repetitions before descrambling and demodulation. To increase the chance of properly decoding the uplink transmission, a base station may combine the uplink transmission across each of the repeated transmissions before descrambling and demodulation so long as the channel does not vary across the repeated transmissions. The UE may combine post demodulation to achieve the benefits of repetitions potentially at the expense of higher complexity.

The legacy FDD scrambling sequence may be dependent on the LSB associated with the frame number. For example, the legacy FDD scrambling sequence may be defined as $c_{init} = n_{RNTI} \cdot 2^{14} + n_f \bmod 2 \cdot 2^{13} + [n_s/2] \cdot 2^9 + N_{ID}^{Ncell}$, where $n_f$ is the radio frame number, $n_{RNTI}$ is the radio network temporary identifier that is used to identify a connected mode UE located in a cell, $n_s$ is the slot number, and $N_{ID}^{Ncell}$ is the cell identification.

Because an uplink transmission sent using a narrowband TDD frame structure may span multiple radio frames (e.g., discussed supra with respect to FIG. 5), a base station may not be able to combine a repeated transmission that uses the same scrambling sequence across different radio frames due to changes in channel conditions.

There is a need to update a scrambling sequence for a repeated uplink transmission using a narrowband TDD frame structure.

Figure 7:
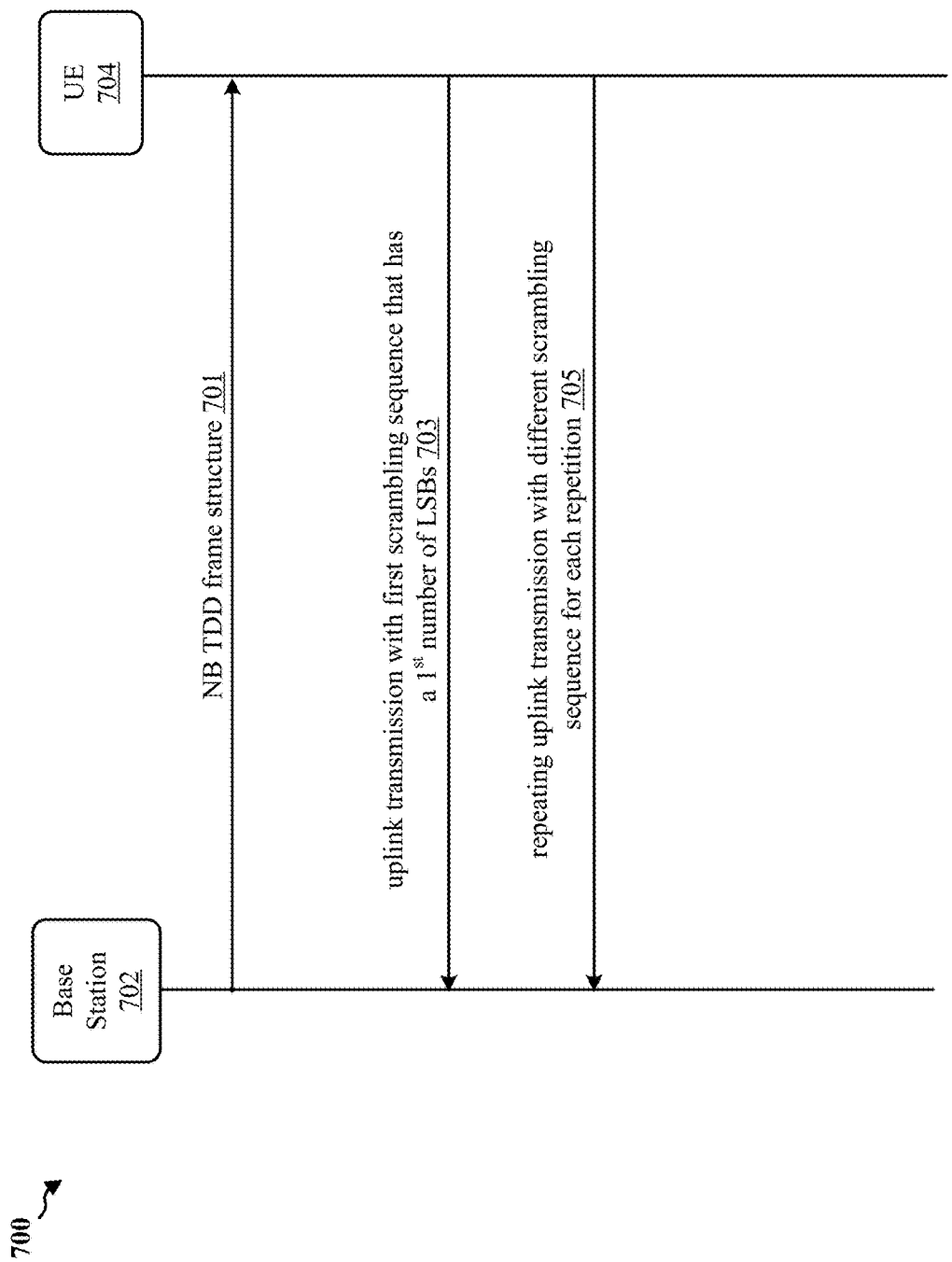
FIG. 7 illustrates a data flow for a narrowband communication system(s) that may support narrowband communications using narrowband TDD frame structures in accordance with certain aspects of the disclosure.

FIG. 7 illustrates a data flow 700 of repeated uplink transmissions with different scrambling sequences sent from a UE 704 to a base station 702 in accordance with certain aspects of the disclosure. Base station 702 may correspond to, e.g., base station 102, 180, 502, 602, 802, 902, 1002, 1102, 1202, 1302, 1402, 3150, 3350, 3550, eNB 310, the apparatus 1702/1702'. UE 704 may correspond to, e.g., UE 104, 350, 504, 604, 804, 904, 1004, 1104, 1204, 1304, 1404, the apparatus 2902/2902', 3102/3102', 3302/3302', 3502/3502'. In addition, the base station 702 and the UE 704 may be configured to communicate using narrowband communications (e.g., NB-IoT and/or eMTC). For example, the UE 704 may be an NB-IoT device and/or an eMTC device.

In one aspect, UE 704 may receive information 701 associated with a narrowband TDD frame structure. For example, the narrowband TDD frame structure may be one of configuration 0, 1, 2, 3, 4, 5, 6, 1, or o from table 410 in FIG. 4A.

In another aspect, UE 704 may transmit an uplink transmission 703 a predetermined number of times using a first scrambling sequence. For example, each uplink transmission may be repeated M number of times with the same scrambling sequence. Repeating the uplink transmission M number of times may aid in combining the uplink transmission by the base station 702 before descrambling, but may come at cost of not randomizing interference. In one aspect, the first scrambling sequence may include a first number of LSBs associated with a first radio frame. In another aspect, the first number of LSBs may be larger than a second number of LSBs used in a second scrambling sequence associated with a narrowband FDD uplink transmission.

Since one uplink transmission may span multiple radio frames when using a narrowband TDD frame structure, UE 704 may update the scrambling sequence to use more LSBs of the $n_f$ (e.g., the radio frame number) to avoid repeating the scrambling sequence as a smaller number of uplink slots (e.g., uplink subframes) are available in each radio frame as compared to a narrowband FDD frame structure. For example, UE 704 may use $n_f \bmod 10$ rather than $n_f \bmod 2$ in the scrambling sequence. As mentioned supra, because repetitions of an uplink transmission may occur in different radio frames, base station 702 may not be able to combine the repetitions prior to demodulation.

In one aspect, the M number of repetitions may be a function of narrowband TDD frame structure so that different scrambling sequences are used for repetitions that occur in different radio frames. Additionally and/or alternatively, the scrambling sequence may be reset across different sets of uplink subframes within the same radio frame. For example, the uplink transmission 703 may be sent M number of times with a same scrambling sequence and then the next M number of repetitions 705 may be transmitted with a different scrambling sequence. M may be a function of the number of contiguous or non-contiguous uplink subframes in a single radio frame. Still further, no identical repetitions may be sent (e.g., M=1). In other words, each repetition of the uplink transmission 703 may be transmitted one time using a unique scrambling sequence.

By using different scrambling sequences for repetitions, the base station 702 of the present disclosure may be able to randomize the interference across different cells improving the system performance and also to combine the repetitions and have an increased chance of decoding the uplink transmission.

Gap Between Uplink Transmission

When an uplink transmission is repeated using a narrowband FDD frame structure, a gap of a predetermined length (e.g., 40 ms) may be located after a predetermined number of radio frames (e.g., 256) that are used to repeat an uplink transmission. A UE may use the gap to perform timing and/or frequency estimation before continuing to repeat the uplink transmission in the next set of radio frames. However, because the UE may need to stop sending the uplink transmission to perform timing and/or frequency estimation during the gap, an increased latency associated with decoding the uplink transmission at the base station may occur.

There is a need to reduce the latency associated with decoding an uplink transmission that may be caused by performing timing and/or frequency estimation by the UE.

Figure 8:
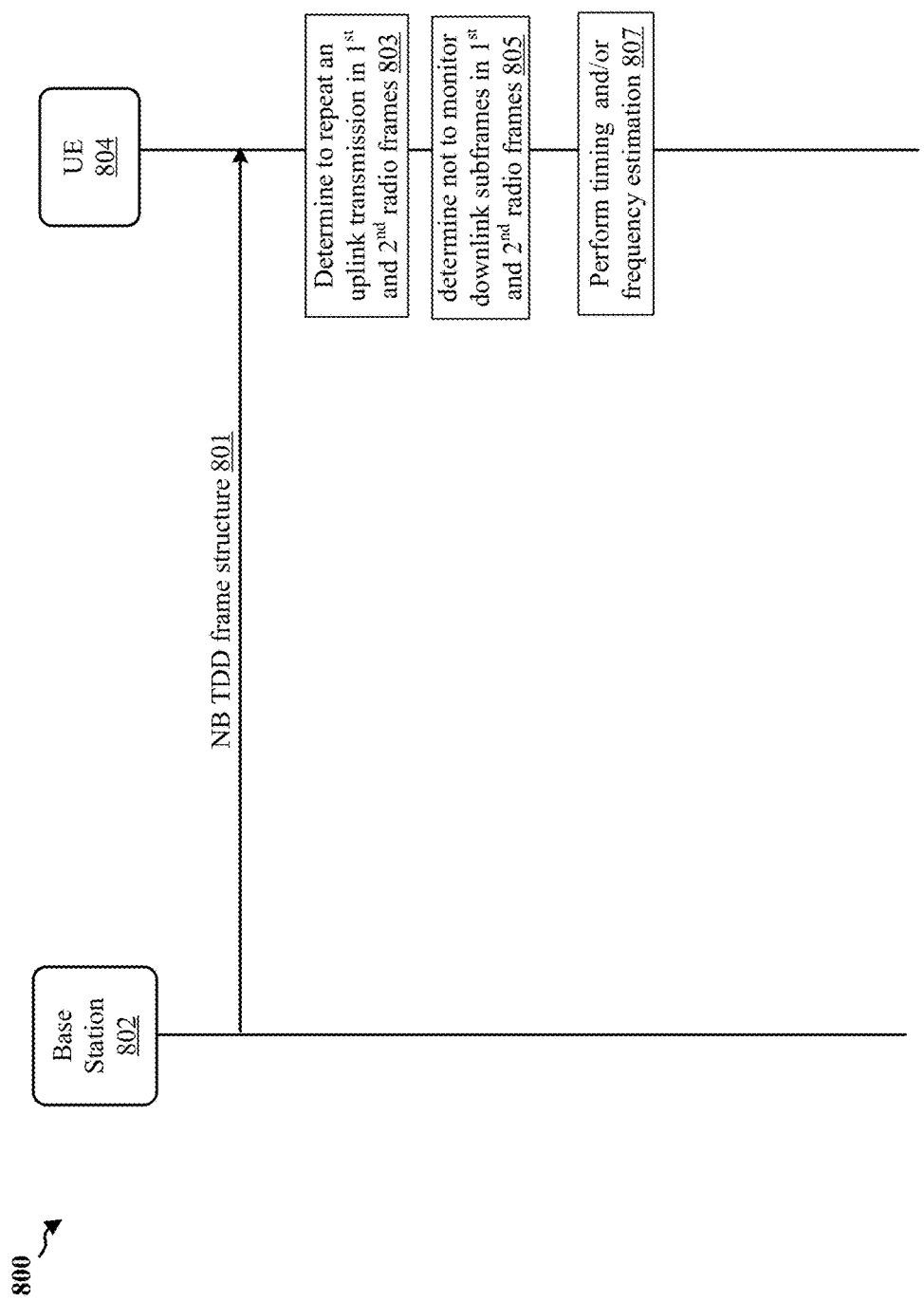
FIG. 8 illustrates a data flow for a narrowband communication system(s) that may support narrowband communications using narrowband TDD frame structures in accordance with certain aspects of the disclosure.

FIG. 8 is a diagram illustrating a flow diagram 800 for performing timing and/or frequency estimation by a UE 804 in accordance with certain aspects of the disclosure. Base station 802 may correspond to, e.g., base station 102, 180, 502, 602, 702, 902, 1002, 1102, 1202, 1302, 1402, 3150, 3350, 3550, eNB 310, the apparatus 1702/1702'. UE 804 may correspond to, e.g., UE 104, 350, 504, 604, 704, 904, 1004, 1104, 1204, 1304, 1404, the apparatus 2902/2902', 3102/3102', 3302/3302', 3502/3502'. In addition, the base station 802 and the UE 804 may be configured to communicate using narrowband communications (e.g., NB-IoT and/or eMTC). For example, the UE 804 may be an NB-IoT device and/or an eMTC device.

In one aspect, UE 804 may receive information 801 associated with a narrowband TDD frame structure. For example, the narrowband TDD frame structure may be one of configuration 0, 1, 2, 3, 4, 5, 6, 1, or o from table 410 in FIG. 4A.

In another aspect, UE 804 may determine 803 to repeat an uplink transmission in a first set of radio frames and a second set of radio frames. In certain configurations, the first set of radio frames and the second set of radio frames may each include 256 radio frames. In certain other configurations, the first set of radio frames and the second set of radio frames may include more or fewer than 256 radio frames. The first set of radio frames and the second radio frames may include the same number of radio frames or a different number of radio frames. The uplink transmissions may include, for example, a narrowband physical random access channel (NPRACH) preamble.

In a further aspect, UE 804 may determine 805 not to monitor downlink subframes in the first set of radio frames and the second set of radio frames. In one aspect, the UE 804 may receive signaling (e.g., not illustrated in FIG. 8) from base station 802 indicating not to monitor at least a portion of the downlink subframes in one or more of the first set of radio frames and/or the second set of radio frames.

In addition, UE 804 may perform 807 one or more of a timing estimation or a frequency estimation using at least one downlink subframe in one or more of the first set of radio frames or the second set of radio frames. By not monitoring at least a portion of the downlink subframes in the first radio frame and/or the second radio frame, UE 804 may use the duration of the downlink subframes to perform timing estimation and/or frequency estimation. Timing estimation and/or frequency estimation may be used to synchronize (e.g., subframe synchronization) with base station 802. Because the timing estimation and/or frequency estimation is performed during downlink subframe durations, no time gap may be present between the first set of radio frames and the second set of radio frames. In other words, the timing estimation and/or the frequency estimation may be performed without using a gap between a first set of radio frames and a second set of radio frames.

NB-SRS

Figure 9A:
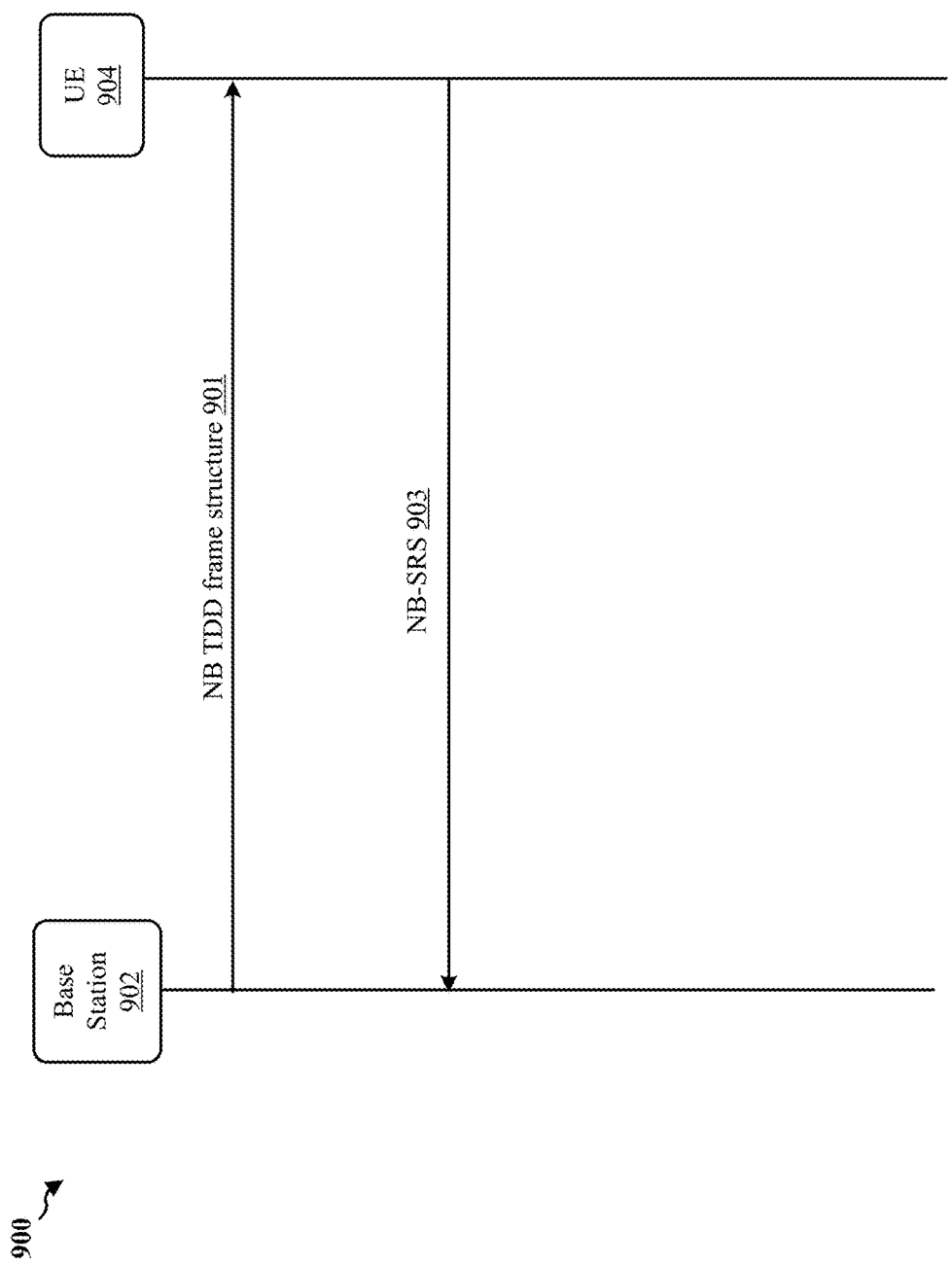
FIG. 9A illustrates a data flow for a narrowband communication system(s) that may support narrowband communications using narrowband TDD frame structures in accordance with certain aspects of the disclosure.

FIG. 9A is a diagram illustrating a flow diagram 900 for sending narrowband-SRS (NB-SRS) from a UE 904 to a base station 902 in accordance with certain aspects of the disclosure. Legacy SRS transmitted by a UE may have a comb structure, and a UE may transmit SRS in one of the tones in the comb structure. NB-SRS may be transmitted by the UE using tones that are left unused in the comb structure. The NB-SRS may be used by base station 902 for channel quality estimation to enable frequency-dependent scheduling of uplink transmission.

Base station 902 may correspond to, e.g., base station 102, 180, 502, 602, 702, 802, 1002, 1102, 1202, 1302, 1402, 2950, eNB 310, apparatus 1702/1702', 3102/3102'. UE 904 may correspond to, e.g., UE 104, 350, 504, 604, 704, 804, 1004, 1104, 1204, 1304, 1404, 1750, apparatus 2902/2902', 3302/3302', 3502/3502'. In addition, the base station 902 and the UE 904 may be configured to communicate using narrowband communications (e.g., NB-IoT and/or eMTC). For example, the UE 904 may be an NB-IoT device and/or an eMTC device.

In one aspect, UE 904 may receive information 901 associated with a narrowband TDD frame structure. For example, the narrowband TDD frame structure may be one of configuration 0, 1, 2, 3, 4, 5, 6, 1, or o from table 410 in FIG. 4A.

In another aspect, UE 904 may transmit an NB-SRS 903 to base station 902 using the narrowband TDD frame structure. In one aspect, the NB-SRS 903 comprises a single tone SRS. In another aspect, the NB-SRS 903 may be transmitted as a series of uplink transmissions that use frequency hopping to cover a system bandwidth associated with the narrowband communications. In yet another aspect, the NB-SRS 903 may be transmitted in an uplink portion of a special subframe. Still further, the NB-SRS 903 may be multiplexed with a legacy SRS in the uplink portion of the special subframe.

Figure 9B:
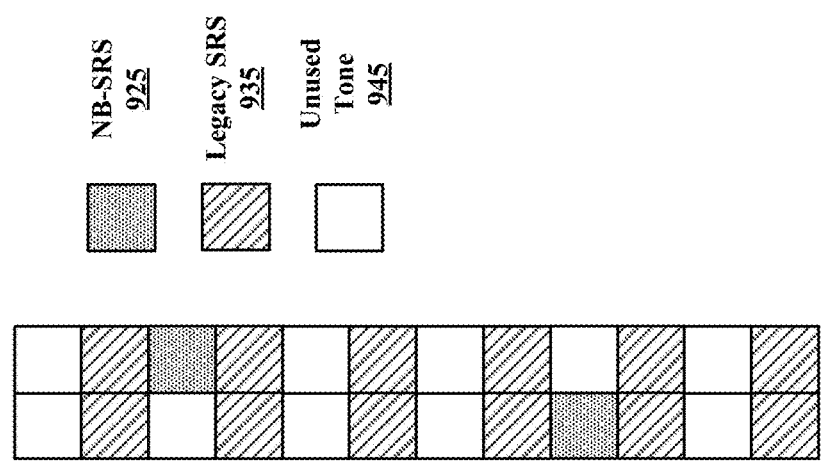
FIG. 9B illustrates a comb structure that may be used to transmit SRS and/or NB-SRS in accordance with certain aspects of the disclosure.

FIG. 9B is a diagram illustrating the SRS comb structure 915 with NB-SRS 925 multiplexed with legacy SRS 935. In certain configurations, certain tones 945 in the comb structure may be unused.

Reference Signal

Using a narrowband FDD frame structure, narrowband reference signal (NRS) sequence orthogonality may be achieved over 16 slots (e.g., the sequence length is defined over 16 slots). For example, a UE may transmit an NRS over 16 slots using orthogonal sequence length 16. Because an uplink transmission sent using a narrowband TDD frame structure may span multiple radio frames (e.g., discussed supra with respect to FIG. 5), a base station may not be able to combine an NRS with an orthogonal sequence length 16 due to changes in channel conditions.

There is a need to update an NRS orthogonal sequence length for an NRS transmitted using a narrowband TDD frame structure.

Figure 10A:
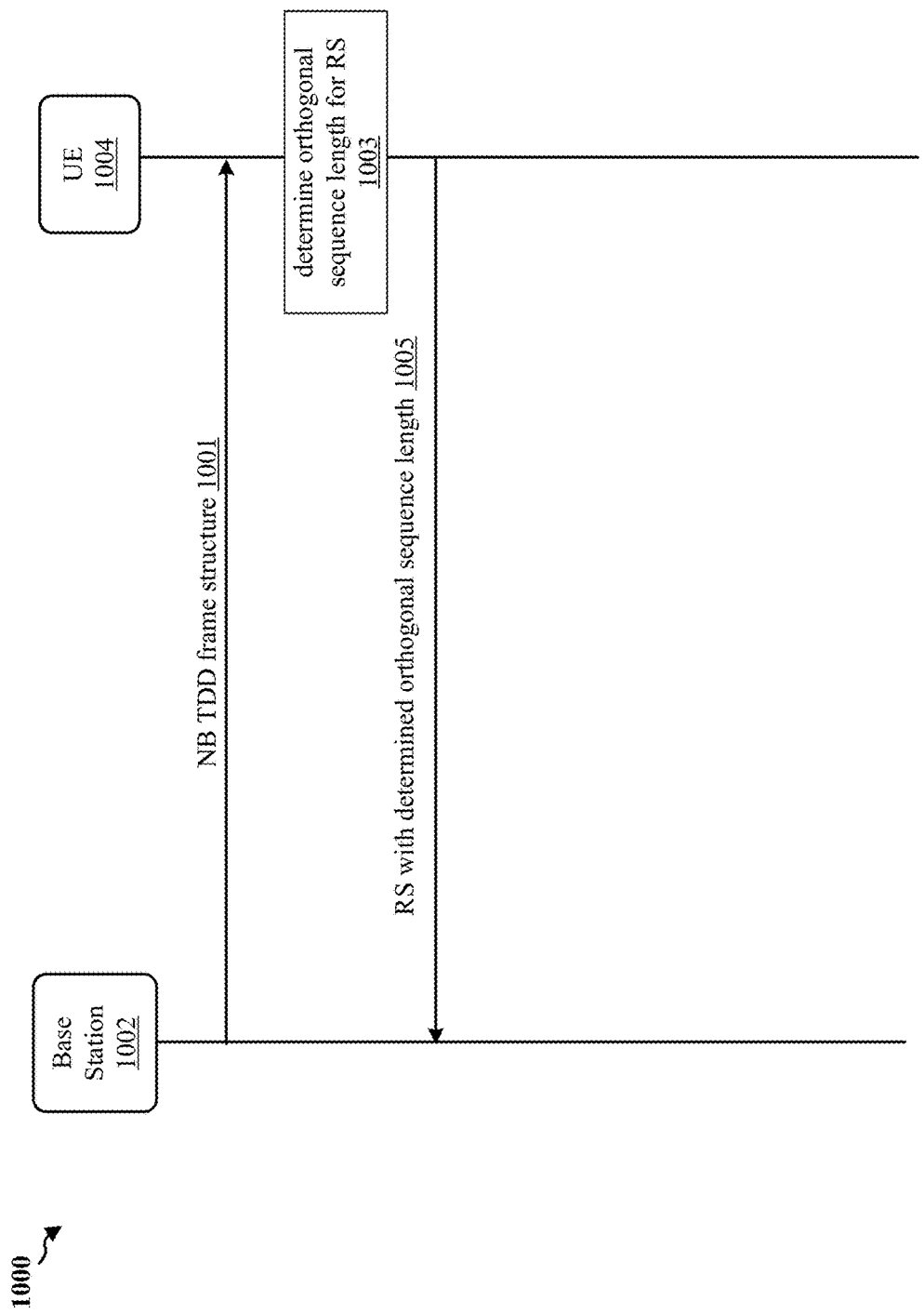
FIG. 10A illustrates a data flow for a narrowband communication system(s) that may support narrowband communications using narrowband TDD frame structures in accordance with certain aspects of the disclosure.

FIG. 10A is a diagram illustrating a flow diagram 1000 for sending a NRS from a UE 1004 to a base station 1002 in accordance with certain aspects of the disclosure. The NRS may be a narrowband DM-RS (NB-DM-RS) which may be used by base station 1002 to enable coherent signal demodulation. In a second configuration, the NRS may be NB-SRS as discussed supra with respect to FIG. 9.

Base station 1002 may correspond to, e.g., base station 102, 180, 502, 602, 702, 802, 902, 1102, 1202, 1302, 1402, 3150, 3350, 3550, eNB 310, the apparatus 1702/1702'. UE 1004 may correspond to, e.g., UE 104, 350, 504, 604, 704, 804, 904, 1104, 1204, 1304, 1404, the apparatus 2902/2902', 3102/3102', 3302/3302', 3502/3502'. In addition, the base station 1002 and the UE 1004 may be configured to communicate using narrowband communications (e.g., NB-IoT and/or eMTC). For example, the UE 1004 may be an NB-IoT device and/or an eMTC device.

In one aspect, UE 1004 may receive information 1001 associated with a narrowband TDD frame structure. For example, the UE 1004 may receive information 1001 indicating that the narrowband TDD frame structure is one of configuration 0, 1, 2, 3, 4, 5, 6, 1, or o from table 410 in FIG. 4A. In one aspect, the information 1001 may indicate a narrowband TDD frame structure that includes a set of contiguous uplink subframes. When the information 1001 indicates that the narrowband TDD frame structure includes a set of contiguous uplink subframes, the narrowband TDD frame structure may be one of configuration 0, 1, 3, 4, or 6 from table 410 in FIG. 4A. Each of configurations 0, 1, 3, 4, or 6 include at least two or more contiguous uplink subframes.

In another aspect, UE 1004 may determine 1003 an orthogonal sequence length associated with an NRS based on at least one of a number of uplink subframes or a number of slots in the set of contiguous uplink subframes. For example, assume that the information 1001 received by UE 1004 indicates that configuration 1 is used as the narrowband TDD frame structure. As seen in FIG. 4A, configuration 1 has a set of 2 contiguous uplink subframes (e.g., subframes 2 and 3). The set of 2 contiguous uplink subframes has 4 slots. Hence, UE 1004 may determine 1003 that the orthogonal sequence length associated with the NRS is length 4. Alternatively, when the narrowband TDD frame structure has a single uplink subframe (e.g., configuration 5), the orthogonal sequence length of the NRS may be length 2 as based on the number of slots in the single uplink subframe (e.g., 2 slots).

In a further aspect, UE 1004 may transmit the NRS 1005 using the determined orthogonal sequence length. For example, the NRS 1005 may be transmitted using an NPUSCH format 1 pilot structure. In one aspect, the NRS 1005 may be transmitted using a modified NPUSCH format 1 pilot structure that includes an increased pilot density per slot than the pilot density used in legacy NPUSCH format 1. For example, the modified NPUSCH format 1 may include two pilots per slot rather than one pilot per slot as in legacy NPUSCH format 1.

Sequence-Group Hopping

The sequence-group hopping pattern in a narrowband FDD frame structure may change from slot to slot in a pseudo-random manner, while the shift offset may be fixed in all slots. In other words, the sequence-group hopping pattern may be a function of slot number. Because uplink subframes may be spaced apart in a narrowband TDD frame structure, a sequence-group hopping pattern that is only a function of slot number may repeat across different radio frames, and hence limit diversity.

There is a need for a sequence-group hopping pattern that may not limit diversity when a narrowband TDD frame structure is used for narrowband communications.

Figure 10B:
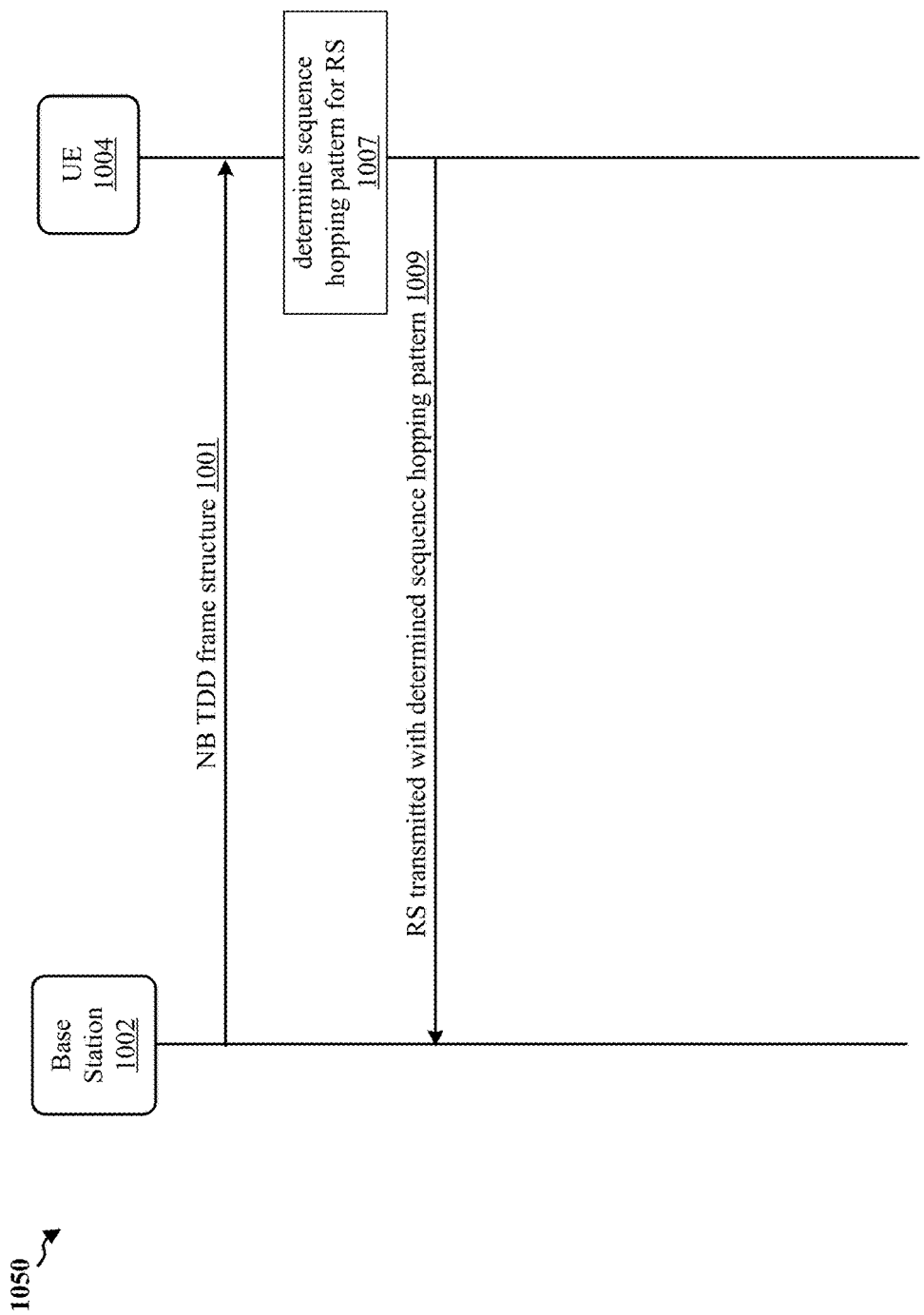
FIG. 10B illustrates a data flow for a narrowband communication system(s) that may support narrowband communications using narrowband TDD frame structures in accordance with certain aspects of the disclosure.

FIG. 10B is a diagram illustrating a flow diagram 1050 for sending a NRS using a sequence-group hopping pattern from a UE 1004 to a base station 1002 in accordance with certain aspects of the disclosure. The NRS may be an NB-DM-RS which may be are used by base station 1002 to enable coherent signal demodulation and/or channel estimation. In a second configuration, the NRS may be NB-SRS as discussed supra with respect to FIG. 9.

Base station 1002 may correspond to, e.g., base station 102, 180, 502, 602, 702, 802, 902, 1102, 1202, 1302, 1402, 3150, 3350, 3550, eNB 310, the apparatus 1702/1702'. UE 1004 may correspond to, e.g., UE 104, 350, 504, 604, 704, 804, 904, 1104, 1204, 1304, 1404, the apparatus 2902/2902', 3102/3102', 3302/3302', 3502/3502'. In addition, the base station 1002 and the UE 1004 may be configured to communicate using narrowband communications (e.g., NB-IoT and/or eMTC). For example, the UE 1004 may be an NB-IoT device and/or an eMTC device.

In one aspect, UE 1004 may receive information 1001 associated with a narrowband TDD frame structure. For example, the UE 1004 may receive information 1001 indicating that the narrowband TDD frame structure is one of configuration 0, 1, 2, 3, 4, 5, 6, 1, or o from table 410 in FIG. 4A.

In another aspect, UE 1004 may determine 1007 a sequence-hopping pattern associated with a NRS based on at least one of a number of uplink subframes, a number of slots in the set of contiguous uplink subframes, or a radio frame number. For example, the sequence-hopping pattern may be a function of one or more LSBs associated with a radio frame number. By using a sequence-hopping pattern that is based on at least one of a number of uplink subframes, a number of slots in a set of contiguous uplink subframes, or a radio frame number, diversity may be increased as compared to using a sequence-hopping pattern that is only a function of the slot number.

In a further aspect, UE 1004 may transmit the NRS 1009 using the determined sequence-hopping pattern.

NPRACH—Symbol Group Size

Figure 11:
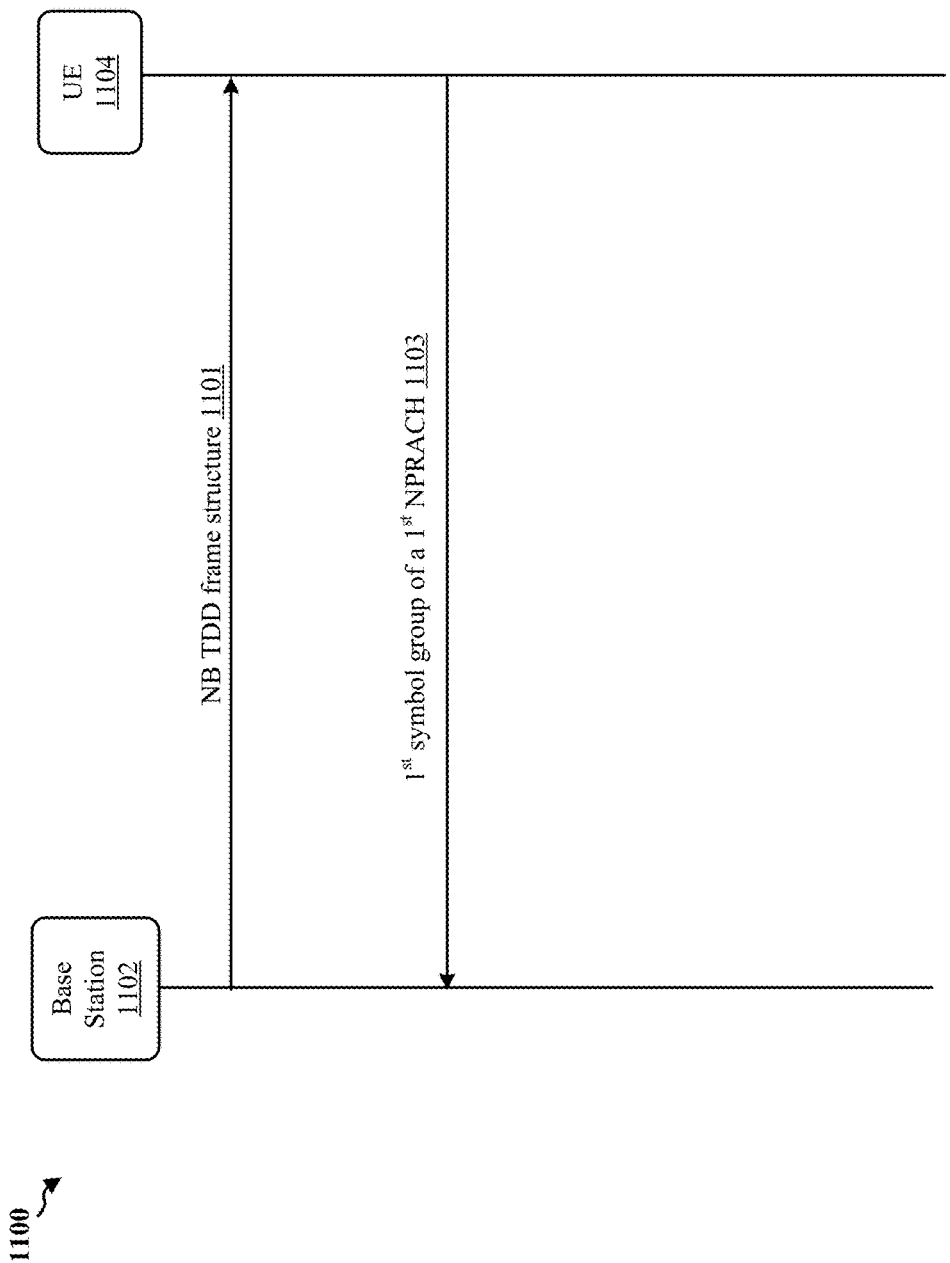
FIG. 11 illustrates a data flow for a narrowband communication system(s) that may support narrowband communications using narrowband TDD frame structures in accordance with certain aspects of the disclosure.

FIG. 11 is a diagram illustrating a flow diagram 1100 for sending an NPRACH from a UE 1104 to a base station 1102 in accordance with certain aspects of the disclosure. Base station 1102 may correspond to, e.g., base station 102, 180, 502, 602, 702, 802, 902, 1002, 1202, 1302, 1402, 3150, 3350, 3550, eNB 310, the apparatus 1702/1702'. UE 1104 may correspond to, e.g., UE 104, 350, 504, 604, 704, 804, 904, 1004, 1204, 1304, 1404, the apparatus 2902/2902', 3102/3102', 3302/3302', 3502/3502'. In addition, the base station 1102 and the UE 1104 may be configured to communicate using narrowband communications (e.g., NB-IoT and/or eMTC). For example, the UE 1104 may be an NB-IoT device and/or an eMTC device.

In one aspect, UE 1104 may receive information 1101 associated with a narrowband TDD frame structure. For example, the UE 1104 may receive information 1101 indicating that the narrowband TDD frame structure is one of configuration 0, 1, 2, 3, 4, 5, 6, 1, or o from table 410 in FIG. 4A.

In another aspect, UE 1104 may transmit a first symbol group 1103 of a first NPRACH preamble to base station 1102. In one aspect, a first length of the first symbol group may be associated with the narrowband TDD frame structure.

In a first configuration, the first length of the first symbol group may be shorter than a second length of a second symbol group of a second NPRACH preamble transmitted using a narrowband FDD frame structure. In one aspect, the first length may be reduced so repetitions of uplink transmission fit in a narrowband TDD frame structure. For example, if the first length is reduced from 1.4 ms/1.6 ms (e.g., the lengths used for narrowband FDD frame structures) to 1 ms, UE 1104 may be able to accommodate 2 symbol groups in a 2 ms uplink occasion (e.g., a single uplink subframe or a set of contiguous uplink subframes) and 3 symbol groups in a 3 ms uplink occasion. A special subframe may be located before certain uplink occasions, and the timing uncertainty associated with the NPRACH may be accommodated by the special subframe located before the uplink occasion. Reducing the length of the NPRACH preamble may also enable 1 symbol group to fit within 1 uplink subframe which may be useful when configuration 2 is used for the narrowband TDD frame structure.

In a second configuration, the first length of the first symbol group may be longer than a second length of a second symbol group of a second NPRACH preamble transmitted using a narrowband FDD frame structure. In one aspect, the first length may be increased so repetitions of uplink transmission fit in a narrowband TDD frame structure. For example, the UE 1104 may increase the symbol group size to 2 ms and accommodate 1 uplink symbol group in a 2 ms uplink occasion. Transmitting the same size symbol group in a 2 ms uplink occasion using the symbol group size associated with narrowband FDD frame structures may lead to wastage of 0.6 ms/0.4 ms of the 2 ms uplink occasion since the symbol group length in narrowband FDD frame structures is 1.4 ms/1.6 ms.

In a third configuration, a first preamble format associated with the first NPRACH preamble may be different than a second preamble format associated with a second NPRACH preamble transmitted using a narrowband FDD frame structure.

In a fourth configuration, the first length of the first symbol group may be associated with one or more uplink occasions in the narrowband TDD frame structure. For example, the first length of the first symbol group may be a function of the configuration used for the narrowband TDD frame structure.

NPRACH—Preamble

An NPRACH preamble in a narrowband FDD frame structure may include a predetermined number of repetitions (e.g., 4 repetitions) of the symbol group discussed supra with respect to FIG. 10B. However, the predetermined number of repetitions used in narrowband FDD frame structure may not be well suited for narrowband TDD frame structures due to the limited number of uplink subframes in each radio frame.

There is a need for an NPRACH preamble that is configured for a narrowband TDD frame structure.

Figure 12:
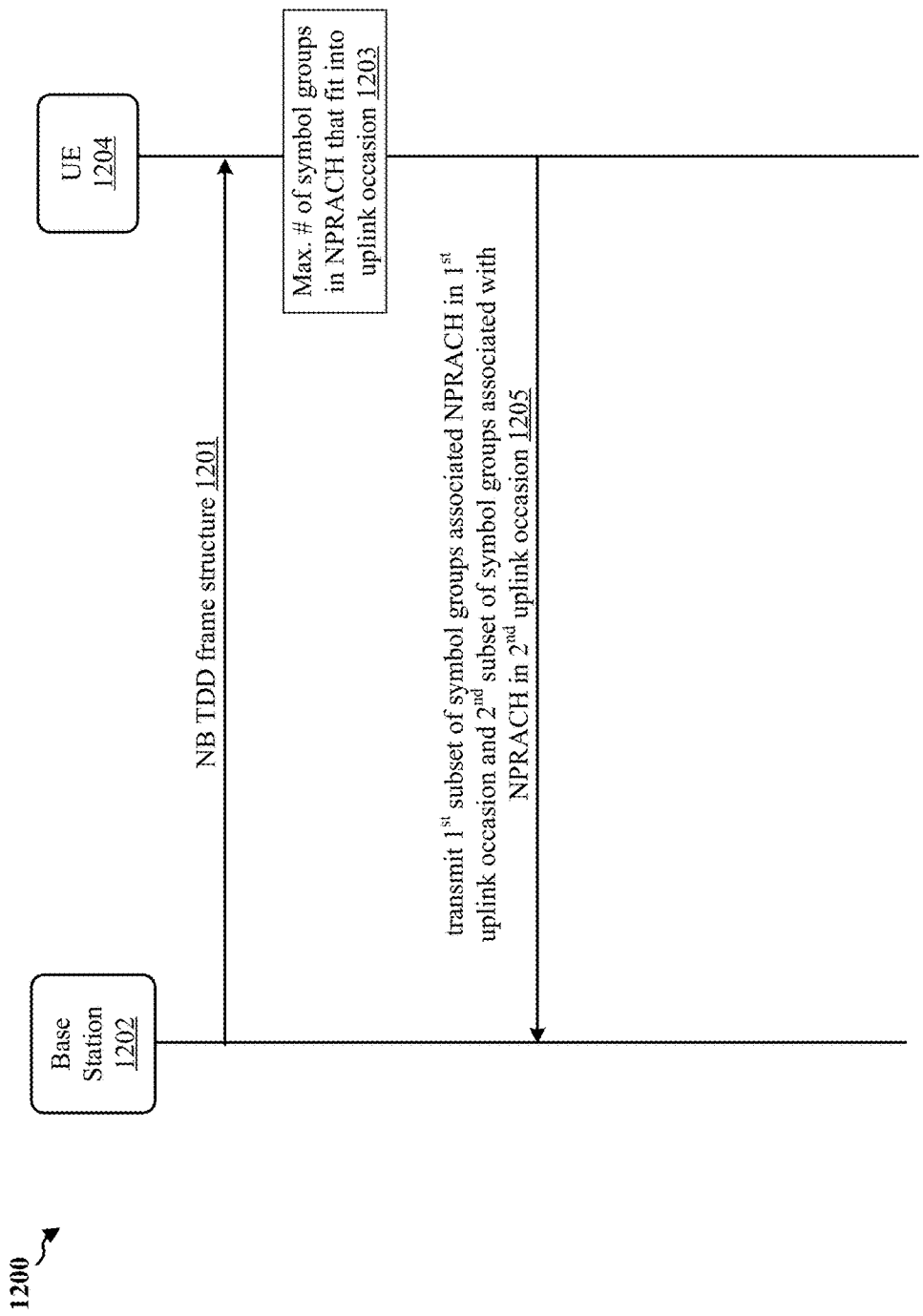
FIG. 12 illustrates a data flow for a narrowband communication system(s) that may support narrowband communications using narrowband TDD frame structures in accordance with certain aspects of the disclosure.

FIG. 12 is a diagram illustrating a flow diagram 1200 for sending repetitions of an NPRACH preamble from a UE 1204 to a base station 1202 in accordance with certain aspects of the disclosure. Base station 1202 may correspond to, e.g., base station 102, 180, 502, 602, 702, 802, 902, 1002, 1102, 1302, 1402, 3150, 3350, 3550, eNB 310, the apparatus 1702/1702'. UE 1204 may correspond to, e.g., UE 104, 350, 504, 604, 704, 804, 904, 1004, 1104, 1304, 1404, the apparatus 2902/2902', 3102/3102', 3302/3302', 3502/3502'. In addition, the base station 1202 and the UE 1204 may be configured to communicate using narrowband communications (e.g., NB-IoT and/or eMTC). For example, the UE 1204 may be an NB-IoT device and/or an eMTC device.

In one aspect, UE 1204 may receive information 1201 associated with a narrowband TDD frame structure. For example, the UE 1204 may receive information 1201 indicating that the narrowband TDD frame structure is one of configuration 0, 1, 2, 3, 4, 5, 6, 1, or o from table 410 in FIG. 4A.

In another aspect, UE 1204 may determine 1203 a maximum number of symbol groups in a plurality of symbol groups associated with an NPRACH preamble that fit in an uplink occasion in the narrowband TDD frame structure.

In a first configuration, the NPRACH preamble for a narrowband TDD frame structure may include a fixed number of repetitions for the symbol group, and UE 1204 may fit the symbol group repetitions across different uplink occasions serially, fitting as many repetitions as can fit in each uplink occasion.

In a second configuration, the number of repetitions for the symbol group and the sequence-hopping pattern of the NPRACH preamble may be the same as the number of repetitions and the sequence-hopping pattern used for a narrowband FDD frame structure.

In a third configuration, the number of repetitions of the symbol group may be a function of the configuration used for the narrowband TDD frame structure.

In a further aspect, UE 1204 may transmit a first subset of the plurality of symbol groups 1205 associated with the NPRACH preamble in a first uplink occasion in the narrowband TDD frame structure and a second subset of the plurality of symbol groups 1205 associated with the NPRACH preamble in a second uplink occasion in the narrowband TDD frame structure. In a first aspect, the first subset may include the maximum number of symbol groups. In a second aspect, the second subset may include any remaining symbol groups in the plurality of symbol groups or the maximum number of symbol groups. In one aspect, a distance between tones used to transmit each symbol group in the plurality of symbol groups may be associated with the narrowband TDD frame structure.

Figure 13:
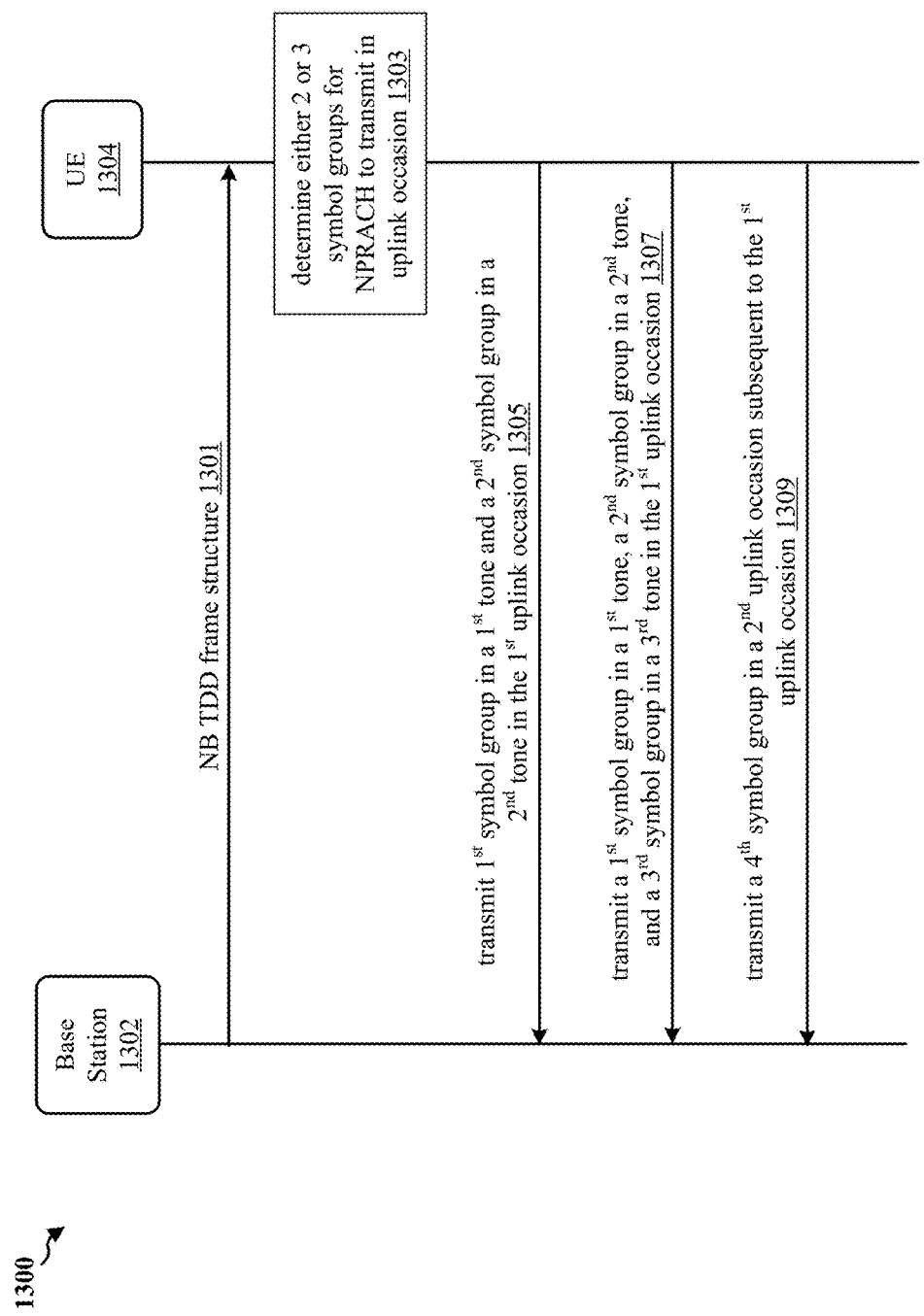
FIG. 13 illustrates a data flow for a narrowband communication system(s) that may support narrowband communications using narrowband TDD frame structures in accordance with certain aspects of the disclosure.

FIG. 13 is a diagram illustrating a flow diagram 1300 for sending repetitions of an NPRACH preamble from a UE 1304 to a base station 1302 in accordance with certain aspects of the disclosure. In one aspect, the NPRACH preamble may be a predefined sequence of mini-preambles (e.g., the number of symbol groups, hopping type, tone position (X)). Additionally and/or alternatively, the NPRACH preamble may be a function of the configuration used for the narrowband TDD frame structure and/or number of special subframes in the narrowband TDD frame structure.

Base station 1302 may correspond to, e.g., base station 102, 180, 502, 602, 702, 802, 902, 1002, 1102, 1202, 1402, 3150, 3350, 3550, eNB 310, the apparatus 1702/1702'. UE 1304 may correspond to, e.g., UE 104, 350, 504, 604, 704, 804, 904, 1004, 1104, 1204, 1404, the apparatus 2902/2902', 3102/3102', 3302/3302', 3502/3502'. In addition, the base station 1302 and the UE 1304 may be configured to communicate using narrowband communications (e.g., NB-IoT and/or eMTC). For example, the UE 1304 may be an NB-IoT device and/or an eMTC device.

In one aspect, UE 1304 may receive information 1301 associated with a narrowband TDD frame structure. For example, the UE 1304 may receive information 1301 indicating that the narrowband TDD frame structure is one of configuration 0, 1, 2, 3, 4, 5, 6, 1, or o from table 410 in FIG. 4A.

In another aspect, UE 1304 may determine 1303 a first number of symbol groups of a NPRACH preamble to transmit in a first uplink occasion in the narrowband TDD frame structure. The first number of symbol groups may include either two symbol groups or three symbol groups.

In a first configuration, the first number of symbol groups may include two symbol groups. In the first configuration, UE 1304 may transmit a first symbol group 1305 in a first tone in the first uplink occasion and a second symbol group 1305 in a second tone in the first uplink occasion.

In a first aspect of the first configuration, a distance between the first tone and the second tone may be one tone (e.g., one OFDM symbol). For example, the first symbol group may be transmitted in tone X and the second symbol group may be transmitted in tone X+1.

In a second aspect of the first configuration, a distance between the first tone and the second tone may be six tones (e.g., six OFDM symbols). For example, the first symbol group may be transmitted in tone X and the second symbol group may be transmitted in tone X+6.

In a second configuration, the first number of symbol groups may include three symbol groups. In the second configuration, UE 1304 may transmit a first symbol group 1307 of the three symbol groups in a first tone of the first uplink occasion, a second symbol group 1307 of the three symbol groups in a second tone of the first uplink occasion, and a third symbol group 1307 of the three symbol groups in a third tone of the first uplink occasion.

In a first aspect of the second configuration, a first distance between the first tone and the second tone may be one tone and a second distance between the second tone and the third tone may be one tone. For example, the first symbol group may be transmitted in tone X, the second symbol group may be transmitted in tone X+1 or X−1, and the third symbol group may be transmitted in tone X. The use of X+1 or X−1 for second symbol group may be based on whether X is even or odd.

In a second aspect of the second configuration, a first distance between the first tone and the second tone may be six tones and a second distance between the second tone and the third tone may be six tones. For example, the first symbol group may be transmitted in tone X, the second symbol group may be transmitted in tone X+6 or X−6, and the third symbol group may be transmitted in tone X. For the second symbol group selection between X+6 or X−6 is done to ensure that the tone lies in the same resource block.

In a third aspect of the second configuration, a first distance between the first tone and the second tone may be one tone and a second distance between the first tone and the third tone may be six tones. Further, UE 1304 may transmit a fourth symbol group 1309 in a fourth tone in a second uplink occasion subsequent to the first uplink occasion. In one aspect, a third distance between the third tone and the fourth tone may be one tone.

For example, the first symbol group may be transmitted in tone X in the first uplink occasion, the second symbol group may be transmitted in tone X+1 in the first uplink occasion, the third symbol group may be transmitted in symbol X+6 in the first uplink occasion, and the fourth symbol group may be transmitted in tone X or X+7 in the second uplink occasion.

NPRACH—Frequency Hopping

Frequency hopping of a NPRACH preamble in a narrowband FDD frame structure may be used by a base station to perform course and fine timing estimation. For example, a first pair of symbol groups may be spaced one subcarrier apart in a first uplink occasion and used for course timing estimation. A second pair of symbol groups may be spaced between five to seven subcarriers apart in a second uplink occasion and used for fine timing estimation. If the same frequency hopping pattern is used for a narrowband TDD frame structure, the base station may have to rely on preambles that are separated in time across different uplink occasions, and hence not provide accurate fine and course timing estimation because the channel conditions may change between uplink occasions.

There is a need for an NPRACH frequency hopping pattern in a narrowband TDD frame structure that supports course and fine timing estimation.

Figure 14:
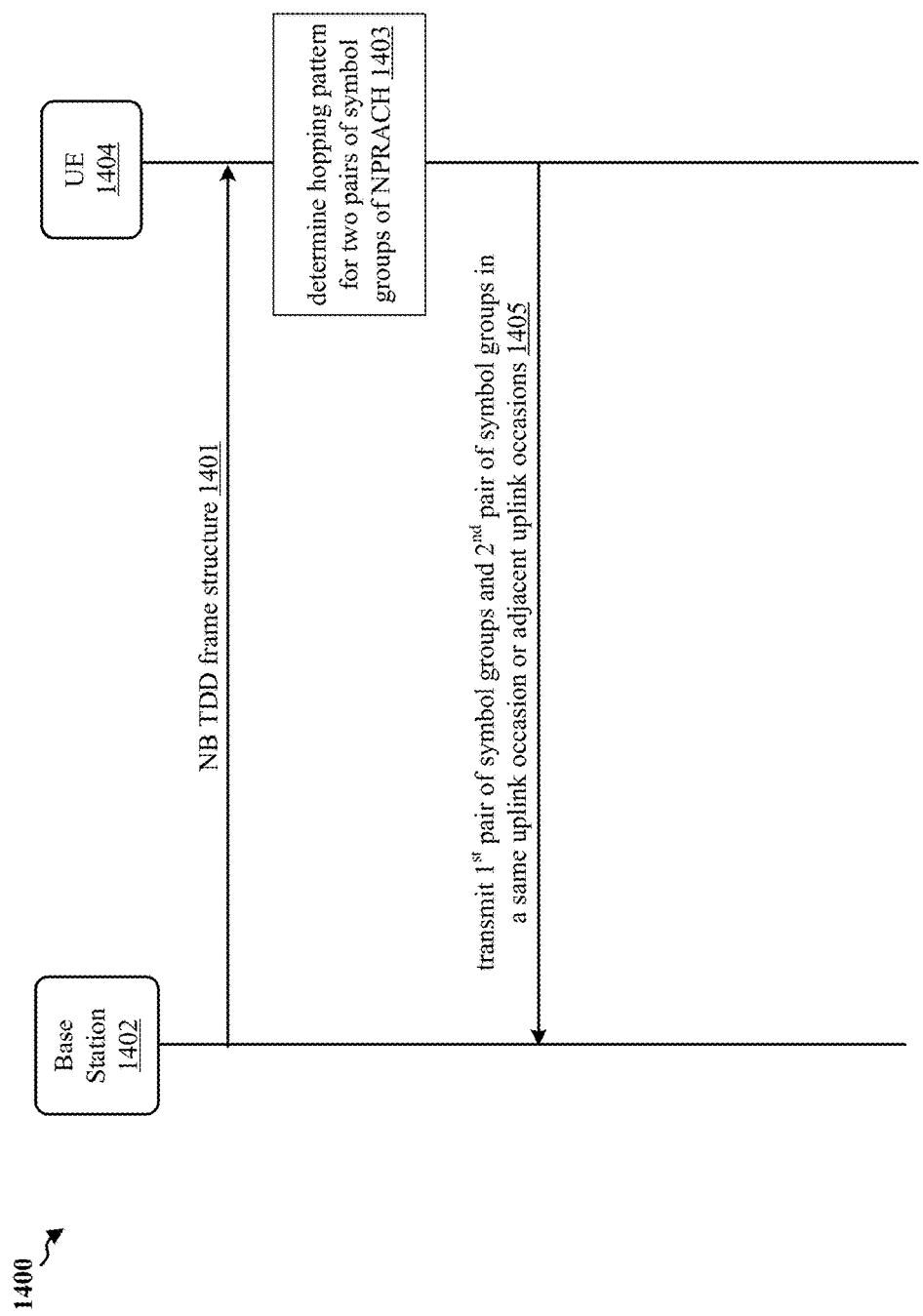
FIG. 14 illustrates a data flow for a narrowband communication system(s) that may support narrowband communications using narrowband TDD frame structures in accordance with certain aspects of the disclosure.

FIG. 14 is a diagram illustrating a flow diagram 1400 for an NPRACH frequency hopping pattern sent from a UE 1404 to a base station 1402 in accordance with certain aspects of the disclosure. Base station 1402 may correspond to, e.g., base station 102, 180, 502, 602, 702, 802, 902, 1002, 1102, 1202, 1302, 3150, 3350, 3550, eNB 310, the apparatus 1702/1702'. UE 1404 may correspond to, e.g., UE 104, 350, 504, 604, 704, 804, 904, 1004, 1104, 1204, 1304, the apparatus 2902/2902', 3102/3102', 3302/3302', 3502/3502'. In addition, the base station 1402 and the UE 1404 may be configured to communicate using narrowband communications (e.g., NB-IoT and/or eMTC). For example, the UE 1404 may be an NB-IoT device and/or an eMTC device.

In one aspect, UE 1404 may receive information 1401 associated with a narrowband TDD frame structure. For example, the UE 1404 may receive information 1401 indicating that the narrowband TDD frame structure is one of configuration 0, 1, 2, 3, 4, 5, 6, 1, or o from table 410 in FIG. 4A.

In another aspect, UE 1404 may determine 1403 a hopping pattern associated with two pairs of symbol groups of an NPRACH transmitted in one or more uplink occasions using the narrowband TDD frame structure.

In a first configuration, the hopping pattern associated with the two pairs of symbol groups may occur in a single uplink occasion. For example, one symbol group in a first pair of symbol groups may be located in subcarrier Z in an uplink occasion and the other symbol group in the first pair of symbol groups may be located in subcarrier Z+1 in the uplink occasion. The first pair of symbol groups may be used by base station 1402 for course timing estimation. In addition, one symbol group in a second pair of symbol groups may be located in subcarrier Z in the uplink occasion and the other symbol group in the second pair of symbol groups may be located in subcarrier Z+6 in the uplink occasion. The second pair of symbol groups may be used by base station 1402 for fine timing estimation.

In a second configuration, the hopping pattern associated with one of the two pairs of symbol groups may occur in a first uplink occasion and the hopping pattern associated with the other of the two pairs of symbol groups may occur in a different uplink occasion. For example, one symbol group in a first pair of symbol groups may be located in subcarrier Z in a first uplink occasion and the other symbol group in the first pair of symbol groups may be located in subcarrier Z+1 in the first uplink occasion. The first pair of symbol groups may be used by base station 1402 for course timing estimation. In addition, one symbol group in a second pair of symbol groups may be located in subcarrier Z in a second uplink occasion (e.g., the next uplink occasion after the first uplink occasion) and the other symbol group in the second pair of symbol groups may be located in subcarrier Z+6 in the second uplink occasion. The second pair of symbol groups may be used by base station 1402 for fine timing estimation.

In a further aspect, UE 1404 may transmit the first pair of symbol groups 1405 and the second pair of symbol groups 1405 in a same uplink occasion or in adjacent uplink occasions in the narrowband TDD frame structure.

Figure 15:
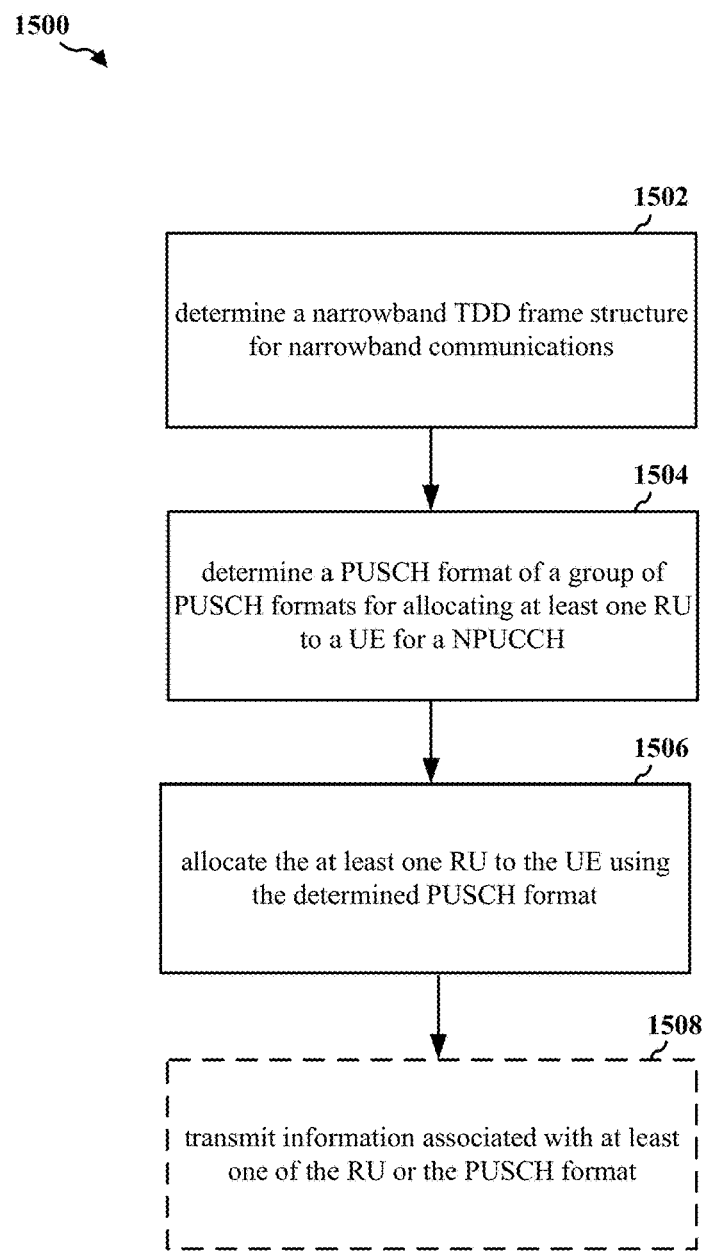
FIG. 15 is a flowchart of a method of wireless communication.

FIG. 15 is a flowchart 1500 of a method of wireless communication. The method may be performed by a base station (e.g., the base station 102, 180, 502, 602, 702, 802, 902, 1002, 1102, 1202, 1302, 1402, 2350, 2950, 3150, 3350, 3550, eNB 310, the apparatus 1702/1702'). In FIG. 15, operations with dashed lines indicate optional operations.

At 1502, the base station may determine a narrowband TDD frame structure for narrowband communications. For example, referring to FIG. 5A, base station 502 may determine 501 a narrowband TDD frame structure for narrowband communications. For example, the base station 502 may determine 501 the narrowband TDD frame structure is one of configuration 0, 1, 2, 3, 4, 5, 6, 1, or o from table 410 in FIG. 4A.

At 1504, the base station may determine a physical uplink shared channel (PUSCH) format of a group of PUSCH formats for allocating at least one RU to a UE for an NPUCCH. For example, referring to FIG. 5A, base station 502 may determine 503 a PUSCH format of a group (e.g., NPUSCH format 1, NPUSCH format 2, or modified PUSCH format 2) for allocating at least one RU to UE 504 for a NPUCCH. For example, base station 502 may determine to use modified NPUSCH format 2 (e.g., see 450 in FIG. 4B) to allocate one or more RUs to UE 504 for a NPUCCH.

At 1506, the base station may allocate the at least one RU to the UE using the determined PUSCH format. In one aspect, the RU may include multiple subcarriers in each of one or more slots. In another aspect, each of the multiple subcarriers may have an associated subcarrier frequency spacing of 3.75 kHz, 7.5 kHz, or 15 kHz. For example, referring to FIG. 5A, base station 502 may allocate 505 the at least one RU to the UE 504 using the determined PUSCH format. In one aspect, the RU may include multiple subcarriers in each of one or more slots. In another aspect, each of the multiple subcarriers may an associated subcarrier frequency spacing of 3.75 kHz, 7.5 kHz, or 15 kHz. For example, base station 502 may allocate two or more subcarriers in one or more slots (e.g., four slots) to the UE 504 for a NPUCCH. If the subcarrier spacing of the narrowband TDD frame structure is 3.75 kHz, base station 502 may allocate one or more RUs in either a single slot or in two slots.

At 1508, the base station may transmit information associated with at least one of the RU or the PUSCH format. For example, referring to FIG. 5A, base station 502 may transmit information 507 indicating the NPUSCH format and the RUs allocated to the UE 504 for the NPUCCH.

Figure 16:
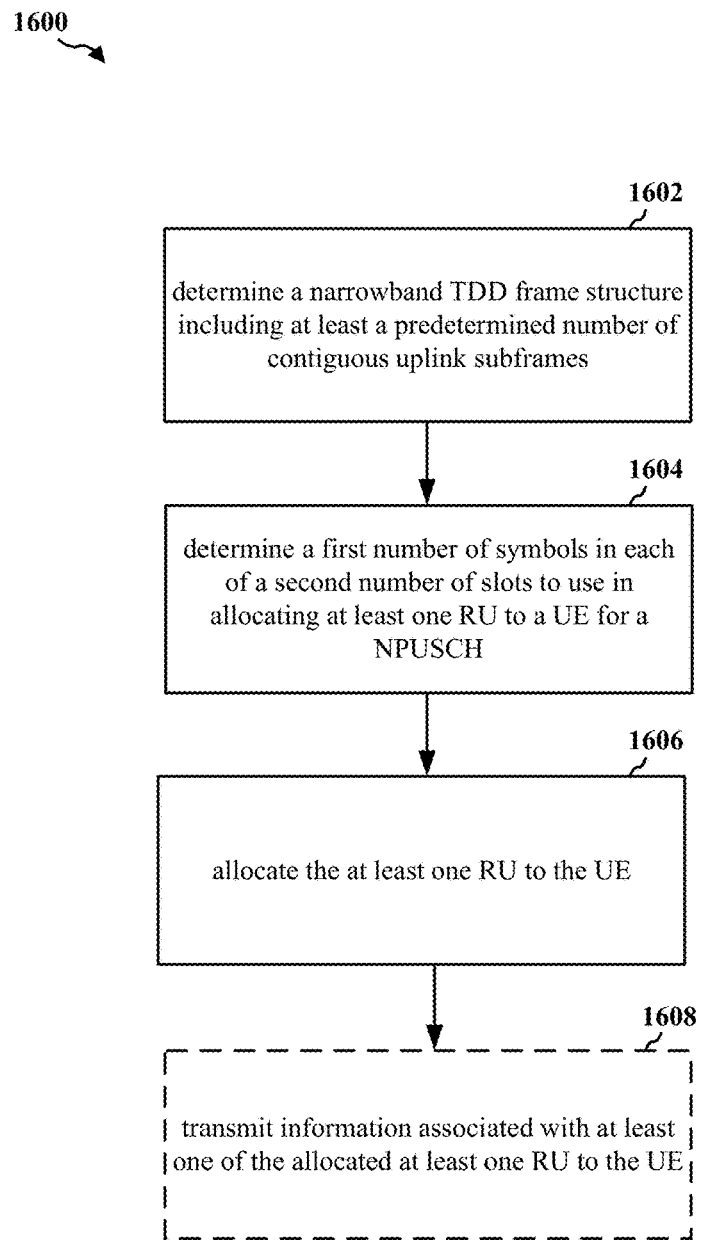
FIG. 16 is a flowchart of a method of wireless communication.

FIG. 16 is a flowchart 1600 of a method of wireless communication. The method may be performed by a base station (e.g., the base station 102, 180, 502, 602, 702, 802, 902, 1002, 1102, 1202, 1302, 1402, 2350, 2950, 3150, 3350, 3550, eNB 310, the apparatus 1702/1702'). In FIG. 16, operations with dashed lines indicate optional operations.

At 1602, the base station may determine a narrowband TDD frame structure including at least a predetermined number of contiguous uplink subframes. For example, referring to FIG. 5B, base station 502 may determine 509 a narrowband TDD frame structure including at least a predetermined number of contiguous uplink subframes. In one aspect, the predetermined number of subframes may include three contiguous uplink subframes each 1 ms in length (e.g., 15 kHz subcarrier spacing). In another aspect, the predetermined number of contiguous uplink subframes may include two contiguous uplink subframes or more than three contiguous uplink subframes. For example, the base station 502 may determine 509 the narrowband TDD frame structure is one of configuration 0 or 6 from table 410 in FIG. 4A when the predetermined number of contiguous uplink subframes is three contiguous uplink subframes.

At 1604, the base station may determine a first number of symbols in each of a second number of slots to use in allocating at least one RU to a UE for a NPUSCH. In one aspect, the first number of symbols and the second number of slots may be based on the predetermined number of contiguous uplink subframes. For example, referring to FIG. 5B, base station 502 may determine 511 a first number of symbols in each of a second number of slots to use in allocating at least one RU to UE 504 for an NPUSCH. In one aspect, the first number of symbols and the second number of slots may be based on the predetermined number of contiguous uplink subframes. In another aspect, each slot in the second number of slots may have an associated subcarrier frequency spacing of 3.75 kHz, 7.5 kHz, or 15 kHz. In a further aspect, each slot in the second number of slots may have an associated subcarrier frequency spacing different than 3.75 kHz, 7.5 kHz, or 15 kHz and is a function of the configuration used for the narrowband TDD subframe structure. Legacy RU allocation units may be units of 2 slots (e.g., one uplink subframe), 4 slots (two uplink subframes), 8 slots (e.g., four uplink subframes), and/or 16 slots (e.g., eight uplink subframes). Each slot may have 7 OFDM symbols. In a first configuration, when configurations 0 or 3 are used as the narrowband TDD frame structure, 3 contiguous uplink subframes with a 3 ms duration are located in each radio frame. In other words, 6 uplink slots may be available in each radio frame for uplink transmission(s). Thus, RU allocation may include 6 slots (e.g., each with 7 OFDM symbols), which may use the available uplink resources in each radio frame more efficiently than by using legacy RU allocation units. In a second configuration, when configuration 6 is used as the narrowband TDD frame structure, 3 contiguous subframes (e.g., 6 slots) are located in the first half frame of a radio frame and 2 contiguous uplink subframes (e.g., 4 slots) are located in the second half frame of the radio frame. In other words, 10 uplink slots may be available in each radio frame for uplink transmission(s). Thus, RU allocation may include 10 slots (e.g., each with 7 OFDM symbols), which may use the available uplink resources in each radio frame more efficiently than by using legacy RU allocation units. In a third configuration, when uplink subframes with a 3.75 kHz subcarrier spacing are used for RU allocation, RU allocation units may include more or fewer than 16 slots (e.g., each with 7 OFDM symbols). An RU allocation of more or fewer than 16 slots may use the available uplink resources in each radio frame more efficiently than by using legacy RU allocation units.

At 1606, the base station may allocate the at least one RU to the UE. For example, referring to FIG. 5B, base station 502 may allocate 513 the at least one RU to the UE 504. In one aspect, the RU may include a single subcarrier or multiple subcarriers in each of one or more slots. In another aspect, each of the multiple subcarriers may an associated subcarrier frequency spacing of 3.75 kHz, 7.5 kHz, or 15 kHz. For example, base station 502 may allocate two or more subcarriers in six slots to the UE 504 for a NPUSCH.

At 1608, the base station may transmit information associated with the at least one RU allocated to the UE. For example, referring FIG. 5B, base station 502 may transmit information 515 indicating the RUs allocated to the UE 504 for the NPUSCH.

Figure 17:
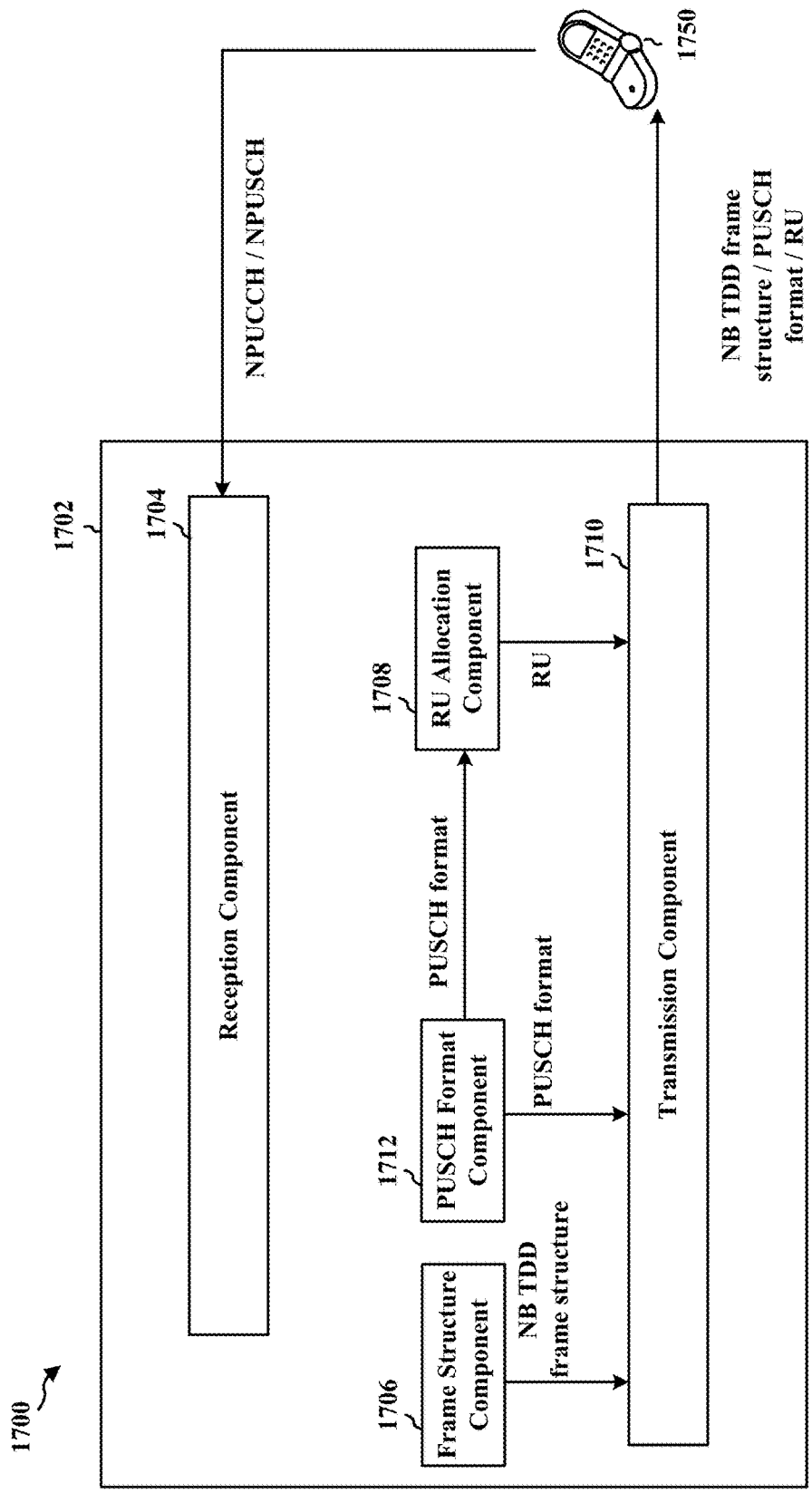
FIG. 17 is a conceptual data flow diagram illustrating the data flow between different means/components in an exemplary apparatus.

FIG. 17 is a conceptual data flow diagram 1700 illustrating the data flow between different means/components in an exemplary apparatus 1702. The apparatus may be a base station (e.g., the base station 102, 180, 502, 602, 702, 802, 902, 1002, 1102, 1202, 1302, 1402, 2350, 2950, 3150, 3350, 3550, eNB 310, the apparatus 1702', 3102/3102') in communication with a UE 1750 (e.g., the UE 104, 350, 504, 604, 704, 804, 904, 1004, 1104, 1204, 1304, 1404 the apparatus 2902/2902', 3102/3102', 3302/3302', 3502/3502').

The apparatus may include a reception component 1704, frame structure component 1706, RU allocation component 1708, transmission component 1710, and/or a PUSCH format component 1712.

In certain configurations, the frame structure component 1706 may be configured to determine a narrowband TDD frame structure for narrowband communications. The frame structure component 1706 may be configured to send a signal associated with the narrowband TDD frame structure to the transmission component 1710.

In certain configurations, the PUSCH format component 1712 may be configured to determine a PUSCH format of a group of PUSCH formats for allocating at least one RU to the UE 1750 for an NPUCCH. The PUSCH component 1712 may be configured to send a signal associated with the PUSCH format to the transmission component 1710 and/or the RU allocation component 1708.

In certain configurations, the RU allocation component 1708 may be configured to allocate the at least one RU to the UE using the determined PUSCH format. In one aspect, the RU may include multiple subcarriers in each of one or more slots. In another aspect, each of the multiple subcarriers may have an associated subcarrier frequency spacing of 3.75 kHz, 7.5 kHz, or 15 kHz. The RU allocation component 1708 may be configured to send a signal associated with the allocated RU that is based on the determined PUSCH format to the transmission component 1710.

In certain configurations, the transmission component 1710 may be configured to transmit information associated with at least one of the RU or the PUSCH format to the UE 1750.

In certain configurations, the reception component 1704 may be configured to receive one or more of a NPUCCH and/or a NPUSCH from the UE 1750.

The apparatus may include additional components that perform each of the blocks of the algorithm in the aforementioned flowchart of FIG. 15. As such, each block in the aforementioned flowcharts of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 18:
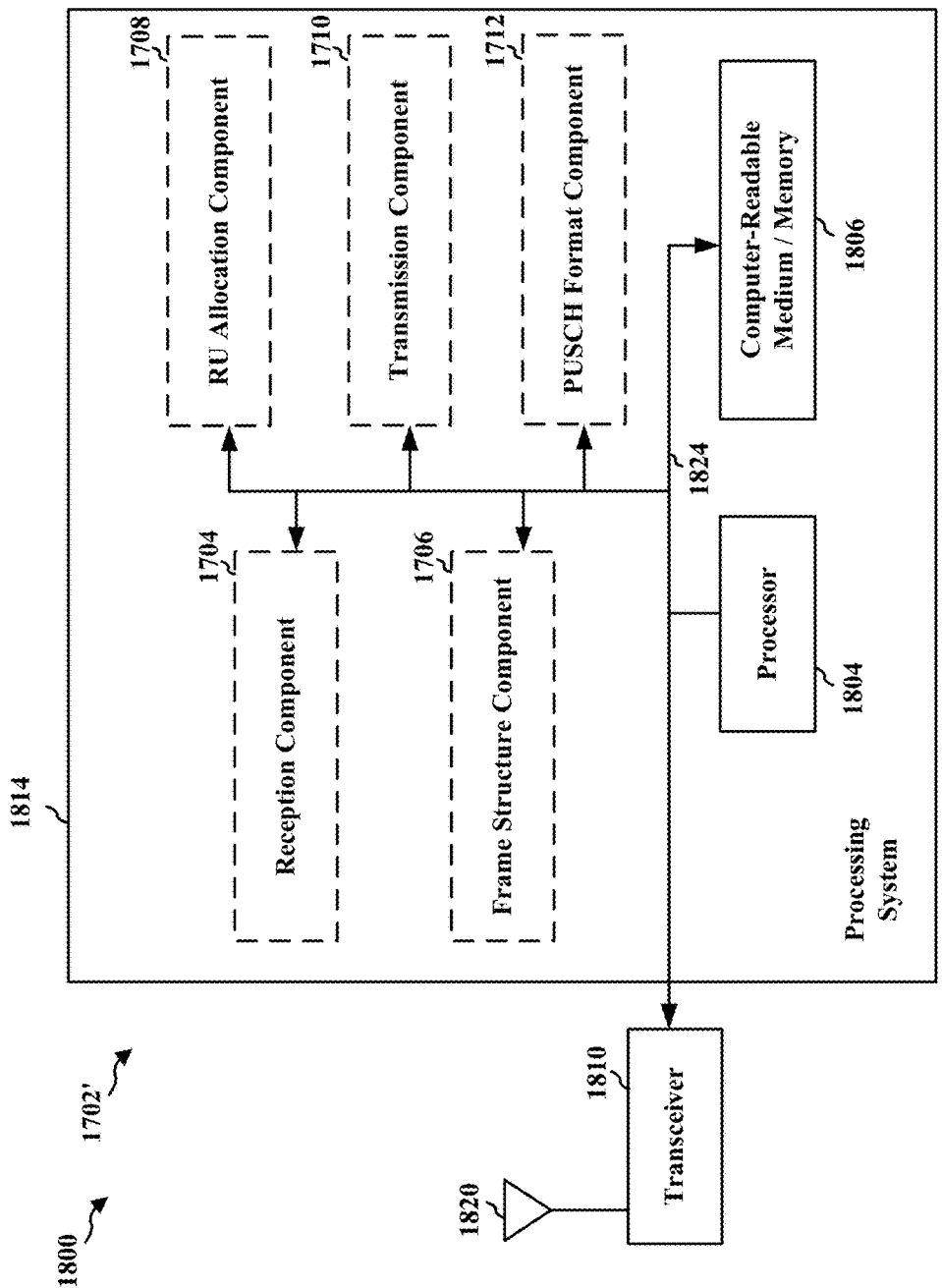
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware components, represented by the processor 1804, the components 1704, 1706, 1708, 1710, 1712 and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception component 1704. In addition, the transceiver 1810 receives information from the processing system 1814, specifically the transmission component 1710, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system 1814 further includes at least one of the components 1704, 1706, 1708, 1710, 1712. The components may be software components running in the processor 1804, resident/stored in the computer readable medium/memory 1806, one or more hardware components coupled to the processor 1804, or some combination thereof. The processing system 1814 may be a component of the eNB 310 and may include the memory 376 and/or at least one of the TX processor 316, the RX processor 370, and the controller/processor 375.

In one configuration, the apparatus 1702/1702' for wireless communication may include means for determining a narrowband TDD frame structure for narrowband communications. In another configuration, the apparatus 1702/1702' for wireless communication may include means for determining a PUSCH format of a group of PUSCH formats for allocating at least one RU to a UE for a narrowband physical uplink control channel NPUCCH. In a further configuration, the apparatus 1702/1702' for wireless communication may include means for allocating the at least one RU to the UE using the determined PUSCH format. In one aspect, the RU may include multiple subcarriers in each of one or more slots. In another aspect, each of the multiple subcarriers may have an associated subcarrier frequency spacing of 3.75 kHz, 7.5 kHz, or 15 kHz. In a further configuration, the apparatus 1702/1702' for wireless communication may include means for transmitting information associated with at least one of the RU or the PUSCH format to the UE. The aforementioned means may be one or more of the aforementioned components of the apparatus 1702 and/or the processing system 1814 of the apparatus 1702' configured to perform the functions recited by the aforementioned means. As described supra, the processing system 1814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 19A:
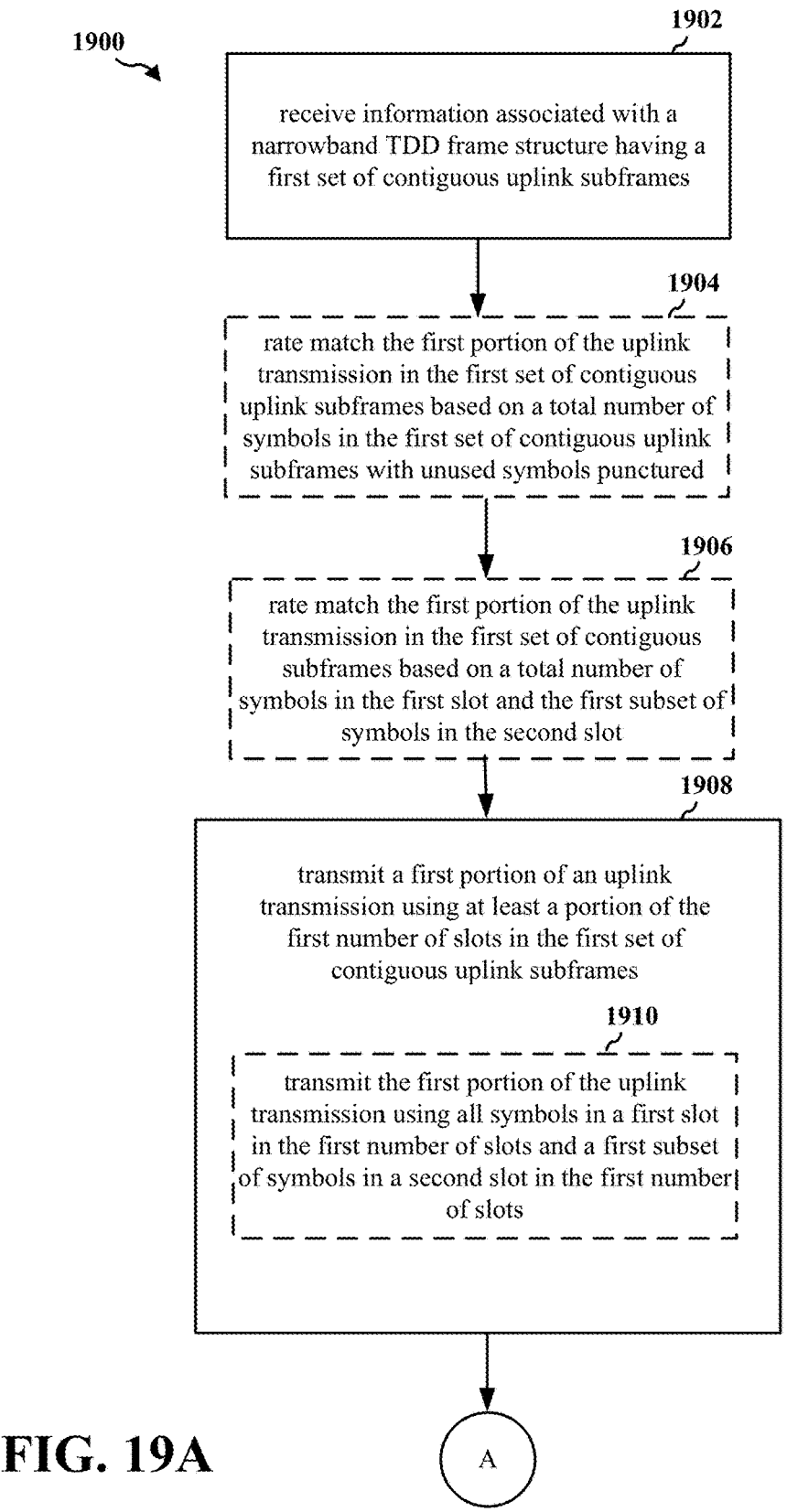
FIG. 19A is a flowchart of a method of wireless communication.
Figure 19B:
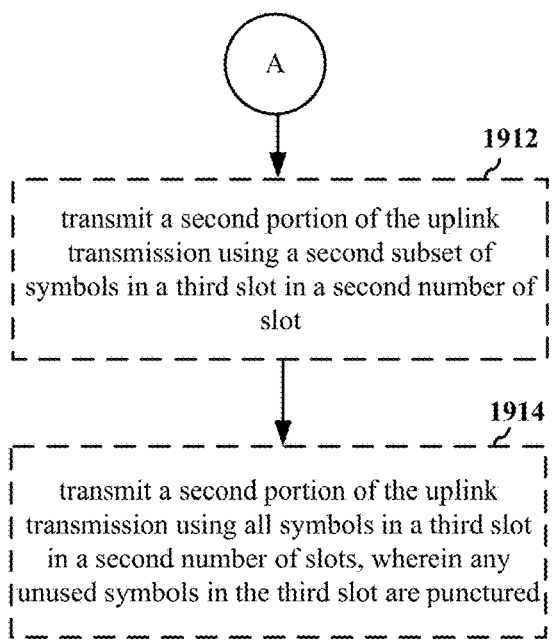
FIG. 19B is a flowchart of a method of wireless communication.

FIGS. 19A and 19B are a flowchart 1900 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502'). In FIG. 19, operations with dashed lines indicate optional operations.

In FIG. 19A, at 1902, the UE may receive information associated with a narrowband TDD frame structure having a first set of contiguous uplink subframes. In one aspect, the first set of contiguous uplink subframes may include a first number of slots. For example, referring to FIG. 6, UE 604 may receive information 601 associated with a narrowband TDD frame structure that has a first set of contiguous uplink subframes with a first number of slots. For example, the narrowband TDD frame structure may be one of configuration 0, 1, 3, 4, or 6 from table 410 in FIG. 4A that each include contiguous uplink subframes. In one aspect, the narrowband TDD frame structure may include a first set of contiguous uplink subframes and a second set of contiguous uplink subframes. For example, the narrowband TDD frame structures that include a first and second set of contiguous uplink subframes may be configuration 0, 1, and/or 6 from table 410 in FIG. 4A. In another aspect, the narrowband TDD frame structure may include a single set of contiguous uplink subframes. For example, the narrowband TDD frame structures that include a single set of contiguous uplink subframes may be configuration 3 and/or 4 from table 410 in FIG. 4A.

In FIG. 19A, at 1904, the UE may rate match the first portion of the uplink transmission in the first set of contiguous uplink subframes based on a total number of symbols in the first set of contiguous uplink subframes. In one aspect, any symbols in the first set of contiguous uplink subframes not used for transmitting the first portion of the uplink transmission may be punctured. In another aspect, the first portion of the uplink transmission may be transmitted using a pilot pattern based on the total number of symbols in the first slot and the second slot with the unused symbols in the second slot punctured. For example, referring to FIG. 6, UE 604 may rate match 603 a first portion of an uplink transmission in the first set of contiguous uplink subframes based on a total number of symbols in the first set of contiguous uplink subframes. Assume that the information 601 received by UE 604 indicates that configuration 1 is used for the narrowband TDD frame structure, and that the duration of the uplink transmission is 3 ms and that each slot has a 2 ms duration (e.g., 3.75 kHz subcarrier spacing). The first set of contiguous subframes in configuration 1 may be subframes 2 and 3, and the total duration of subframes 2 and 3 is 4 ms. Therefore, the uplink transmission with a duration of 3 ms will not occupy all of the symbols in both subframes 2 and 3 because the duration of subframes 2 and 3 (e.g., 4 ms) is longer than the duration of the uplink transmission. In accordance with the second configuration, UE 604 may transmit the first portion of the uplink transmission 605 using all the symbols in subframe 2 and a portion of the symbols (e.g., 0.5 ms/fewer than 7 OFDM symbols) in subframe 3. UE 604 may transmit the second portion of the uplink transmission 607 using a portion of the symbols (e.g., 0.5 ms/fewer than 7 OFDM symbols) in subframe 7. Any unused symbols in subframe 7 may be punctured.

At FIG. 19A, at 1906, the UE may rate match the first portion of the uplink transmission in the first set of contiguous subframes based on a total number of symbols in the first slot and the first subset of symbols in the second slot. In one aspect, the first subset of symbols in the second slot may correspond to symbols available for uplink transmissions. In another aspect, the first portion of the uplink transmission may be transmitted using a pilot pattern based on all the symbols in the first slot and the subset of symbols in the second slot. For example, referring to FIG. 6, UE 604 may rate match 603 the first portion of the uplink transmission 605 in the first set of contiguous uplink subframes based on a total number of symbols (e.g., 7 OFDM symbols) in the first slot and the first subset of symbols in the second slot. Assume that the information 601 received by UE 604 indicates that configuration 1 is used for the narrowband TDD frame structure, and that the duration of the uplink transmission is 3 ms and that each slot has a 2 ms duration (e.g., 3.75 kHz subcarrier spacing). The first set of contiguous subframes in configuration 1 may be subframes 2 and 3, and the total duration of subframes 2 and 3 is 4 ms. Therefore, the uplink transmission with a duration of 3 ms will not occupy all of the symbols in both subframes 2 and 3 because the duration of subframes 2 and 3 (e.g., 4 ms) is longer than the duration of the uplink transmission. In accordance with the second configuration, UE 604 may transmit the first portion of the uplink transmission 605 using all the symbols in subframe 2 and a portion of the symbols (e.g., 0.5 ms/fewer than 7 OFDM symbols) in subframe 3. UE 604 may transmit the second portion of the uplink transmission 607 using a portion of the symbols (e.g., 0.5 ms/fewer than 7 OFDM symbols) in subframe 7.

In FIG. 19A, at 1908, the UE may transmit a first portion of an uplink transmission using at least a portion of the first number of slots in the first set of contiguous uplink subframes. In an aspect, the uplink transmission may have a duration longer than the first set of contiguous uplink subframes. For example, referring to FIG. 6, UE 604 may transmit a first portion of the uplink transmission 605 using a maximum number of full slots in a first set of contiguous uplink subframes (e.g., using all symbols in the first set of contiguous uplink subframes) and transmit a remaining portion of the uplink transmission 607 using at least a portion of one or more slots in a next set of contiguous uplink subframes.

In FIG. 19A, at 1910, the UE may transmit a first portion of an uplink transmission using at least a portion of the first number of slots in the first set of contiguous uplink subframes by transmitting the first portion of the uplink transmission using all symbols in a first slot in the first number of slots and a first subset of symbols in a second slot in the first number of slots. In a further aspect, the first portion of the uplink transmission may be transmitted using all slots in the first set of contiguous uplink subframes. In another aspect, the first set of contiguous uplink subframes and a second set of contiguous uplink subframes may be located in a same radio frame. In still a further aspect, the first set of contiguous uplink subframes and a second set of contiguous uplink subframes are located in different radio frames. For example, referring to FIG. 6, UE 604 may transmit the first portion of the uplink transmission 605 using all available symbols in the slots of the first set of contiguous subframes, and then move to the next set of uplink subframes to transmit a second portion (e.g., remaining portion) of the uplink transmission 607 using available slots in the next set of uplink subframes. In a first example, assume that the information 601 received by UE 604 indicates that configuration 1 is used for the narrowband TDD frame structure, and that the duration of the uplink transmission is eight slots (e.g., four subframes). The first set of contiguous subframes in configuration 1 may be subframes 2 and 3, and the second set of contiguous subframes in configuration 1 may be subframes 7 and 8. Hence, in accordance with the first configuration, UE 604 may transmit the first portion of the uplink transmission 605 using all symbols (e.g., 7 OFDM symbols in each slot or 14 OFDM symbols in total) in both slots in subframe 2 and both slots in subframe 3 in a radio frame. UE 604 may transmit the second portion of the uplink transmission 607 using all symbols (e.g., 7 OFDM symbols in each slot or 14 OFDM symbols in total) in both slots in subframe 7 and both slots in subframe 8 in the first radio frame. However, if the duration of the uplink subframe is 6 slots, then the UE 604 may transmit the first portion of the uplink transmission 605 using all symbols in both slots in subframe 2 and both slots in subframe 3, and the remaining portion of the uplink transmission using the two slots in subframe 7 and not transmit anything in subframe 8.

In FIG. 19B, at 1912, the UE may transmit a second portion of the uplink transmission using a second subset of symbols in a third slot in a second number of slots. In one aspect, the first subset of symbols and the second subset of symbols may be equal to all symbols in an uplink subframe, and the second subset of symbols may be associated with a second set of contiguous uplink subframes. For example, referring to FIG. 6, UE 604 may transmit a second portion of the uplink transmission 607 using a second subset of symbols in a third slot located in a second number of slots (e.g., located in a second set of contiguous uplink subframes). In one aspect, the first subset of symbols and the second subset of symbols may be equal to all symbols in an uplink subframe. In another aspect, the second subset of symbols may be associated with a second set of contiguous uplink subframes.

In FIG. 19B, at 1914, the UE may transmit a second portion of the uplink transmission using all symbols in a third slot in a second number of slots. In one aspect, any unused symbols in the third slot are punctured. For example, referring to FIG. 6, assume that the information 601 received by UE 604 indicates that configuration 1 is used for the narrowband TDD frame structure, and that the duration of the uplink transmission is 3 ms and that each slot has a 2 ms duration (e.g., 3.75 kHz subcarrier spacing). The first set of contiguous subframes in configuration 1 may be subframes 2 and 3, and the total duration of subframes 2 and 3 is 4 ms. Therefore, the uplink transmission with a duration of 3 ms will not occupy all of the symbols in both subframes 2 and 3 because the duration of subframes 2 and 3 (e.g., 4 ms) is longer than the duration of the uplink transmission. In accordance with the second configuration, UE 604 may transmit the first portion of the uplink transmission 605 using all the symbols in subframe 2 and a portion of the symbols (e.g., 0.5 ms/fewer than 7 OFDM symbols) in subframe 3. UE 604 may transmit the second portion of the uplink transmission 607 using a portion of the symbols (e.g., 0.5 ms/fewer than 7 OFDM symbols) in subframe 7. Any unused symbols in subframe 7 may be punctured.

Figure 20:
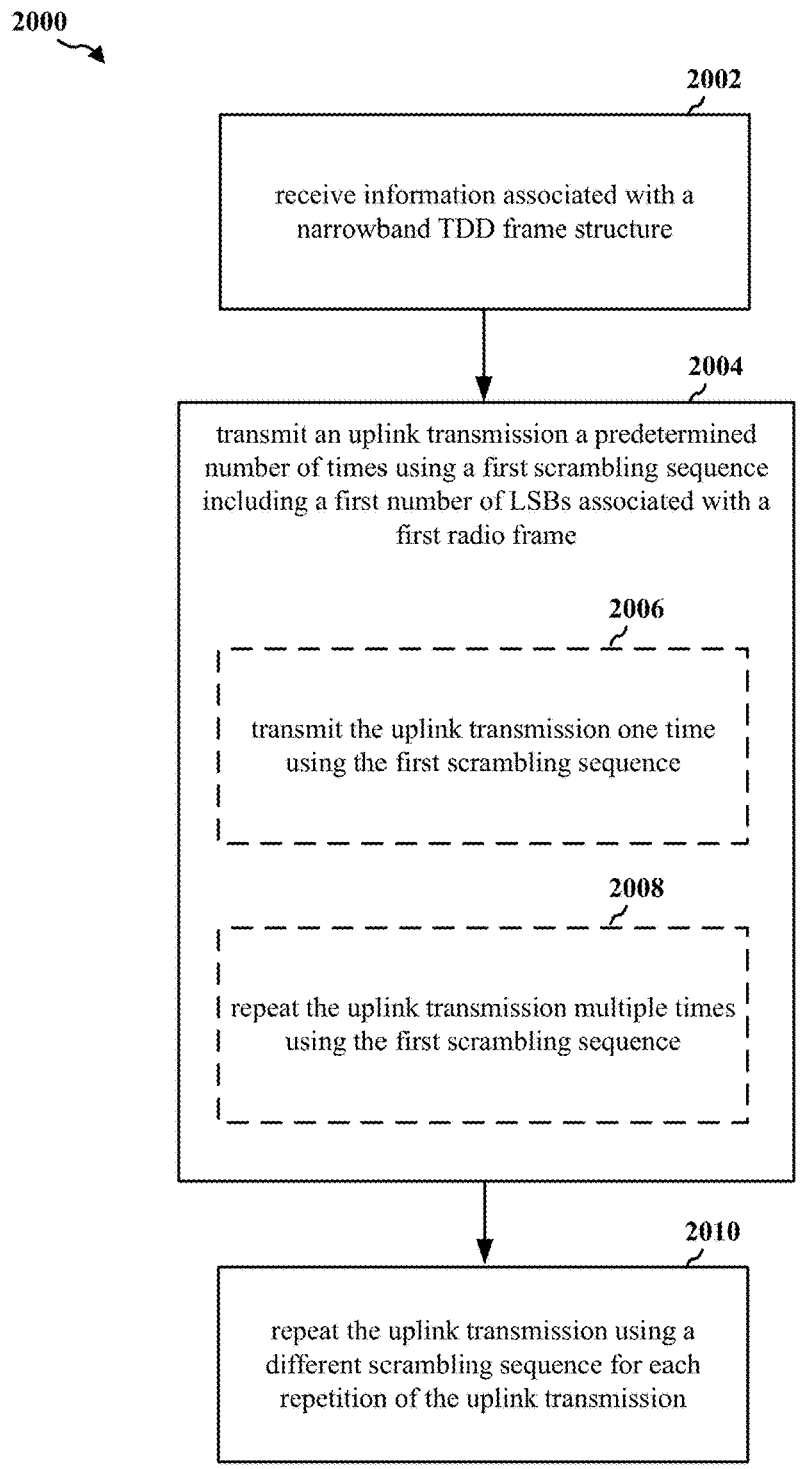
FIG. 20 is a flowchart of a method of wireless communication.

FIG. 20 is a flowchart 2000 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502'). In FIG. 20, operations with dashed lines indicate optional operations.

At 2002, the UE may receive information associated with a narrowband TDD frame structure. For example, referring to FIG. 7, UE 704 may receive information 701 associated with a narrowband TDD frame structure. For example, the narrowband TDD frame structure may be one of configuration 0, 1, 2, 3, 4, 5, 6, 1, or o from table 410 in FIG. 4A.

At 2004, the UE may transmit an uplink transmission a predetermined number of times using a first scrambling sequence. In one aspect, the first scrambling sequence may include a first number of LSBs associated with a first radio frame. In another aspect, the first number of LSBs may be larger than a second number of LSBs used in a second scrambling sequence associated with a narrowband FDD uplink transmission. For example, referring to FIG. 7, UE 704 may transmit an uplink transmission 703 a predetermined number of times using a first scrambling sequence. For example, each uplink transmission may be repeated M number of times with the same scrambling sequence. Repeating the uplink transmission M number of times may aid in combining the uplink transmission by the base station 702 before descrambling, but may come at cost of not randomizing interference. In one aspect, the first scrambling sequence may include a first number of LSBs associated with a first radio frame. In another aspect, the first number of LSBs may be larger than a second number of LSBs used in a second scrambling sequence associated with a narrowband FDD uplink transmission.

At 2006, the UE may transmit the uplink transmission using the first scrambling sequence by transmitting the uplink transmission one time using the first scrambling sequence. For example, referring to FIG. 7, no identical repetitions may be sent (e.g., M=1) by UE 704. In other words, the uplink transmission 703 may be transmitted one time using a unique scrambling sequence.

At 2008, the UE may transmit the uplink transmission using the first scrambling sequence by repeating the uplink transmission multiple times using the first scrambling sequence. In one aspect, a number of times the uplink transmission may be repeated using the first scrambling sequence is associated with the narrowband TDD frame structure or a number of consecutive uplink subframes. For example, referring to FIG. 7, the uplink transmission 703 may be sent Mnumber of times with a same scrambling sequence and then the next M number of repetitions 705 may be transmitted with a different scrambling sequence. M may be a function of the number of contiguous or non-contiguous uplink subframes in a single radio frame.

At 2010, the UE may repeat the uplink transmission. In one aspect, a different scrambling sequence may be used for each repetition of the uplink transmission. For example, referring to FIG. 7, each of the repetitions 705 of the uplink transmission may be sent with a different scrambling sequence.

Figure 21:
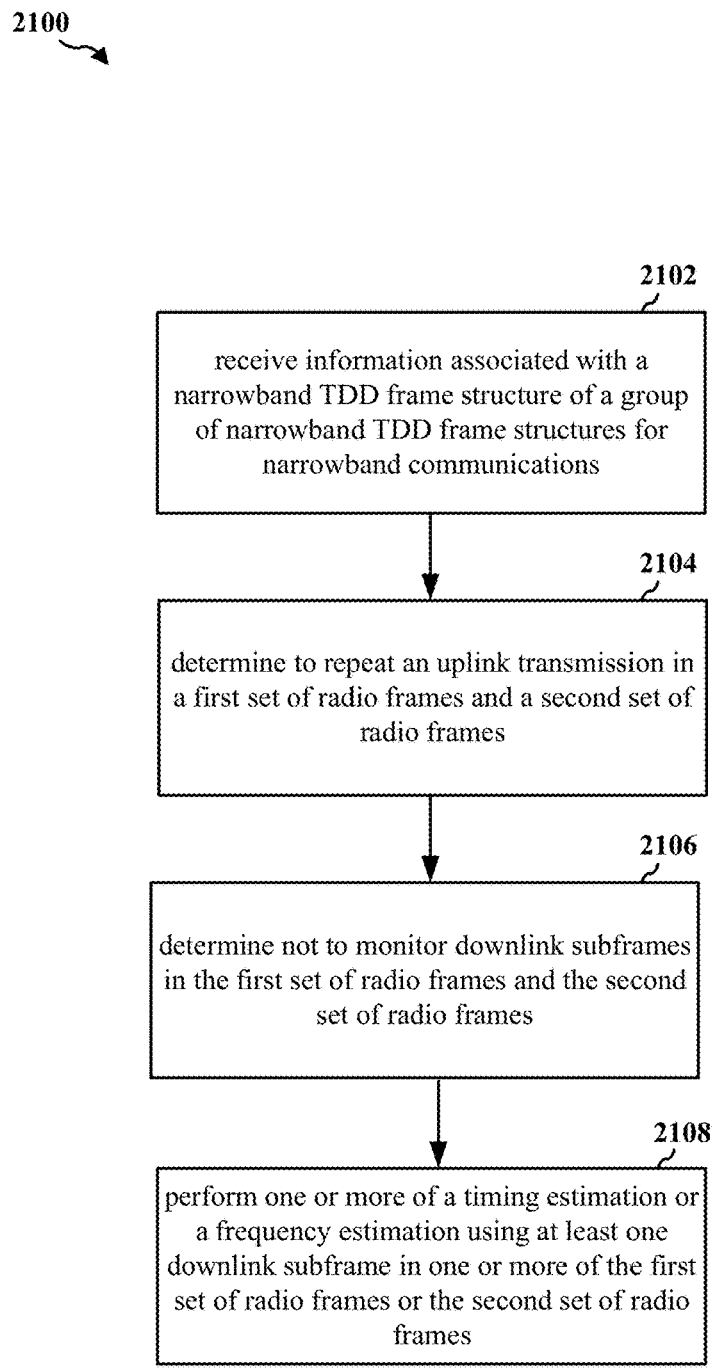
FIG. 21 is a flowchart of a method of wireless communication.

FIG. 21 is a flowchart 2100 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2102, the UE may receive information associated with a narrowband TDD frame structure for narrowband communications. For example, referring to FIG. 8, UE 804 may receive information 801 associated with a narrowband TDD frame structure. For example, the narrowband TDD frame structure may be one of configuration 0, 1, 2, 3, 4, 5, 6, 1, or o from table 410 in FIG. 4A.

At 2104, the UE may determine to repeat an uplink transmission in a first set of radio frames and a second set of radio frames. In one aspect, the first set of radio frames and the second set of radio frames may include a same number of radio frames. In another aspect, the radio frames may be associated with the narrowband TDD frame structure. In a further aspect, the uplink transmission includes a NPRACH preamble. For example, referring to FIG. 8, UE 804 may determine 803 to repeat an uplink transmission in a first set of radio frames and a second set of radio frames. In certain configurations, the first set of radio frames and the second set of radio frames may each include 256 radio frames. In certain other configurations, the first set of radio frames and the second set of radio frames may include more or fewer than 256 radio frames. The first set of radio frames and the second radio frames may include the same number of radio frames or a different number of radio frames. The uplink transmissions may include, for example, a NPRACH preamble.

At 2106, the UE may determine not to monitor downlink subframes in the first set of radio frames and the second set of radio frames. For example, referring to FIG. 8, UE 804 may determine 805 not to monitor downlink subframes in the first set of radio frames and the second set of radio frames. In one aspect, the UE 804 may receive signaling (e.g., not illustrated in FIG. 8) from base station 802 indicating not to monitor at least a portion of the downlink subframes in one or more of the first set of radio frames and/or the second set of radio frames.

At 2108, the UE may perform one or more of a timing estimation or a frequency estimation using at least one downlink subframe in one or more of the first set of radio frames or the second set of radio frames. In one aspect, no time gap may be present between the first set of radio frames and the second set of radio frames and the one or more of the timing estimation or the frequency estimation is performed without using gap information. For example, referring to FIG. 8, UE 804 may perform 807 one or more of a timing estimation or a frequency estimation using at least one downlink subframe in one or more of the first set of radio frames or the second set of radio frames. By not monitoring at least a portion of the downlink subframes in the first radio frame and/or the second radio frame, UE 804 may use the duration of the downlink subframes to perform timing estimation and/or frequency estimation. Timing estimation and/or frequency estimation may be used to synchronize (e.g., subframe synchronization) with base station 802. Because the timing estimation and/or frequency estimation is performed during downlink subframe durations, no time gap may be present between the first set of radio frames and the second set of radio frames. In other words, the timing estimation and/or the frequency estimation may be performed without using a gap between a first set of radio frames and a second set of radio frames.

Figure 22:
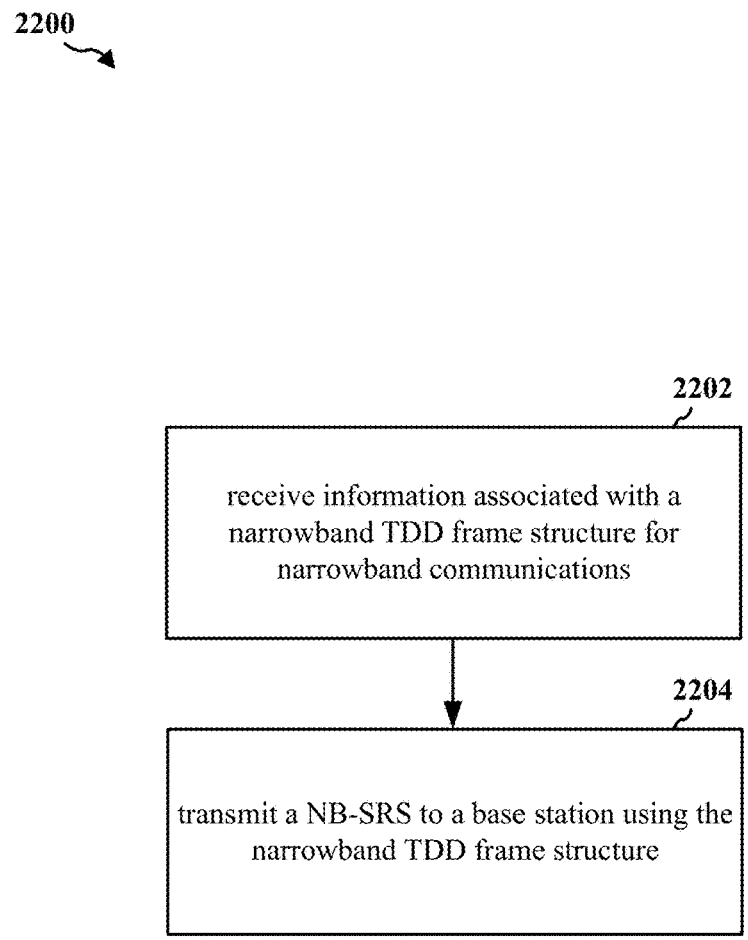
FIG. 22 is a flowchart of a method of wireless communication.

FIG. 22 is a flowchart 2200 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2202, the UE may receive information associated with a narrowband TDD frame structure for narrowband communications. For example, referring to FIG. 9A, UE 904 may receive information 901 associated with a narrowband TDD frame structure. For example, the narrowband TDD frame structure may be one of configuration 0, 1, 2, 3, 4, 5, 6, 1, or o from table 410 in FIG. 4A.

At 2204, the UE may transmit a NB-SRS to a base station using the narrowband TDD frame structure. In one aspect, the NB-SRS may include a single tone SRS. In another aspect, the NB-SRS may be transmitted as a series of uplink transmissions that use frequency hopping to cover a system bandwidth associated with the narrowband communications. In a further aspect, the NB-SRS may be transmitted in an uplink portion of a special subframe. In still another aspect, the NB-SRS may be multiplexed with a legacy SRS in the uplink portion of the special subframe. For example, referring to FIG. 9A, UE 904 may transmit an NB-SRS 903 to base station 902 using the narrowband TDD frame structure. In one aspect, the NB-SRS 903 comprises a single tone SRS. In another aspect, the NB-SRS 903 may be transmitted as a series of uplink transmissions that use frequency hopping to cover a system bandwidth associated with the narrowband communications. In yet another aspect, the NB-SRS 903 may be transmitted in an uplink portion of a special subframe. Still further, the NB-SRS 903 may be multiplexed with a legacy SRS in the uplink portion of the special subframe, as discussed supra with respect to FIG. 9B.

Figure 23:
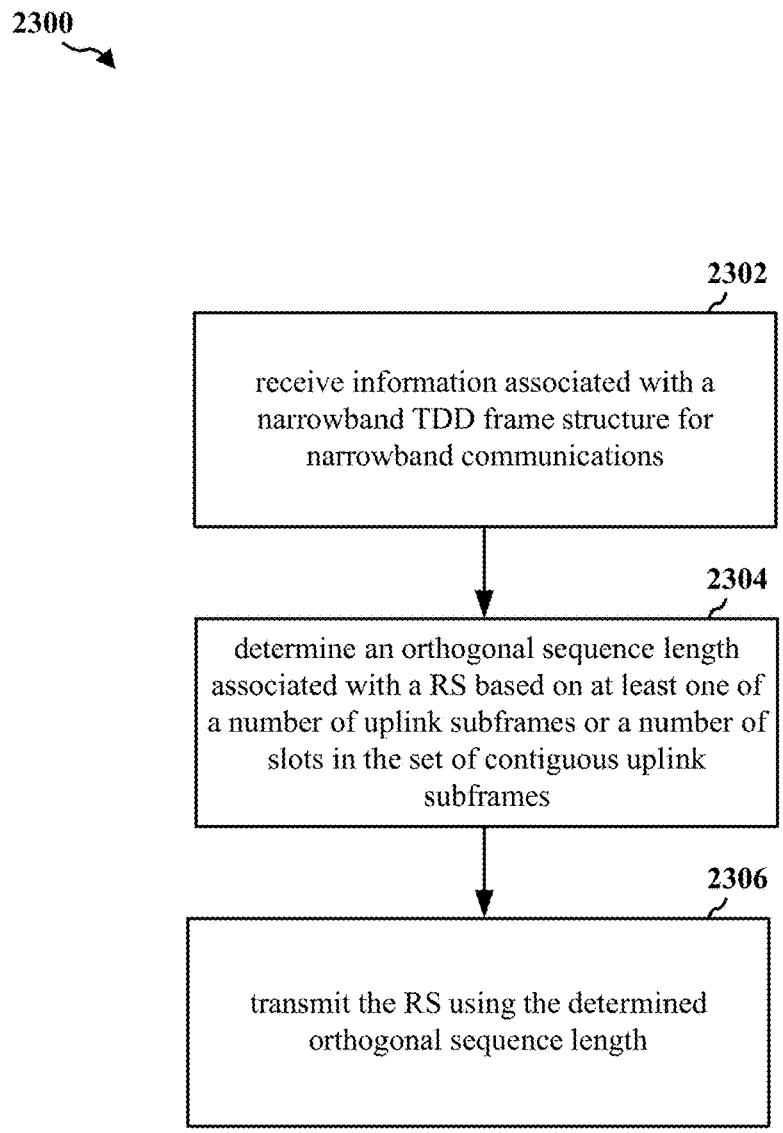
FIG. 23 is a flowchart of a method of wireless communication.

FIG. 23 is a flowchart 2300 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2302, the UE may receive information associated with a narrowband TDD frame structure for narrowband communications. In one aspect, the narrowband TDD frame structure may include a set of contiguous uplink subframes. For example, referring to FIG. 10A, UE 1004 may receive information 1001 associated with a narrowband TDD frame structure. For example, the UE 1004 may receive information 1001 indicating that the narrowband TDD frame structure is one of configuration 0, 1, 2, 3, 4, 5, 6, 1, or o from table 410 in FIG. 4A. In one aspect, the information 1001 may indicate a narrowband TDD frame structure that includes a set of contiguous uplink subframes. When the information 1001 indicates that the narrowband TDD frame structure includes a set of contiguous uplink subframes, the narrowband TDD frame structure may be one of configuration 0, 1, 3, 4, or 6 from table 410 in FIG. 4A. Each of configurations 0, 1, 3, 4, or 6 include at least two or more contiguous uplink subframes.

At 2304, the UE may determine an orthogonal sequence length associated with a RS based on at least one of a number of uplink subframes or a number of slots in the set of contiguous uplink subframes. For example, referring to FIG. 10A, UE 1004 may determine 1003 an orthogonal sequence length associated with an NRS based on at least one of a number of uplink subframes or a number of slots in the set of contiguous uplink subframes. For example, assume that the information 1001 received by UE 1004 indicates that configuration 1 is used as the narrowband TDD frame structure. As seen in FIG. 4A, configuration 1 has a set of 2 contiguous uplink subframes (e.g., subframes 2 and 3). The set of 2 contiguous uplink subframes has 4 slots. Hence, UE 1004 may determine 1003 that the orthogonal sequence length associated with the NRS is length 4. Alternatively, when the narrowband TDD frame structure has a single uplink subframe (e.g., configuration 5), the orthogonal sequence length of the NRS may be length 2 as based on the number of slots in the single uplink subframe (e.g., 2 slots).

At 2306, the UE may transmit the RS using the determined orthogonal sequence length. For example, referring to FIG. 10A, UE 1004 may transmit the NRS 1005 using the determined orthogonal sequence length. For example, the NRS 1005 may be transmitted using a NPUCCH format 1 pilot structure. In one aspect, the NRS 1005 may be transmitted using a modified NPUCCH format 1 pilot structure that includes an increased pilot density per slot than the pilot density used in legacy NPUCCH format 1. For example, the modified NPUCCH format 1 may include two pilots per slot rather than one pilot per slot as in legacy NPUCCH format 1.

Figure 24:
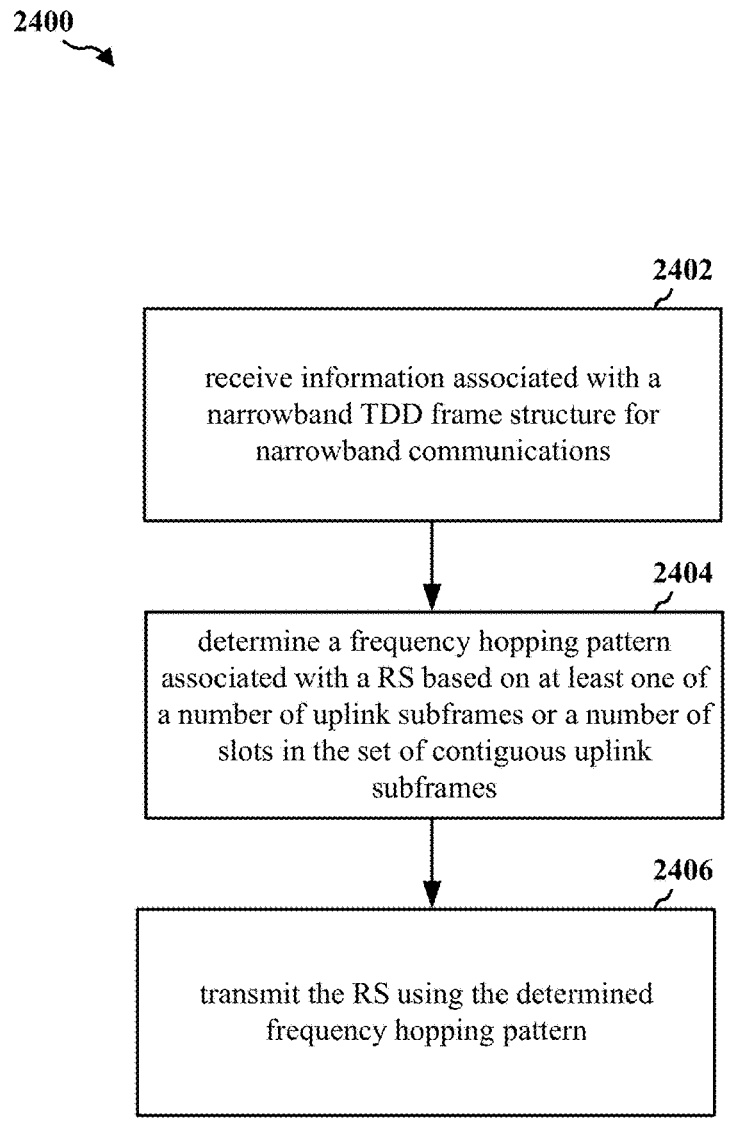
FIG. 24 is a flowchart of a method of wireless communication.

FIG. 24 is a flowchart 2400 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2402, the UE may receive information associated with a narrowband TDD frame structure for narrowband communications. For example, referring to FIG. 10B, UE 1004 may receive information 1001 associated with a narrowband TDD frame structure. For example, the UE 1004 may receive information 1001 indicating that the narrowband TDD frame structure is one of configuration 0, 1, 2, 3, 4, 5, 6, 1, or o from table 410 in FIG. 4A.

At 2404, the UE may determine a sequence hopping pattern associated with a RS based on at least one of a number of uplink subframes, a number of slots in the set of contiguous uplink subframes, or a radio frame number. For example, referring to FIG. 10B, UE 1004 may determine 1007 a sequence-hopping pattern associated with a NRS based on at least one of a number of uplink subframes, a number of slots in the set of contiguous uplink subframes, or a radio frame number. For example, the sequence-hopping pattern may be a function of one or more LSBs associated with a radio frame number. By using a sequence-hopping pattern that is based on at least one of a number of uplink subframes, a number of slots in a set of contiguous uplink subframes, or a radio frame number, diversity may be increased as compared to using a sequence-hopping pattern that is only a function of the slot number.

At 2406, the UE may transmit the RS using the determined sequence hopping pattern. For example, referring to FIG. 10B, UE 1004 may transmit the NRS 1009 using the determined sequence-hopping pattern.

Figure 25:
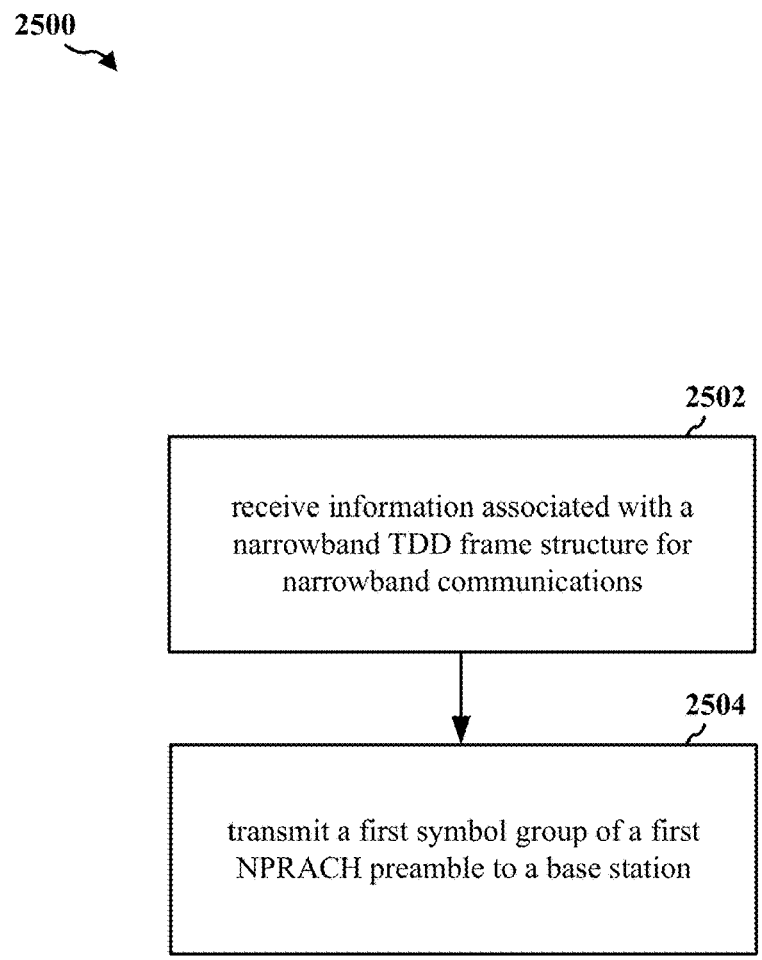
FIG. 25 is a flowchart of a method of wireless communication.

FIG. 25 is a flowchart 2500 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2502, the UE may receive information associated with a narrowband TDD frame structure for narrowband communications. For example, referring to FIG. 11, UE 1104 may receive information 1101 associated with a narrowband TDD frame structure. For example, the UE 1104 may receive information 1101 indicating that the narrowband TDD frame structure is one of configuration 0, 1, 2, 3, 4, 5, 6, 1, or o from table 410 in FIG. 4A.

At 2504, the UE may transmit a first symbol group of a first NPRACH preamble to a base station. In one aspect, a first length of the first symbol group may be associated with the narrowband TDD frame structure. In one aspect, the first length of the first symbol group may be shorter than a second length of a second symbol group of a second NPRACH preamble transmitted using a narrowband FDD frame structure. In another aspect, the first length of the first symbol group is longer than a second length of a second symbol group of a second NPRACH preamble transmitted using a narrowband FDD frame structure. In a further aspect, a first preamble format associated with the first NPRACH preamble may be different than a second preamble format associated with a second NPRACH preamble transmitted using a narrowband FDD frame structure. In still another aspect, the first length of the first symbol group may be associated with one or more uplink durations of the narrowband TDD frame structure. In certain aspects, the first length of the first symbol group may be selected such that N symbol groups can be transmitted on N subframes as described below.

For example, referring to FIG. 11, UE 1104 may transmit a first symbol group 1103 of a first NPRACH preamble to base station 1102. In one aspect, a first length of the first symbol group may be associated with the narrowband TDD frame structure. In a first configuration, the first length of the first symbol group may be shorter than a second length of a second symbol group of a second NPRACH preamble transmitted using a narrowband FDD frame structure. In one aspect, the first length may be reduced so repetitions of uplink transmission fit in a narrowband TDD frame structure. For example, if the first length is reduced from 1.4 ms/1.6 ms (e.g., the lengths used for narrowband FDD frame structures) to 1 ms, UE 1104 may be able to accommodate 2 symbol groups in a 2 ms uplink occasion (e.g., a single uplink subframe or a set of contiguous uplink subframes) and 3 symbol groups in a 3 ms uplink occasion. A special subframe may be located before certain uplink occasions, and the timing uncertainty associated with the NPRACH may be accommodated by the special subframe located before the uplink occasion. Reducing the length of the NPRACH preamble may also enable 1 symbol group to fit within 1 uplink subframe which may be useful when configuration 2 is used for the narrowband TDD frame structure. In a second configuration, the first length of the first symbol group may be longer than a second length of a second symbol group of a second NPRACH preamble transmitted using a narrowband FDD frame structure. In one aspect, the first length may be may be increased so repetitions of uplink transmission fit in a narrowband TDD frame structure. For example, the UE 1104 may increase the symbol group size to 2 ms and accommodate 1 uplink symbol group in a 2 ms uplink occasion. Transmitting the same size symbol group in a 2 ms uplink occasion using the symbol group size associated with narrowband FDD frame structures may lead to wastage of 0.6 ms/0.4 ms of the 2 ms uplink occasion since the symbol group length in narrowband FDD frame structures is 1.4 ms/1.6 ms. In a third configuration, a first preamble format associated with the first NPRACH preamble may be different than a second preamble format associated with a second NPRACH preamble transmitted using a narrowband FDD frame structure. In a fourth configuration, the first length of the first symbol group may be associated with one or more uplink occasions in the narrowband TDD frame structure. For example, the first length of the first symbol group may be a function of the configuration used for the narrowband TDD frame structure.

Figure 26:
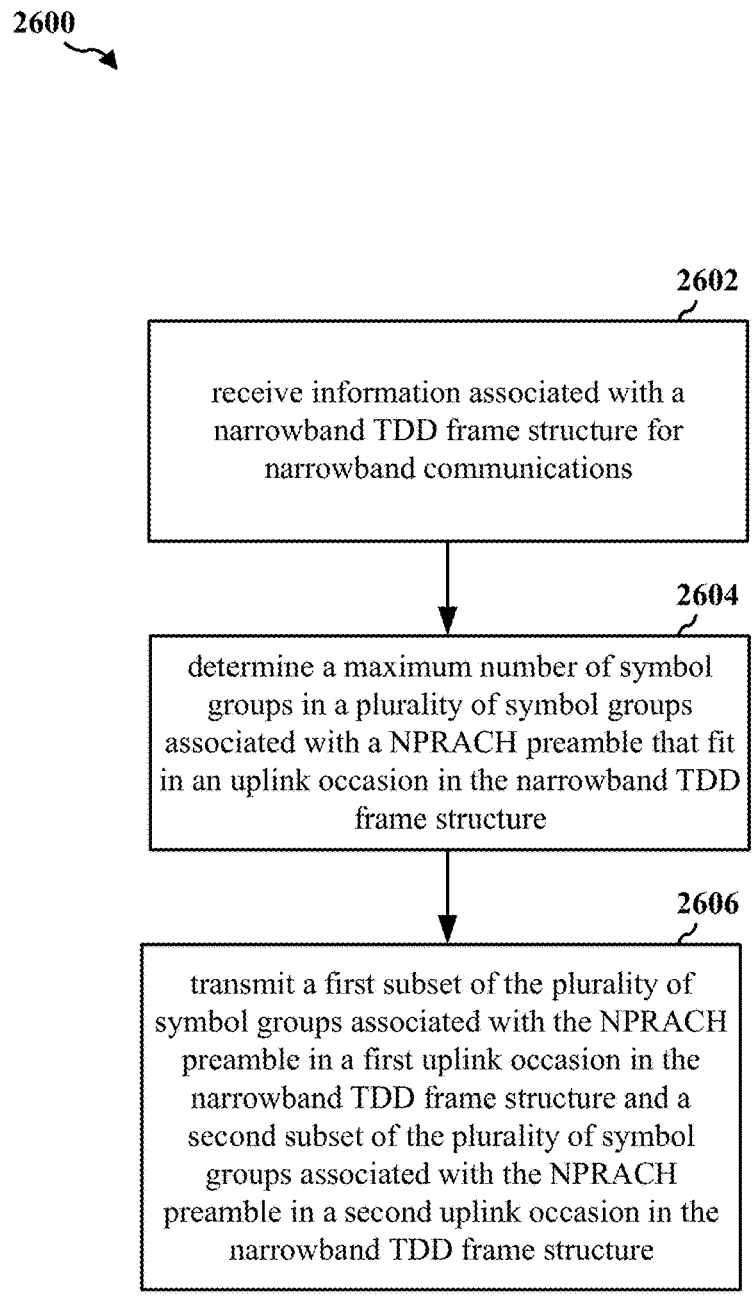
FIG. 26 is a flowchart of a method of wireless communication.

FIG. 26 is a flowchart 2600 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2602, the UE may receive information associated with a narrowband TDD frame structure for narrowband communications. For example, referring to FIG. 12, UE 1204 may receive information 1201 associated with a narrowband TDD frame structure. For example, the UE 1204 may receive information 1201 indicating that the narrowband TDD frame structure is one of configuration 0, 1, 2, 3, 4, 5, 6, 1, or o from table 410 in FIG. 4A.

At 2604, the UE may determine a maximum number of symbol groups in a plurality of symbol groups associated with a NPRACH preamble that fit in an uplink occasion in the narrowband TDD frame structure. In one aspect, the plurality of symbol groups may include four symbol groups. In another aspect, a length of a symbol group may be a function of the narrowband TDD frame structure. For example, referring to FIG. 12, UE 1204 may determine a maximum number of symbol groups in a plurality of symbol groups associated with an NPRACH preamble that fit in an uplink occasion in the narrowband TDD frame structure. In a first configuration, the NPRACH preamble for a narrowband TDD frame structure may include a fixed number of repetitions for the symbol group, and UE 1204 may fit the symbol group repetitions across different uplink occasions serially, fitting as many repetitions as can fit in each uplink occasion. In a second configuration, the number of repetitions for the symbol group and the sequence-hopping pattern of the NPRACH preamble may be the same as the number of repetitions and the sequence-hopping pattern used for a narrowband FDD frame structure. In a third configuration, the number of repetitions of the symbol group may be a function of the configuration used for the narrowband TDD frame structure.

At 2606, the UE may transmit a first subset of the plurality of symbol groups associated with the NPRACH preamble in a first uplink occasion in the narrowband TDD frame structure and a second subset of the plurality of symbol groups associated with the NPRACH preamble in a second uplink occasion in the narrowband TDD frame structure. In one aspect, the first subset may include the maximum number of symbol groups. In another aspect, the second subset may include any remaining symbol groups in the plurality of symbol groups or the maximum number of symbol groups. For example, referring to FIG. 12, UE 1204 may transmit a first subset of the plurality of symbol groups 1205 associated with the NPRACH preamble in a first uplink occasion in the narrowband TDD frame structure and a second subset of the plurality of symbol groups 1205 associated with the NPRACH preamble in a second uplink occasion in the narrowband TDD frame structure. In a first aspect, the first subset may include the maximum number of symbol groups. In a second aspect, the second subset may include any remaining symbol groups in the plurality of symbol groups or the maximum number of symbol groups. In one aspect, a distance between tones used to transmit each symbol group in the plurality of symbol groups may be associated with the narrowband TDD frame structure.

Figure 27:
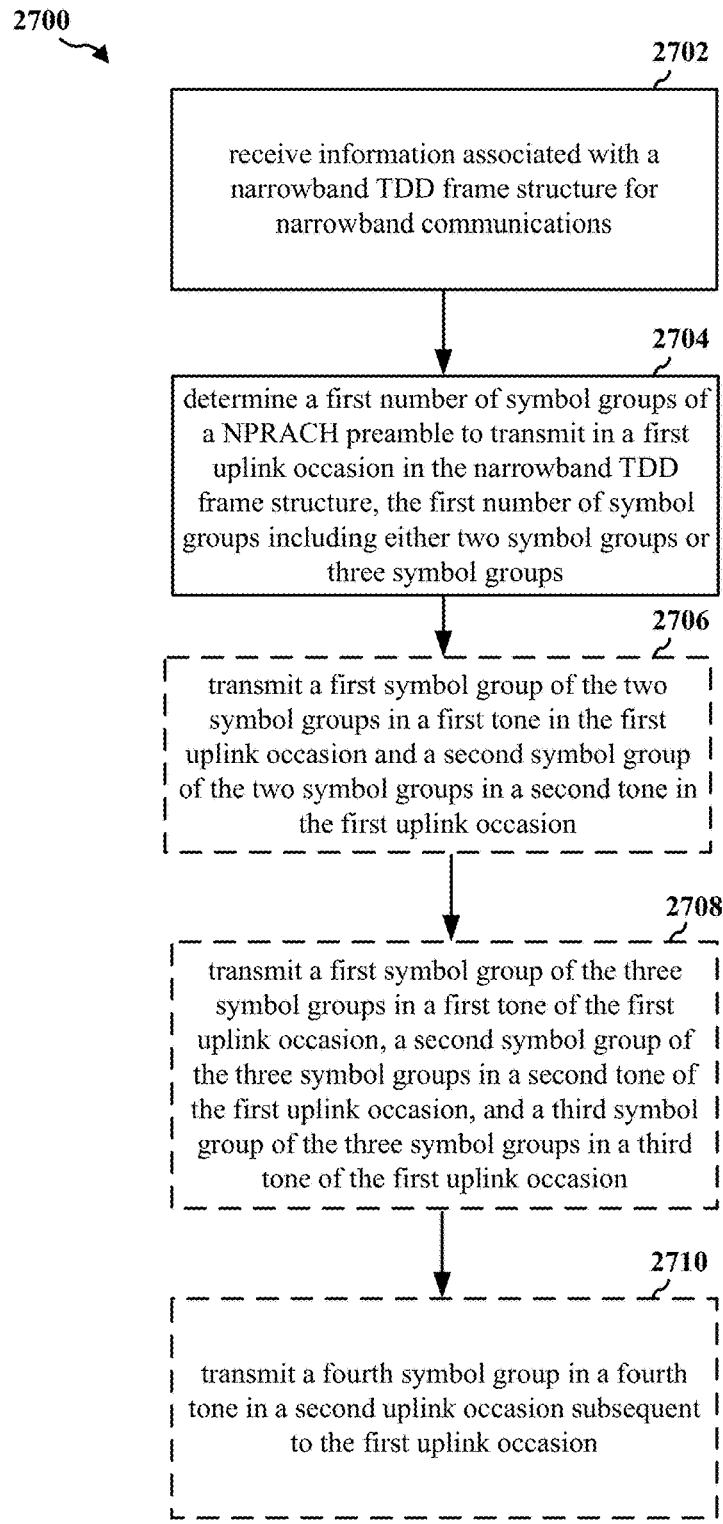
FIG. 27 is a flowchart of a method of wireless communication.

FIG. 27 is a flowchart 2700 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502'). In FIG. 27, operations with dashed lines indicate optional operations.

At 2702, the UE may receive information associated with a narrowband TDD frame structure for narrowband communications. For example, referring to FIG. 13, UE 1304 may receive information 1301 associated with a narrowband TDD frame structure. For example, the UE 1304 may receive information 1301 indicating that the narrowband TDD frame structure is one of configuration 0, 1, 2, 3, 4, 5, 6, 1, or o from table 410 in FIG. 4A.

At 2704, the UE may determine a first number of symbol groups of a NPRACH preamble to transmit in a first uplink occasion in the narrowband TDD frame structure. In one aspect, the first number of symbol groups may include either two symbol groups or three symbol groups. For example, referring to FIG. 13, UE 1304 may determine 1303 a first number of symbol groups of a NPRACH preamble to transmit in a first uplink occasion in the narrowband TDD frame structure.

When the first number of symbol groups includes two symbol groups, at 2706, the UE may transmit a first symbol group of the two symbol groups in a first tone in the first uplink occasion and a second symbol group of the two symbol groups in a second tone in the first uplink occasion. In one aspect, a distance between the first tone and the second tone may be either one tone or six tones. For example, referring to FIG. 13, the first number of symbol groups may include two symbol groups in a first configuration. In the first configuration, UE 1304 may transmit a first symbol group 1305 in a first tone in the first uplink occasion and a second symbol group 1305 in a second tone in the first uplink occasion. In a first aspect of the first configuration, a distance between the first tone and the second tone may be one tone (e.g., one OFDM symbol). For example, the first symbol group may be transmitted in tone X and the second symbol group may be transmitted in tone X+1. In a second aspect of the first configuration, a distance between the first tone and the second tone may be six tones (e.g., six OFDM symbols). For example, the first symbol group may be transmitted in tone X and the second symbol group may be transmitted in tone X+6.

When the first number of symbol groups includes three symbol groups, at 2708, the UE may transmit a first symbol group of the three symbol groups in a first tone of the first uplink occasion, a second symbol group of the three symbol groups in a second tone of the first uplink occasion, and a third symbol group of the three symbol groups in a third tone of the first uplink occasion. In one aspect, a first distance between tones used for at least one pair of the symbol groups may be one tone, and a second distance between tones used for another pair of the symbol groups may be six tones. For example, referring to FIG. 13, UE 1304 may transmit a first symbol group 1307 of the three symbol groups in a first tone of the first uplink occasion, a second symbol group 1307 of the three symbol groups in a second tone of the first uplink occasion, and a third symbol group 1307 of the three symbol groups in a third tone of the first uplink occasion. In one aspect, the first symbol group may be transmitted in tone X in the first uplink occasion, the second symbol group may be transmitted in tone X+1 in the first uplink occasion, and the third symbol group may be transmitted in symbol X+6 in the first uplink occasion.

At 2710, the UE may transmit a fourth symbol group in a fourth tone in a second uplink occasion subsequent to the first uplink occasion. In one aspect, a third distance between the third tone and the fourth tone may be one tone. For example, referring to FIG. 13, UE 1304 may transmit a fourth symbol group 1309 in a fourth tone in a second uplink occasion subsequent to the first uplink occasion. In one aspect, a third distance between the third tone and the fourth tone may be one tone. The first symbol group may be transmitted in tone X in the first uplink occasion, the second symbol group may be transmitted in tone X+1 in the first uplink occasion, the third symbol group may be transmitted in symbol X+6 in the first uplink occasion, and the fourth symbol group may be transmitted in tone X or X+7 in the second uplink occasion.

Figure 28:
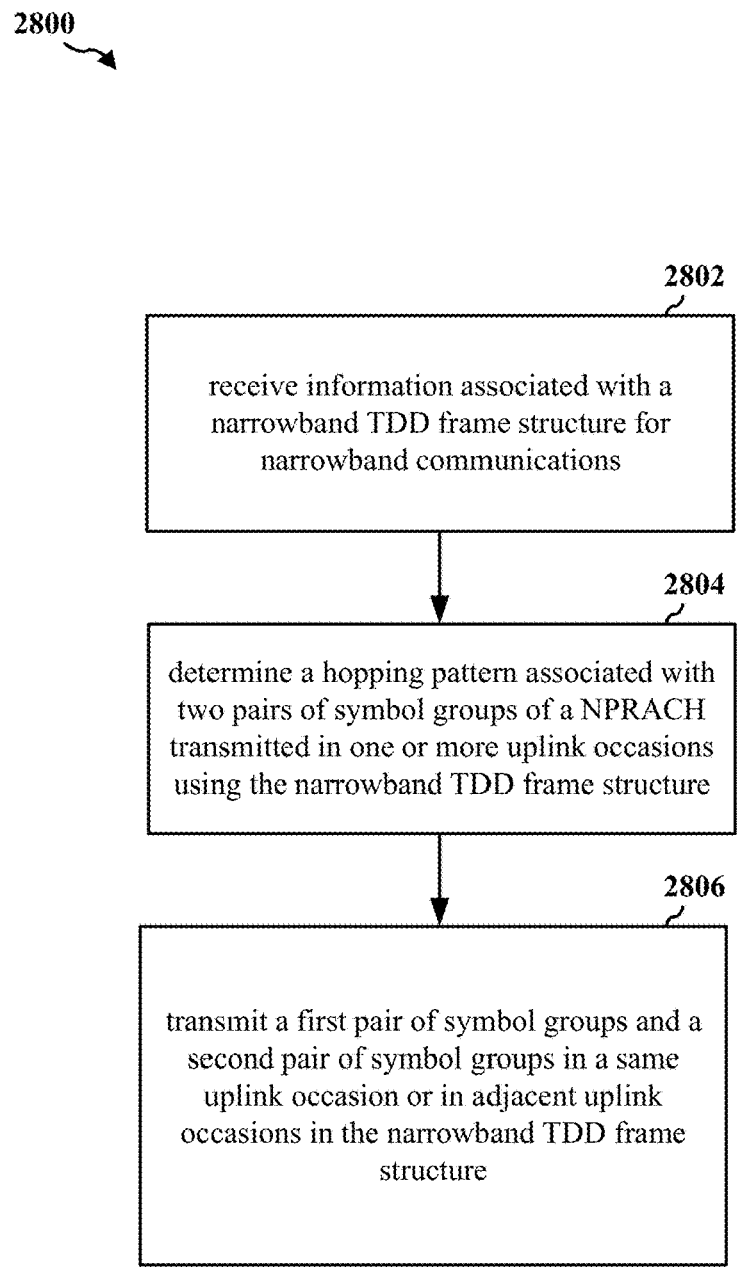
FIG. 28 is a flowchart of a method of wireless communication.

FIG. 28 is a flowchart 2800 of a method of wireless communication. The method may be performed by a UE (e.g., the UE 104, 350, 504, 604, 704, 804, 904, 1004, 1104, 1204, 1304, 1404, the apparatus 2902/2902', 3102/3102', 3302/3302', 3502/3502').

At 2802, the UE may receive information associated with a narrowband TDD frame structure for narrowband communications. For example, referring to FIG. 14, UE 1404 may receive information 1401 associated with a narrowband TDD frame structure. For example, the UE 1404 may receive information 1401 indicating that the narrowband TDD frame structure is one of configuration 0, 1, 2, 3, 4, 5, 6, 1, or o from table 410 in FIG. 4A.

At 2804, the UE may determine a hopping pattern associated with two pairs of symbol groups of a NPRACH transmitted in one or more uplink occasions using the narrowband TDD frame structure. For example, referring to FIG. 14, UE 1404 may determine 1403 a hopping pattern associated with two pairs of symbol groups of an NPRACH transmitted in one or more uplink occasions using the narrowband TDD frame structure. In a first configuration, the hopping pattern associated with the two pairs of symbol groups may occur in a single uplink occasion. For example, one symbol group in a first pair of symbol groups may be located in subcarrier Z in an uplink occasion and the other symbol group in the first pair of symbol groups may be located in subcarrier Z+1 in the uplink occasion. The first pair of symbol groups may be used by base station 1402 for course timing estimation. In addition, one symbol group in a second pair of symbol groups may be located in subcarrier Z in the uplink occasion and the other symbol group in the second pair of symbol groups may be located in subcarrier Z+6 in the uplink occasion. The second pair of symbol groups may be used by base station 1402 for fine timing estimation. In a second configuration, the hopping pattern associated with one of the two pairs of symbol groups may occur in a first uplink occasion and the hopping pattern associated with the other of the two pairs of symbol groups may occur in a different uplink occasion. For example, one symbol group in a first pair of symbol groups may be located in subcarrier Z in a first uplink occasion and the other symbol group in the first pair of symbol groups may be located in subcarrier Z+1 in the first uplink occasion. The first pair of symbol groups may be used by base station 1402 for course timing estimation. In addition, one symbol group in a second pair of symbol groups may be located in subcarrier Z in a second uplink occasion (e.g., the next uplink occasion after the first uplink occasion) and the other symbol group in the second pair of symbol groups may be located in subcarrier Z+6 in the second uplink occasion. The second pair of symbol groups may be used by base station 1402 for fine timing estimation.

At 2806, the UE may transmit a first pair of symbol groups and a second pair of symbol groups in a same uplink occasion or in adjacent uplink occasions in the narrowband TDD frame structure. In one aspect, a first subcarrier spacing associated with the first pair of symbol groups may be a single subcarrier. In another aspect, a second subcarrier spacing associated with the second pair of symbol groups may be six subcarriers. For example, referring to FIG. 14, UE 1404 may transmit the first pair of symbol groups 1405 and the second pair of symbol groups 1405 in a same uplink occasion or in adjacent uplink occasions in the narrowband TDD frame structure.

Figure 29:
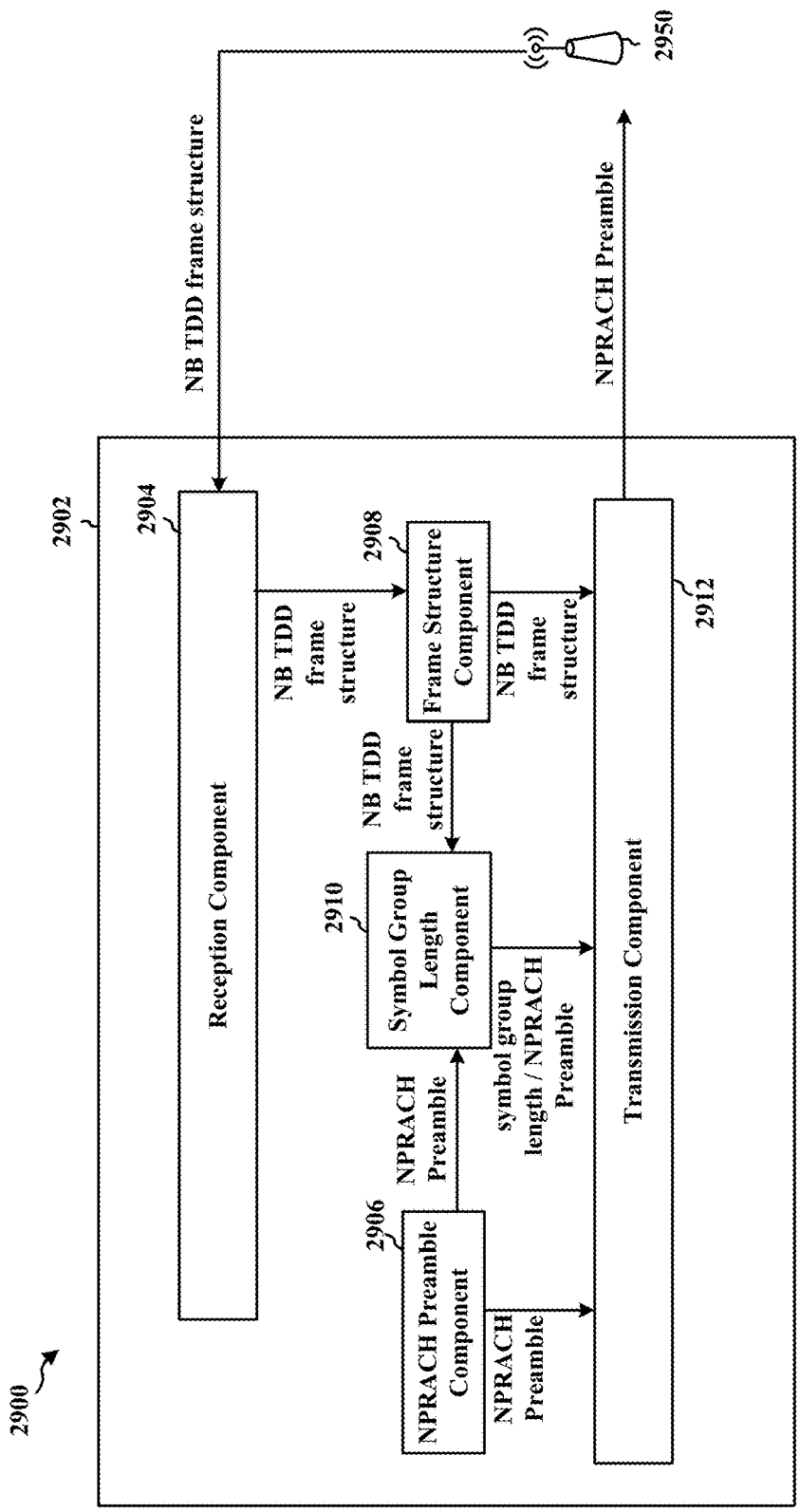
FIG. 29 is a conceptual data flow diagram illustrating the data flow between different means/components in an exemplary apparatus.

FIG. 29 is a conceptual data flow diagram 2900 illustrating the data flow between different means/components in an exemplary apparatus 2902. The apparatus may be a UE (e.g., the UE 104, 350, 504, 604, 704, 804, 904, 1004, 1104, 1204, 1304, 1404, the apparatus 2902', 3102/3102', 3302/3302', 3502/3502') in narrowband communication (e.g., NB-IoT communication or eMTC) with base station 2950 (e.g., the base station 102, 180, 502, 602, 702, 802, 902, 1002, 1102, 1202, 1302, 1402, 2350, 3150, 3350, 3550, eNB 310, the apparatus 1702/1702'). The apparatus may include a reception component 2904, an NPRACH preamble component 2906, a frame structure component 2908, a symbol group length component 2910, and a transmission component 2912.

In certain configurations, the reception component 2904 may be configured to receive information associated with a narrowband TDD frame structure for narrowband communications. The reception component 2904 may be configured to send a signal associated with the narrowband TDD frame structure to the frame structure component 2908.

In certain configurations, the frame structure component 2908 may be configured to determine a narrowband TDD frame structure. The frame structure component 2908 may be configured to send a signal associated with the determined narrowband TDD frame structure to the symbol group length component 2910 and/or the transmission component 2912.

In certain configurations, the NPRACH preamble component 2906 may be configured to generate a NPRACH preamble for transmission to the base station 2950. The NPRACH preamble component 2906 may be configured to send a signal associated with the NPRACH preamble to the symbol group length component 2910 and/or the transmission component 2912.

In certain configurations, the symbol group length component 2910 may be configured to determine a first symbol group length of a first NPRACH preamble. In one aspect, a first length of the first symbol group may be associated with the narrowband TDD frame structure. In one aspect, the first length of the first symbol group may be shorter than a second length of a second symbol group of a second NPRACH preamble transmitted using a narrowband FDD frame structure. In certain aspects, the first length of the first symbol group may be selected such that N symbol groups can be transmitted on N subframes. In another aspect, the first length of the first symbol group is longer than a second length of a second symbol group of a second NPRACH preamble transmitted using a narrowband FDD frame structure. In a further aspect, a first preamble format associated with the first NPRACH preamble may be different than a second preamble format associated with a second NPRACH preamble transmitted using a narrowband FDD frame structure. In still another aspect, the first length of the first symbol group may be associated with one or more uplink durations of the narrowband TDD frame structure. The symbol group length component 2910 may be configured to send a signal associated with symbol group length and/or the NPRACH preamble to the transmission component 2912.

In certain configurations, the transmission component 2912 may be configured to transmit a first symbol group of a first NPRACH preamble to the base station 2950. In one aspect, a first length of the first symbol group may be associated with the narrowband TDD frame structure. In one aspect, the first length of the first symbol group may be shorter than a second length of a second symbol group of a second NPRACH preamble transmitted using a narrowband FDD frame structure. In another aspect, the first length of the first symbol group is longer than a second length of a second symbol group of a second NPRACH preamble transmitted using a narrowband FDD frame structure. In a further aspect, a first preamble format associated with the first NPRACH preamble may be different than a second preamble format associated with a second NPRACH preamble transmitted using a narrowband FDD frame structure. In still another aspect, the first length of the first symbol group may be associated with one or more uplink durations of the narrowband TDD frame structure.

The apparatus may include additional components that perform each of the blocks of the algorithm in the aforementioned flowchart of FIG. 25. As such, each block in the aforementioned flowchart of FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 30:
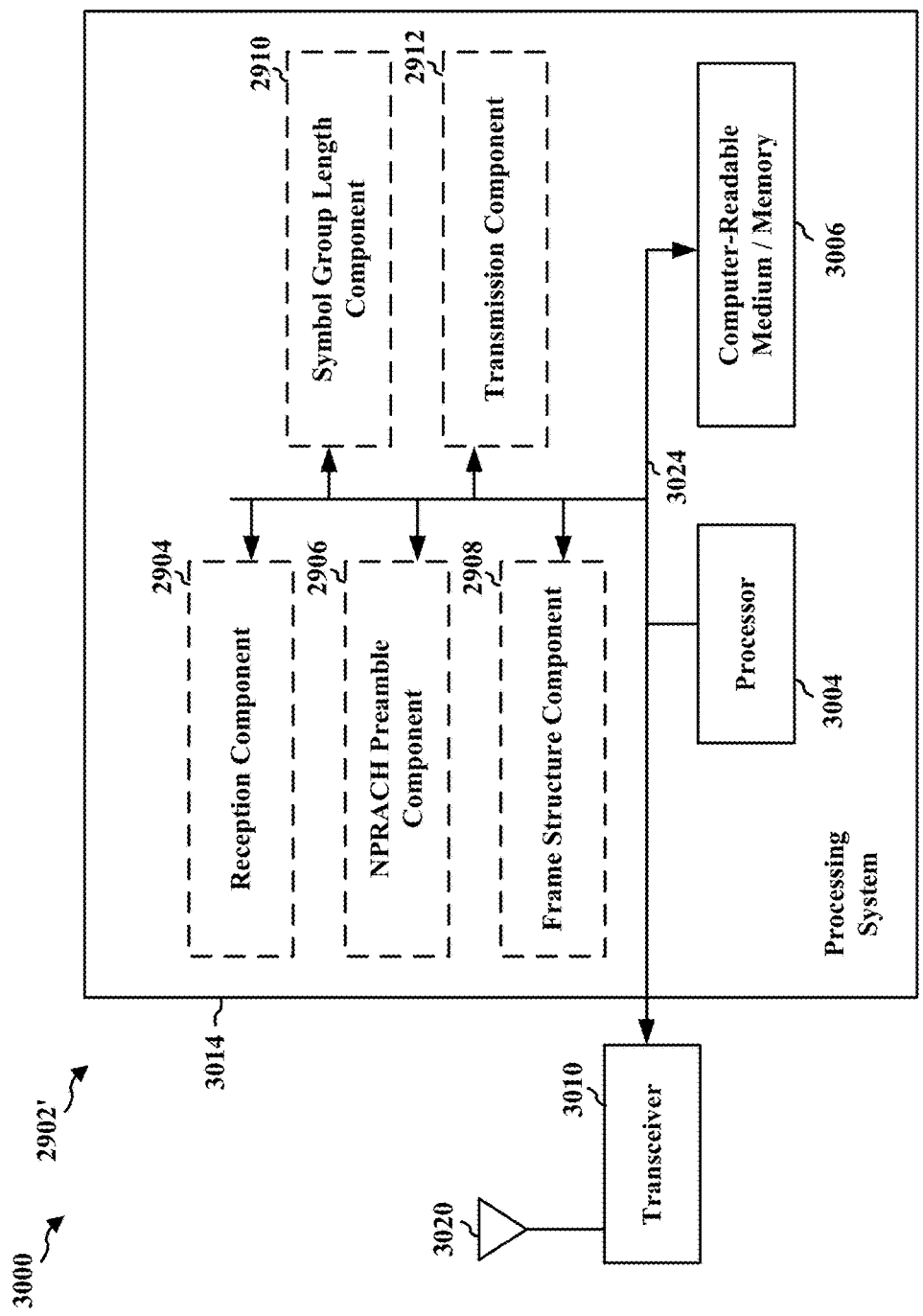
FIG. 30 is a diagram illustrating an example of a hardware implementation for an apparatus employing a processing system.

FIG. 30 is a diagram 3000 illustrating an example of a hardware implementation for an apparatus 2902' employing a processing system 3014. The processing system 3014 may be implemented with a bus architecture, represented generally by the bus 3024. The bus 3024 may include any number of interconnecting buses and bridges depending on the specific application of the processing system 3014 and the overall design constraints. The bus 3024 links together various circuits including one or more processors and/or hardware components, represented by the processor 3004, the components 2904, 2906, 2908, 2910, 2912 and the computer-readable medium/memory 3006. The bus 3024 may also link various other circuits such as timing sources, peripherals, voltage regulators, and power management circuits, which are well known in the art, and therefore, will not be described any further.

The processing system 3014 may be coupled to a transceiver 3010. The transceiver 3010 is coupled to one or more antennas 3020. The transceiver 3010 provides a means for communicating with various other apparatus over a transmission medium. The transceiver 3010 receives a signal from the one or more antennas 3020, extracts information from the received signal, and provides the extracted information to the processing system 3014, specifically the reception component 2904. In addition, the transceiver 3010 receives information from the processing system 3014, specifically the transmission component 2912, and based on the received information, generates a signal to be applied to the one or more antennas 3020. The processing system 3014 includes a processor 3004 coupled to a computer-readable medium/memory 3006. The processor 3004 is responsible for general processing, including the execution of software stored on the computer-readable medium/memory 3006. The software, when executed by the processor 3004, causes the processing system 3014 to perform the various functions described supra for any particular apparatus. The computer-readable medium/memory 3006 may also be used for storing data that is manipulated by the processor 3004 when executing software. The processing system 3014 further includes at least one of the components 2904, 2906, 2908, 2910, 2912. The components may be software components running in the processor 3004, resident/stored in the computer readable medium/memory 3006, one or more hardware components coupled to the processor 3004, or some combination thereof. The processing system 3014 may be a component of the UE 350 and may include the memory 360 and/or at least one of the TX processor 368, the RX processor 356, and the controller/processor 359.

In certain configurations, the apparatus 2902/2902' for wireless communication may include means for receiving information associated with a narrowband TDD frame structure for narrowband communications. In certain other configurations, the apparatus 2902/2902' for wireless communication may include means for transmitting a first symbol group of a first NPRACH preamble to a base station. In one aspect, a first length of the first symbol group may be associated with the narrowband TDD frame structure. In one aspect, the first length of the first symbol group may be shorter than a second length of a second symbol group of a second NPRACH preamble transmitted using a narrowband FDD frame structure. In another aspect, the first length of the first symbol group is longer than a second length of a second symbol group of a second NPRACH preamble transmitted using a narrowband FDD frame structure. In a further aspect, a first preamble format associated with the first NPRACH preamble may be different than a second preamble format associated with a second NPRACH preamble transmitted using a narrowband FDD frame structure. In certain aspects, the first length of the first symbol group may be selected such that N symbol groups can be transmitted on N subframes. In still another aspect, the first length of the first symbol group may be associated with one or more uplink durations of the narrowband TDD frame structure. The aforementioned means may be one or more of the aforementioned components of the apparatus 2902 and/or the processing system 3014 of the apparatus 2902' configured to perform the functions recited by the aforementioned means. As described supra, the processing system 3014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 31:
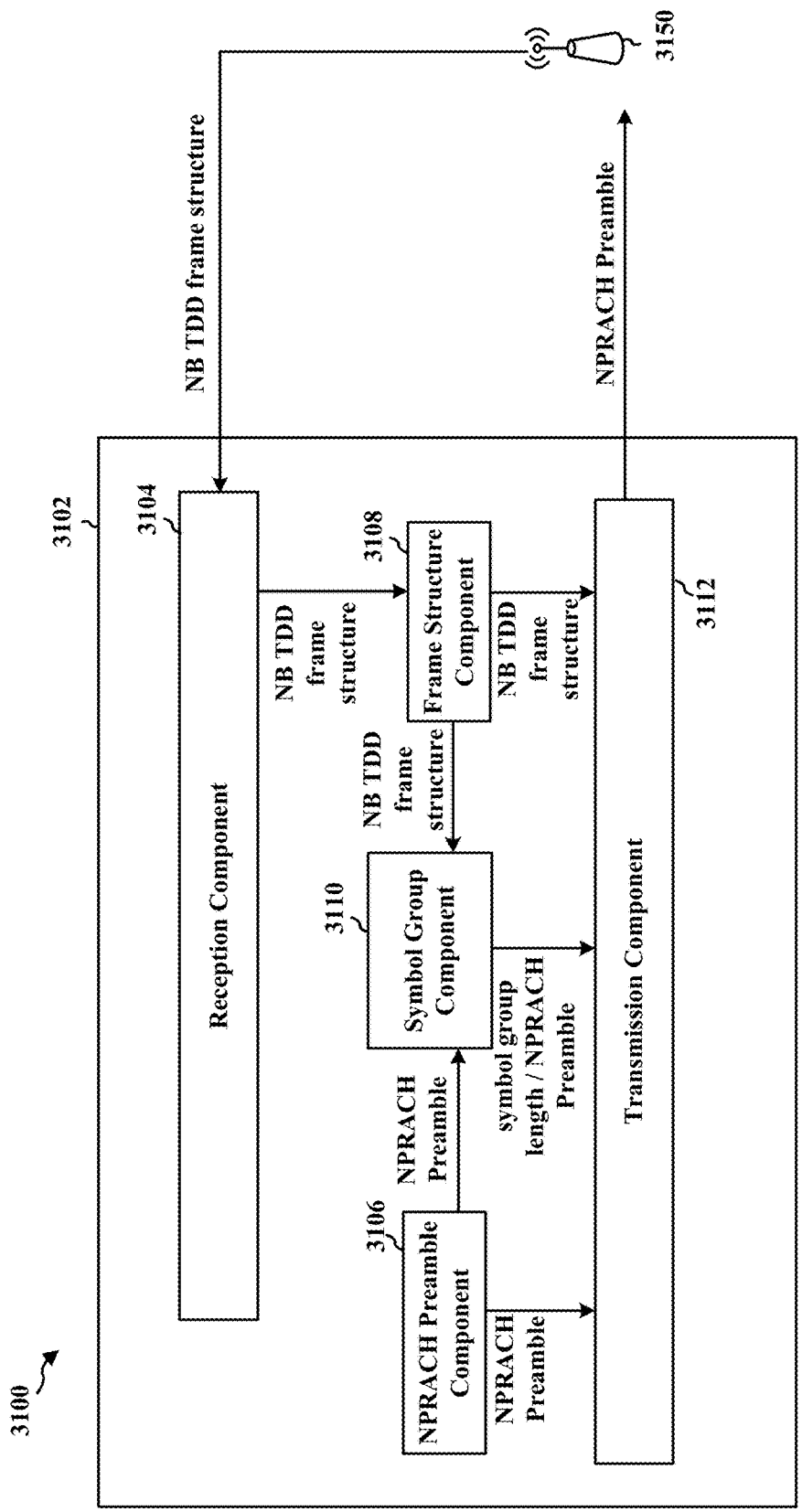
FIG. 31 is a conceptual data flow diagram illustrating the data flow between different means/components in an exemplary apparatus.

FIG. 31 is a conceptual data flow diagram 3100 illustrating the data flow between different means/components in an exemplary apparatus 3102. The apparatus may be a UE (e.g., the UE 104, 350, 504, 604, 704, 804, 904, 1004, 1104, 1204, 1304, 1404, the apparatus 2902/2902', 3102', 3302/3302', 3502/3502') in narrowband communication (e.g., NB-IoT communication or eMTC) with base station 3150 (e.g., the base station 102, 180, 502, 602, 702, 802, 902, 1002, 1102, 1202, 1302, 1402, 2350, 2950, 3350, 3550, eNB 310, the apparatus 1702/1702'). The apparatus may include a reception component 3104, an NPRACH preamble component 3106, a frame structure component 3108, a symbol group component 3110, and a transmission component 3112.

In certain configurations, the reception component 3104 may be configured to receive information associated with a narrowband TDD frame structure for narrowband communications. The reception component 3104 may be configured to send a signal associated with the narrowband TDD frame structure to the frame structure component 3108.

In certain configurations, the frame structure component 3108 may be configured to determine a narrowband TDD frame structure. The frame structure component 3108 may be configured to send a signal associated with the determined narrowband TDD frame structure to the symbol group component 3110 and/or the transmission component 3112.

In certain configurations, the NPRACH preamble component 3106 may be configured to generate a NPRACH preamble for transmission to the base station 3150. The NPRACH preamble component 3106 may be configured to send a signal associated with the NPRACH preamble to the symbol group component 3110 and/or the transmission component 3112.

In certain configurations, the symbol group component 3110 may be configured to determine a maximum number of symbol groups in a plurality of symbol groups associated with a NPRACH preamble that fit in an uplink occasion in the narrowband TDD frame structure. In one aspect, the plurality of symbol groups may include four symbol groups. In another aspect, a length of a symbol group may be a function of the narrowband TDD frame structure. The symbol group component 3110 may be configured to send a signal associated with the maximum number of symbol groups in a plurality of symbol groups associated with the NPRACH preamble that fit in an uplink occasion in the narrowband TDD frame structure to the transmission component 3112.

In certain configurations, the transmission component 3112 may be configured to transmit a first subset of the plurality of symbol groups associated with the NPRACH preamble in a first uplink occasion in the narrowband TDD frame structure and a second subset of the plurality of symbol groups associated with the NPRACH preamble in a second uplink occasion in the narrowband TDD frame structure. In one aspect, the first subset may include the maximum number of symbol groups. In another aspect, the second subset may include any remaining symbol groups in the plurality of symbol groups or the maximum number of symbol groups.

The apparatus may include additional components that perform each of the blocks of the algorithm in the aforementioned flowchart of FIG. 26. As such, each block in the aforementioned flowchart of FIG. 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 32:
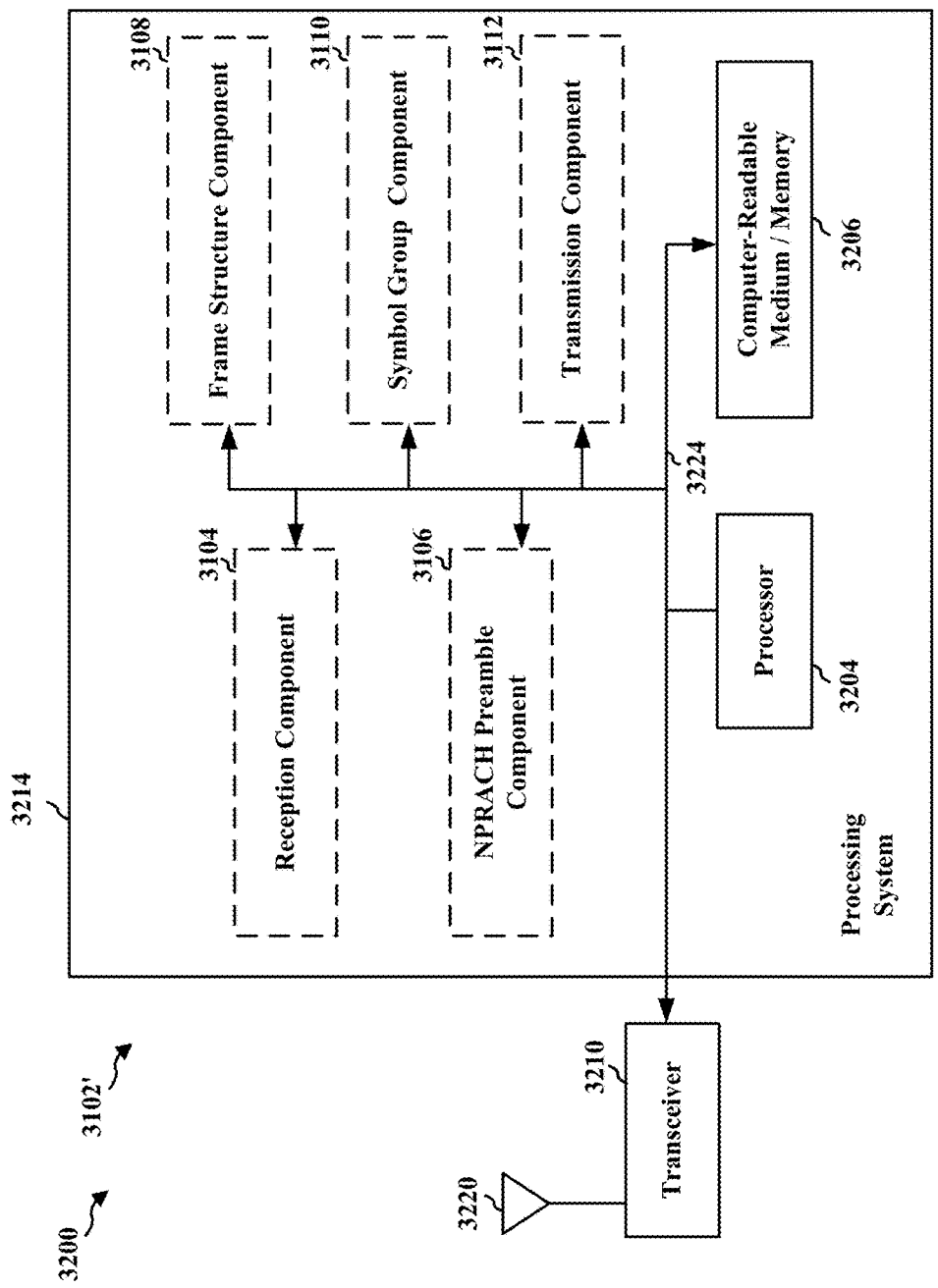
FIG. 32 is a diagram illustrating an example of a hardware implementation for an apparatus employing a processing system.

FIG. 32 is a diagram 3200 illustrating an example of a hardware implementation for an apparatus 3102' employing a processing system 3214. The processing system 3214 may be implemented with a bus architecture, represented generally by the bus 3224. The bus 3224 may include any number of interconnecting buses and bridges depending on the specific application of the processing system 3214 and the overall design constraints. The bus 3224 links together various circuits including one or more processors and/or hardware components, represented by the processor 3204, the components 3104, 3106, 3108, 3110, 3112, and the computer-readable medium/memory 3206. The bus 3224 may also link various other circuits such as timing sources, peripherals, voltage regulators, and power management circuits, which are well known in the art, and therefore, will not be described any further.

The processing system 3214 may be coupled to a transceiver 3210. The transceiver 3210 is coupled to one or more antennas 3220. The transceiver 3210 provides a means for communicating with various other apparatus over a transmission medium. The transceiver 3210 receives a signal from the one or more antennas 3220, extracts information from the received signal, and provides the extracted information to the processing system 3214, specifically the reception component 3104. In addition, the transceiver 3210 receives information from the processing system 3214, specifically the transmission component 3112, and based on the received information, generates a signal to be applied to the one or more antennas 3220. The processing system 3214 includes a processor 3204 coupled to a computer-readable medium/memory 3206. The processor 3204 is responsible for general processing, including the execution of software stored on the computer-readable medium/memory 3206. The software, when executed by the processor 3204, causes the processing system 3214 to perform the various functions described supra for any particular apparatus. The computer-readable medium/memory 3206 may also be used for storing data that is manipulated by the processor 3204 when executing software. The processing system 3214 further includes at least one of the components 3104, 3106, 3108, 3110, 3112. The components may be software components running in the processor 3204, resident/stored in the computer readable medium/memory 3206, one or more hardware components coupled to the processor 3204, or some combination thereof. The processing system 3214 may be a component of the UE 350 and may include the memory 360 and/or at least one of the TX processor 368, the RX processor 356, and the controller/processor 359.

In certain configurations, the apparatus 3102/3102' for wireless communication may include means for receiving information associated with a narrowband TDD frame structure for narrowband communications. In certain other configurations, the apparatus 3102/3102' for wireless communication may include means for determining a maximum number of symbol groups in a plurality of symbol groups associated with a NPRACH preamble that fit in an uplink occasion in the narrowband TDD frame structure. In one aspect, the plurality of symbol groups may include four symbol groups. In another aspect, a length of a symbol group may be a function of the narrowband TDD frame structure. In certain other configurations, the apparatus 3102/3102' for wireless communication may include means for transmitting a first subset of the plurality of symbol groups associated with the NPRACH preamble in a first uplink occasion in the narrowband TDD frame structure and a second subset of the plurality of symbol groups associated with the NPRACH preamble in a second uplink occasion in the narrowband TDD frame structure. In one aspect, the first subset may include the maximum number of symbol groups. In another aspect, the second subset may include any remaining symbol groups in the plurality of symbol groups or the maximum number of symbol groups. The aforementioned means may be one or more of the aforementioned components of the apparatus 3102 and/or the processing system 3214 of the apparatus 3102' configured to perform the functions recited by the aforementioned means. As described supra, the processing system 3214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 33:
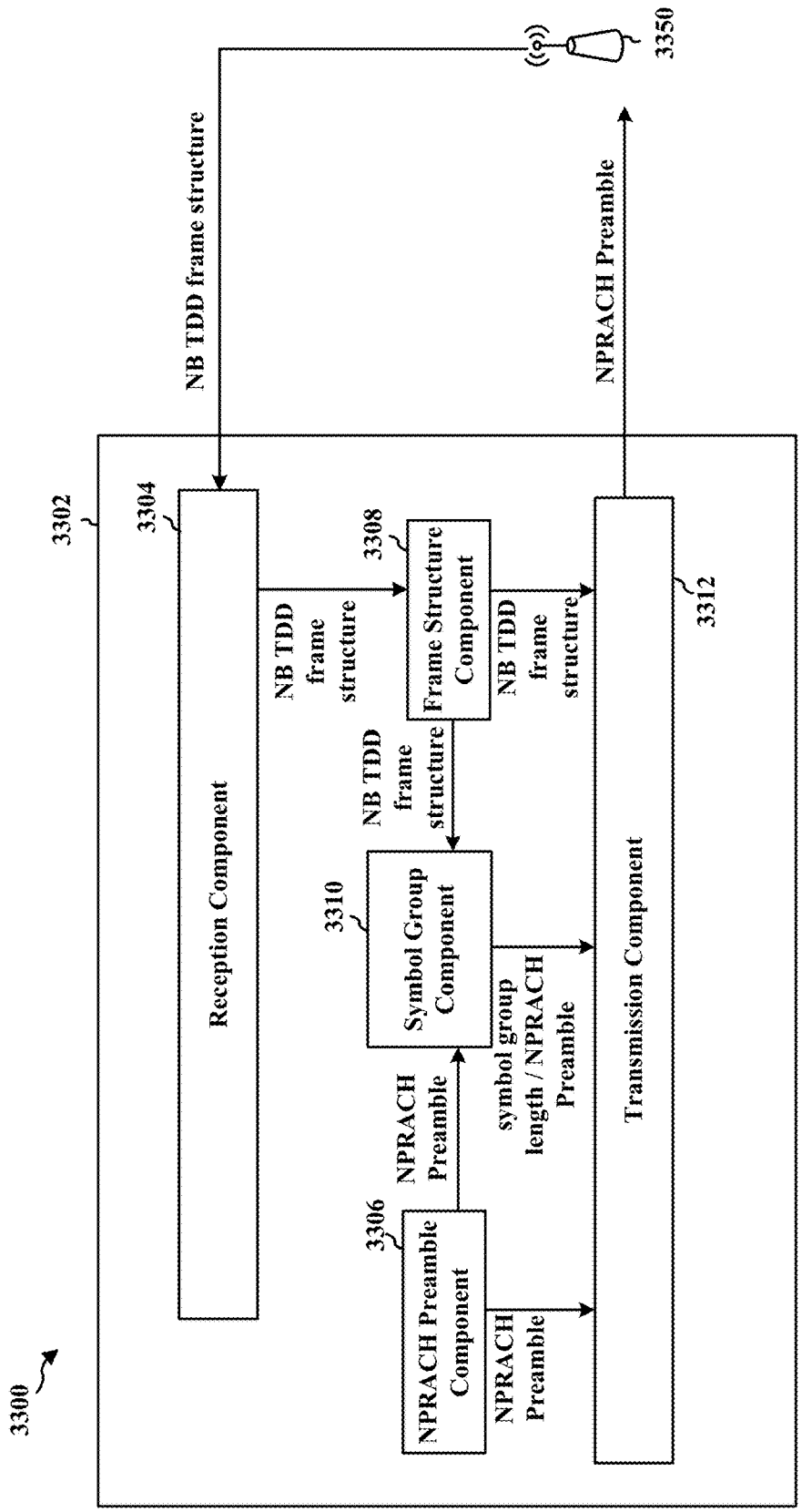
FIG. 33 is a conceptual data flow diagram illustrating the data flow between different means/components in an exemplary apparatus.

FIG. 33 is a conceptual data flow diagram 3300 illustrating the data flow between different means/components in an exemplary apparatus 3302. The apparatus may be a UE (e.g., the UE 104, 350, 504, 604, 704, 804, 904, 1004, 1104, 1204, 1304, 1404, the apparatus 2902/2902', 3102/3102', 3302', 3502/3502') in narrowband communication (e.g., NB-IoT communication or eMTC) with base station 3350 (e.g., the base station 102, 180, 502, 602, 702, 802, 902, 1002, 1102, 1202, 1302, 1402, 2350, 2950, 3150, 3550, eNB 310, the apparatus 1702/1702'). The apparatus may include a reception component 3304, an NPRACH preamble component 3306, a frame structure component 3308, a symbol group component 3310, and a transmission component 3312.

In certain configurations, the reception component 3304 may be configured to receive information associated with a narrowband TDD frame structure for narrowband communications. The reception component 3304 may be configured to send a signal associated with the narrowband TDD frame structure to the frame structure component 3308.

In certain configurations, the frame structure component 3308 may be configured to determine a narrowband TDD frame structure. The frame structure component 3308 may be configured to send a signal associated with the determined narrowband TDD frame structure to the symbol group component 3310 and/or the transmission component 3312.

In certain configurations, the NPRACH preamble component 3306 may be configured to generate a NPRACH preamble for transmission to the base station 3350. The NPRACH preamble component 3306 may be configured to send a signal associated with the NPRACH preamble to the symbol group component 3310 and/or the transmission component 3312.

In certain configurations, the symbol group component 3310 may be configured to determine a first number of symbol groups of a NPRACH preamble to transmit in a first uplink occasion in the narrowband TDD frame structure. In one aspect, the first number of symbol groups may include either two symbol groups or three symbol groups. The symbol group component 3310 may be configured to send a signal associated with the first number of symbol groups of the NPRACH preamble to transmit in a first uplink occasion in the narrowband TDD frame structure to the transmission component 3312.

When the first number of symbol groups includes two symbol groups, the transmission component 3312 may be configured to transmit a first symbol group of the two symbol groups in a first tone in the first uplink occasion and a second symbol group of the two symbol groups in a second tone in the first uplink occasion. In one aspect, a distance between the first tone and the second tone may be either one tone or six tones.

When the first number of symbol groups includes three symbol groups, the transmission component 3312 may be configured to transmit a first symbol group of the three symbol groups in a first tone of the first uplink occasion, a second symbol group of the three symbol groups in a second tone of the first uplink occasion, and a third symbol group of the three symbol groups in a third tone of the first uplink occasion. In one aspect, a first distance between tones used for at least one pair of the symbol groups may be one tone, and a second distance between tones used for another pair of the symbol groups may be six tones.

In certain configurations, the transmission component 3312 may be configured to transmit a fourth symbol group in a fourth tone in a second uplink occasion subsequent to the first uplink occasion. In one aspect, a third distance between the third tone and the fourth tone may be one tone.

The apparatus may include additional components that perform each of the blocks of the algorithm in the aforementioned flowchart of FIG. 27. As such, each block in the aforementioned flowchart of FIG. 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 34:
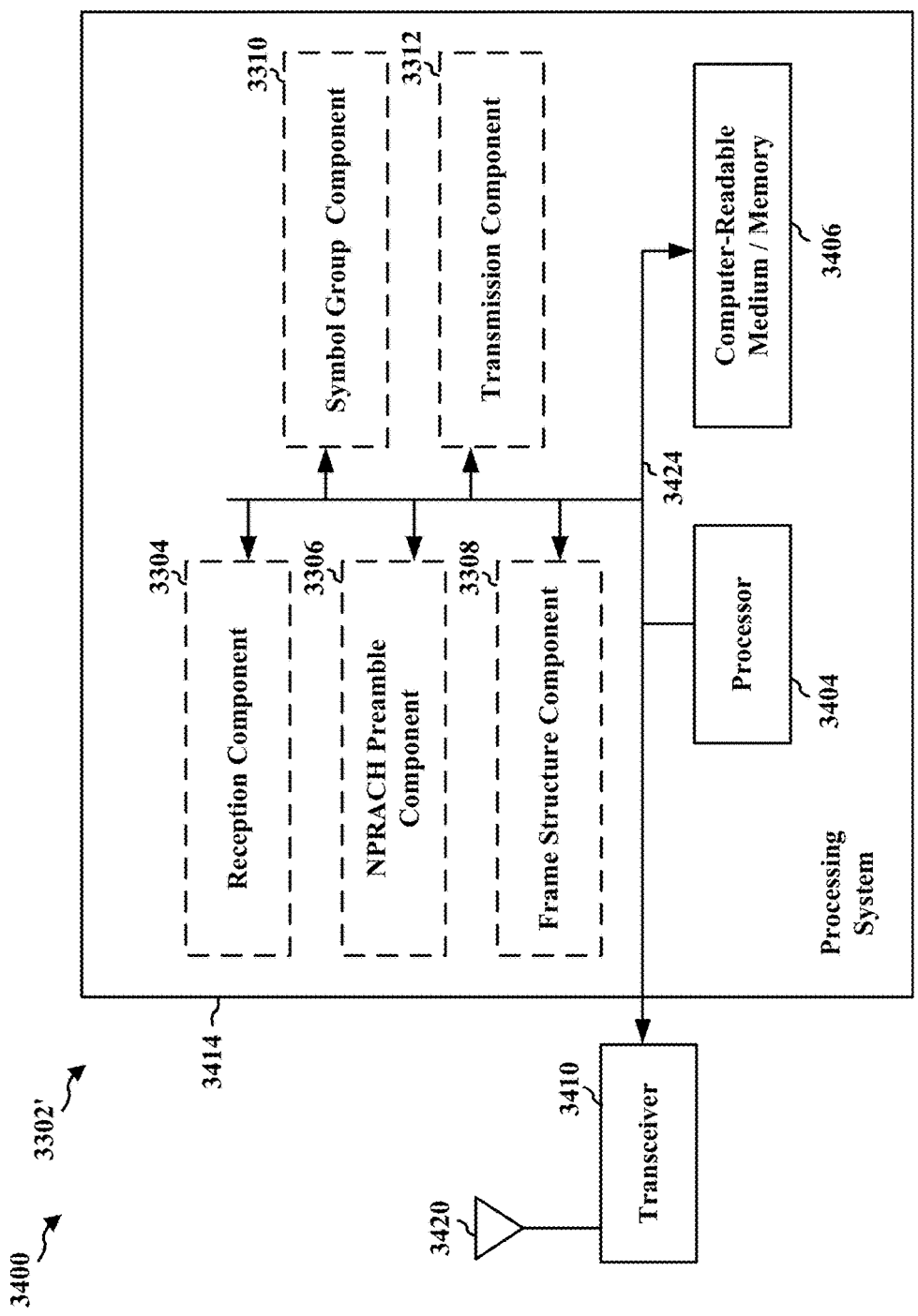
FIG. 34 is a diagram illustrating an example of a hardware implementation for an apparatus employing a processing system.

FIG. 34 is a diagram 3400 illustrating an example of a hardware implementation for an apparatus 3302' employing a processing system 3414. The processing system 3414 may be implemented with a bus architecture, represented generally by the bus 3424. The bus 3424 may include any number of interconnecting buses and bridges depending on the specific application of the processing system 3414 and the overall design constraints. The bus 3424 links together various circuits including one or more processors and/or hardware components, represented by the processor 3404, the components 3304, 3306, 3308, 3310, 3312, and the computer-readable medium/memory 3406. The bus 3424 may also link various other circuits such as timing sources, peripherals, voltage regulators, and power management circuits, which are well known in the art, and therefore, will not be described any further.

The processing system 3414 may be coupled to a transceiver 3410. The transceiver 3410 is coupled to one or more antennas 3420. The transceiver 3410 provides a means for communicating with various other apparatus over a transmission medium. The transceiver 3410 receives a signal from the one or more antennas 3420, extracts information from the received signal, and provides the extracted information to the processing system 3414, specifically the reception component 3304. In addition, the transceiver 3410 receives information from the processing system 3414, specifically the transmission component 3312, and based on the received information, generates a signal to be applied to the one or more antennas 3420. The processing system 3414 includes a processor 3404 coupled to a computer-readable medium/memory 3406. The processor 3404 is responsible for general processing, including the execution of software stored on the computer-readable medium/memory 3406. The software, when executed by the processor 3404, causes the processing system 3414 to perform the various functions described supra for any particular apparatus. The computer-readable medium/memory 3406 may also be used for storing data that is manipulated by the processor 3404 when executing software. The processing system 3414 further includes at least one of the components 3304, 3306, 3308, 3310, 3312. The components may be software components running in the processor 3404, resident/stored in the computer readable medium/memory 3406, one or more hardware components coupled to the processor 3404, or some combination thereof. The processing system 3414 may be a component of the UE 350 and may include the memory 360 and/or at least one of the TX processor 368, the RX processor 356, and the controller/processor 359.

In certain configurations, the apparatus 3302/3302' for wireless communication may include means for receiving information associated with a narrowband TDD frame structure for narrowband communications. In certain other configurations, the apparatus 3302/3302' for wireless communication may include means for determining a first number of symbol groups of a NPRACH preamble to transmit in a first uplink occasion in the narrowband TDD frame structure. In one aspect, the first number of symbol groups may include either two symbol groups or three symbol groups. In certain other configurations, the apparatus 3302/3302' for wireless communication may include means for transmitting a first symbol group of the two symbol groups in a first tone in the first uplink occasion and a second symbol group of the two symbol groups in a second tone in the first uplink occasion when the first number of symbol groups includes two symbol groups. In one aspect, a distance between the first tone and the second tone may be either one tone or six tones. In certain other configurations, the apparatus 3302/3302' for wireless communication may include means for transmitting a first symbol group of the three symbol groups in a first tone of the first uplink occasion, a second symbol group of the three symbol groups in a second tone of the first uplink occasion, and a third symbol group of the three symbol groups in a third tone of the first uplink occasion when the first number of symbol groups includes three symbol groups. In one aspect, a first distance between tones used for at least one pair of the symbol groups may be one tone, and a second distance between tones used for another pair of the symbol groups may be six tones. In certain other configurations, the apparatus 3302/3302' for wireless communication may include means for transmitting a fourth symbol group in a fourth tone in a second uplink occasion subsequent to the first uplink occasion. In one aspect, a third distance between the third tone and the fourth tone may be one tone. The aforementioned means may be one or more of the aforementioned components of the apparatus 3302 and/or the processing system 3414 of the apparatus 3302' configured to perform the functions recited by the aforementioned means. As described supra, the processing system 3414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 35:
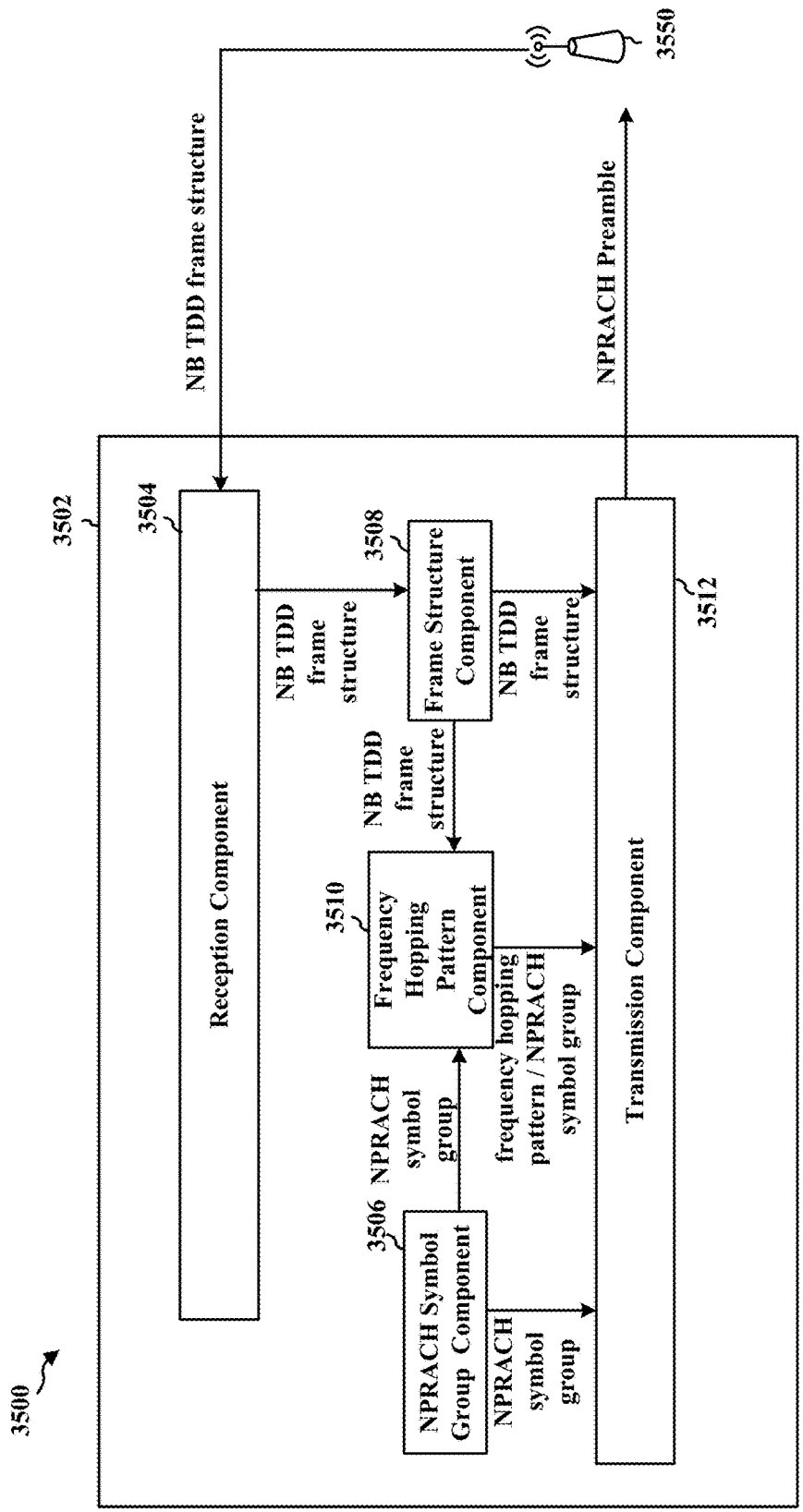
FIG. 35 is a conceptual data flow diagram illustrating the data flow between different means/components in an exemplary apparatus.

FIG. 35 is a conceptual data flow diagram 3500 illustrating the data flow between different means/components in an exemplary apparatus 3502. The apparatus may be a UE (e.g., the UE 104, 350, 504, 604, 704, 804, 904, 1004, 1104, 1204, 1304, 1404, the apparatus 2902/2902', 3102/3102', 3302/3302', 3502') in narrowband communication (e.g., NB-IoT communication or eMTC) with base station 3550 (e.g., the base station 102, 180, 502, 602, 702, 802, 902, 1002, 1102, 1202, 1302, 1402, 2350, 2950, 3150, 3350, eNB 310, the apparatus 1702/1702'). The apparatus may include a reception component 3504, a NPRACH symbol group component 3506, a frame structure component 3508, a frequency hopping pattern component 3510, and a transmission component 3512.

In certain configurations, the reception component 3504 may be configured to receive information associated with a narrowband TDD frame structure for narrowband communications. The reception component 3504 may be configured to send a signal associated with the narrowband TDD frame structure to the frame structure component 3508.

In certain configurations, the frame structure component 3508 may be configured to determine a narrowband TDD frame structure. The frame structure component 3508 may be configured to send a signal associated with the determined narrowband TDD frame structure to the frequency hopping pattern component 3510 and/or the transmission component 3512.

In certain configurations, the NPRACH symbol group component 3506 may be configured to generate at least one NPRACH symbol group for transmission to the base station 3550. The NPRACH symbol group component 3506 may be configured to send a signal associated with the at least one NPRACH symbol group to the frequency hopping pattern component 3510 and/or the transmission component 3512.

In certain configurations, the frequency hopping pattern component 3510 may be configured to determine a hopping pattern associated with two pairs of symbol groups of a NPRACH transmitted in one or more uplink occasions using the narrowband TDD frame structure. The frequency hopping pattern component 3510 may be configured to send a signal associated with the hopping pattern associated with two pairs of symbol groups of the NPRACH transmitted in one or more uplink occasions using the narrowband TDD frame structure to the transmission component 3512.

In certain configurations, the transmission component 3512 may be configured to transmit a first pair of symbol groups and a second pair of symbol groups in a same uplink occasion or in adjacent uplink occasions in the narrowband TDD frame structure. In one aspect, a first subcarrier spacing associated with the first pair of symbol groups may be a single subcarrier. In another aspect, a second subcarrier spacing associated with the second pair of symbol groups may be six subcarriers.

The apparatus may include additional components that perform each of the blocks of the algorithm in the aforementioned flowchart of FIG. 28. As such, each block in the aforementioned flowchart of FIG. 28 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 36:
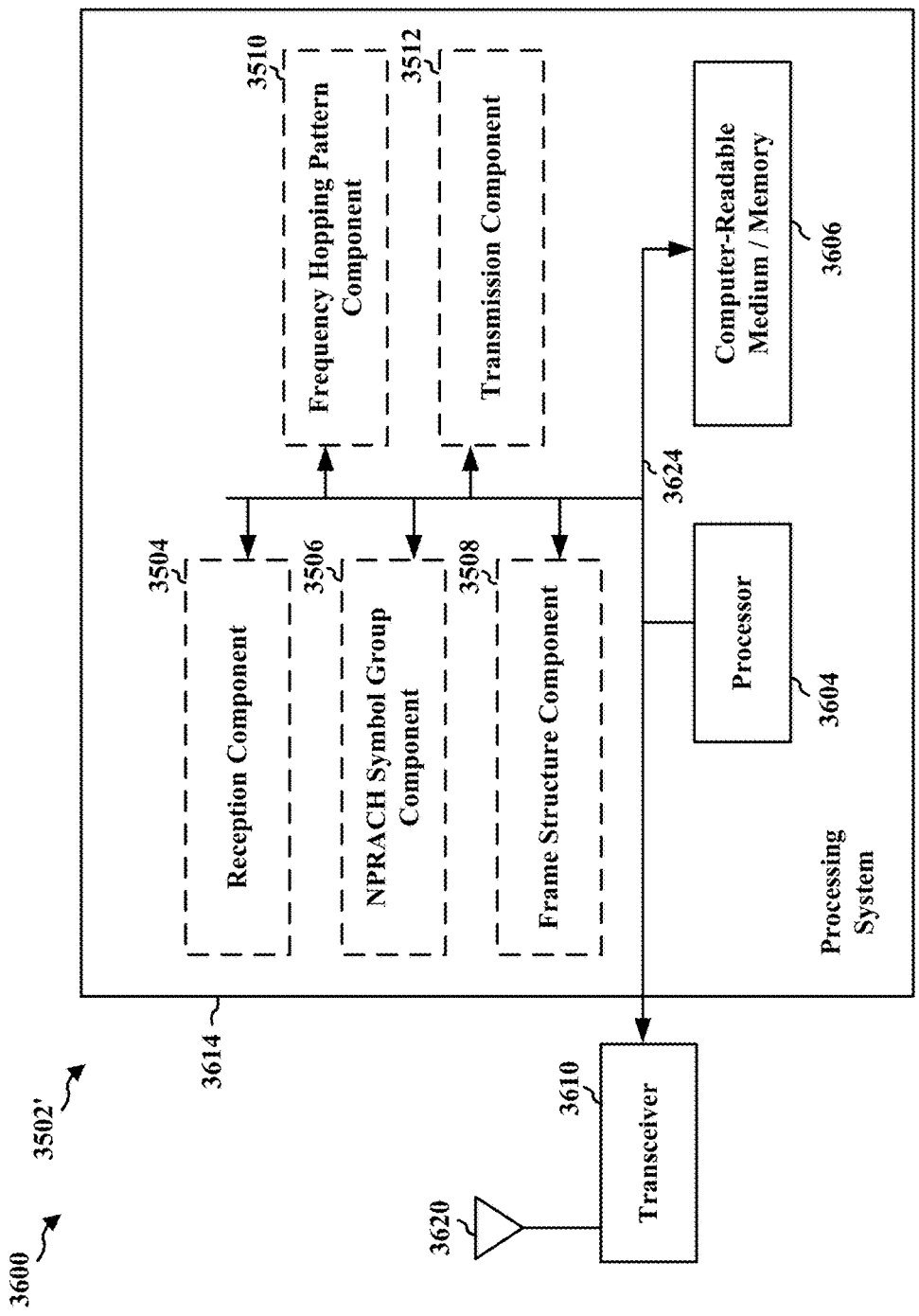
FIG. 36 is a diagram illustrating an example of a hardware implementation for an apparatus employing a processing system.

FIG. 36 is a diagram 3600 illustrating an example of a hardware implementation for an apparatus 3502' employing a processing system 3614. The processing system 3614 may be implemented with a bus architecture, represented generally by the bus 3624. The bus 3624 may include any number of interconnecting buses and bridges depending on the specific application of the processing system 3614 and the overall design constraints. The bus 3624 links together various circuits including one or more processors and/or hardware components, represented by the processor 3604, the components 3504, 3506, 3508, 3510, 3512, and the computer-readable medium/memory 3606. The bus 3624 may also link various other circuits such as timing sources, peripherals, voltage regulators, and power management circuits, which are well known in the art, and therefore, will not be described any further.

The processing system 3614 may be coupled to a transceiver 3610. The transceiver 3610 is coupled to one or more antennas 3620. The transceiver 3610 provides a means for communicating with various other apparatus over a transmission medium. The transceiver 3610 receives a signal from the one or more antennas 3620, extracts information from the received signal, and provides the extracted information to the processing system 3614, specifically the reception component 3504. In addition, the transceiver 3610 receives information from the processing system 3614, specifically the transmission component 3512, and based on the received information, generates a signal to be applied to the one or more antennas 3620. The processing system 3614 includes a processor 3604 coupled to a computer-readable medium/memory 3606. The processor 3604 is responsible for general processing, including the execution of software stored on the computer-readable medium/memory 3606. The software, when executed by the processor 3604, causes the processing system 3614 to perform the various functions described supra for any particular apparatus. The computer-readable medium/memory 3606 may also be used for storing data that is manipulated by the processor 3604 when executing software. The processing system 3614 further includes at least one of the components 3504, 3506, 3508, 3510, 3512. The components may be software components running in the processor 3604, resident/stored in the computer readable medium/memory 3606, one or more hardware components coupled to the processor 3604, or some combination thereof. The processing system 3614 may be a component of the UE 350 and may include the memory 360 and/or at least one of the TX processor 368, the RX processor 356, and the controller/processor 359.

In certain configurations, the apparatus 3502/3502' for wireless communication may include means for receiving information associated with a narrowband TDD frame structure for narrowband communications. In certain other configurations, the apparatus 3502/3502' for wireless communication may include means for determining a hopping pattern associated with two pairs of symbol groups of a NPRACH transmitted in one or more uplink occasions using the narrowband TDD frame structure. In certain other configurations, the apparatus 3502/3502' for wireless communication may include means for transmitting a first pair of symbol groups and a second pair of symbol groups in a same uplink occasion or in adjacent uplink occasions in the narrowband TDD frame structure. In one aspect, a first subcarrier spacing associated with the first pair of symbol groups may be a single subcarrier. In another aspect, a second subcarrier spacing associated with the second pair of symbol groups may be six subcarriers. The aforementioned means may be one or more of the aforementioned components of the apparatus 3502 and/or the processing system 3614 of the apparatus 3502' configured to perform the functions recited by the aforementioned means. As described supra, the processing system 3614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication for a user equipment (UE), comprising:
   receiving information associated with a time-division duplex (TDD) frame structure for narrowband communications; and
   transmitting a first symbol group of a first narrowband physical random access channel (NPRACH) preamble to a base station, a first length of the first symbol group being associated with the TDD frame structure;
   wherein the first length of the first symbol group is shorter than a second length of a second symbol group of a second NPRACH preamble transmitted using a frequency-division duplex (FDD) frame structure.

2. The method of claim 1, wherein the first length of the first symbol group is selected such that N symbol groups can be transmitted on N subframes.

3. The method of claim 1, wherein the first length of the first symbol group is associated with one or more uplink durations of the TDD frame structure.

4. A method for wireless communication for a user equipment (UE), comprising:
   receiving information associated with a time-division duplex (TDD) frame structure for narrowband communications; and
   transmitting a first symbol group of a first narrowband physical random access channel (NPRACH) preamble to a base station, a first length of the first symbol group being associated with the TDD frame structure;
   wherein the first length of the first symbol group is longer than a second length of a second symbol group of a second NPRACH preamble transmitted using a frequency-division duplex (FDD) frame structure.

5. A method for wireless communication for a user equipment (UE), comprising:
   receiving information associated with a time-division duplex (TDD) frame structure for narrowband communications; and
   transmitting a first symbol group of a first narrowband physical random access channel (NPRACH) preamble to a base station, a first length of the first symbol group being associated with the TDD frame structure;
   wherein a first preamble format associated with the first NPRACH preamble is different than a second preamble format associated with a second NPRACH preamble transmitted using a frequency-division duplex (FDD) frame structure.

6. A method for wireless communication for a user equipment (UE), comprising:
   receiving information associated with a time-division duplex (TDD) frame structure for narrowband communications;
   determining a maximum number of symbol groups in a plurality of symbol groups associated with a narrowband physical random access channel (NPRACH) preamble that fit in an uplink occasion in the TDD frame structure; and
   transmitting a first subset of the plurality of symbol groups associated with the NPRACH preamble in a first uplink occasion in the TDD frame structure and a second subset of the plurality of symbol groups associated with the NPRACH preamble in a second uplink occasion in the TDD frame structure,
   wherein the first subset includes the maximum number of symbol groups, and
   wherein the second subset includes any remaining symbol groups in the plurality of symbol groups or the maximum number of symbol groups.

7. The method of claim 6, wherein the plurality of symbol groups includes four symbol groups.

8. The method of claim 6, wherein a length of a symbol group is a function of the TDD frame structure.

9. A method for wireless communication for a user equipment (UE), comprising:
   receiving information associated with a time-division duplex (TDD) frame structure for narrowband communications; and
   determining a first number of symbol groups of a narrowband physical random access channel (NPRACH) preamble to transmit in a first uplink occasion in the TDD frame structure, the first number of symbol groups including either two symbol groups or three symbol groups.

10. The method of claim 9, wherein the first number of symbol groups includes the two symbol groups, the method further comprising:
    transmitting a first symbol group of the two symbol groups in a first tone in the first uplink occasion and a second symbol group of the two symbol groups in a second tone in the first uplink occasion, a distance between the first tone and the second tone being either one tone or six tones.

11. The method of claim 9, wherein the first number of symbol groups includes the three symbol groups, the method further comprising:
    transmitting a first symbol group of the three symbol groups in a first tone of the first uplink occasion, a second symbol group of the three symbol groups in a second tone of the first uplink occasion, and a third symbol group of the three symbol groups in a third tone of the first uplink occasion, a first distance between tones used for at least one pair of the symbol groups is one tone, and a second distance between tones used for another pair of the symbol groups is six tones.

12. The method of claim 11, further comprising:
    transmitting a fourth symbol group in a fourth tone in a second uplink occasion subsequent to the first uplink occasion, a third distance between the third tone and the fourth tone being one tone.

13. A method for wireless communication for a user equipment (UE), comprising:
    receiving information associated with a time-division duplex (TDD) frame structure for narrowband communications;
    determining a hopping pattern associated with two pairs of symbol groups of a narrowband physical random access channel (NPRACH) transmitted in one or more uplink occasions using the TDD frame structure; and transmitting a first pair of symbol groups and a second pair of symbol groups in a same uplink occasion or in adjacent uplink occasions in the TDD frame structure, wherein a first subcarrier spacing associated with the first pair of symbol groups is a single subcarrier, and wherein a second subcarrier spacing associated with the second pair of symbol groups is six subcarriers.

14. An apparatus for wireless communication for a user equipment (UE), comprising:

means for receiving information associated with a time-division duplex (TDD) frame structure for narrowband communications; and means for transmitting a first symbol group of a first narrowband physical random access channel (NPRACH) preamble to a base station, a first length of the first symbol group being associated with the TDD frame structure;

wherein the first length of the first symbol group is shorter than a second length of a second symbol group of a second NPRACH preamble transmitted using a frequency-division duplex (FDD) frame structure.

15. The apparatus of claim 14, wherein the first length of the first symbol group is selected such that N symbol groups can be transmitted on N subframes.

16. The apparatus of claim 14, wherein the first length of the first symbol group is associated with one or more uplink durations of the TDD frame structure.

17. An apparatus for wireless communication for a user equipment (UE), comprising:

means for receiving information associated with a time-division duplex (TDD) frame structure for narrowband communications; and means for transmitting a first symbol group of a first narrowband physical random access channel (NPRACH) preamble to a base station, a first length of the first symbol group being associated with the TDD frame structure;

wherein the first length of the first symbol group is longer than a second length of a second symbol group of a second NPRACH preamble transmitted using a frequency-division duplex (FDD) frame structure.

18. An apparatus for wireless communication for a user equipment (UE), comprising:

means for receiving information associated with a time-division duplex (TDD) frame structure for narrowband communications; and means for transmitting a first symbol group of a first narrowband physical random access channel (NPRACH) preamble to a base station, a first length of the first symbol group being associated with the TDD frame structure;

wherein a first preamble format associated with the first NPRACH preamble is different than a second preamble format associated with a second NPRACH preamble transmitted using a frequency-division duplex (FDD) frame structure.

19. An apparatus for wireless communication for a user equipment (UE), comprising:

means for receiving information associated with a time-division duplex (TDD) frame structure for narrowband communications;

means for determining a maximum number of symbol groups in a plurality of symbol groups associated with a physical random access channel (NPRACH) preamble that fit in an uplink occasion in the TDD frame structure; and means for transmitting a first subset of the plurality of symbol groups associated with the NPRACH preamble in a first uplink occasion in the TDD frame structure and a second subset of the plurality of symbol groups associated with the NPRACH preamble in a second uplink occasion in the TDD frame structure, wherein the first subset includes the maximum number of symbol groups, and wherein the second subset includes any remaining symbol groups in the plurality of symbol groups or the maximum number of symbol groups.

20. The apparatus of claim 19, wherein the plurality of symbol groups includes four symbol groups.

21. The apparatus of claim 19, wherein a length of a symbol group is a function of the TDD frame structure.

22. An apparatus for wireless communication for a user equipment (UE), comprising:

means for receiving information associated with a time-division duplex (TDD) frame structure for narrowband communications; and means for determining a first number of symbol groups of a narrowband physical random access channel (NPRACH) preamble to transmit in a first uplink occasion in the TDD frame structure, the first number of symbol groups including either two symbol groups or three symbol groups.

23. The apparatus of claim 22, wherein the first number of symbol groups includes the two symbol groups, the method further comprising:

means for transmitting a first symbol group of the two symbol groups in a first tone in the first uplink occasion and a second symbol group of the two symbol groups in a second tone in the first uplink occasion, a distance between the first tone and the second tone being either one tone or six tones.

24. The apparatus of claim 22, wherein the first number of symbol groups includes the three symbol groups, the method further comprising:

means for transmitting a first symbol group of the three symbol groups in a first tone of the first uplink occasion, a second symbol group of the three symbol groups in a second tone of the first uplink occasion, and a third symbol group of the three symbol groups in a third tone of the first uplink occasion, a first distance between tones used for at least one pair of the symbol groups is one tone, and a second distance between tones used for another pair of the symbol groups is six tone.

25. The apparatus of claim 24, further comprising:

means for transmitting a fourth symbol group in a fourth tone in a second uplink occasion subsequent to the first uplink occasion, a third distance between the third tone and the fourth tone being one tone.

26. An apparatus for wireless communication for a user equipment (UE), comprising:

means for receiving information associated with a time-division duplex (TDD) frame structure for narrowband communications;

means for determining a hopping pattern associated with two pairs of symbol groups of a narrowband physical random access channel (NPRACH) transmitted in one or more uplink occasions using the TDD frame structure; and means for transmitting a first pair of symbol groups and a second pair of symbol groups in a same uplink occasion or in adjacent uplink occasions in the TDD frame structure,
wherein a first subcarrier spacing associated with the first pair of symbol groups is a single subcarrier, and
wherein a second subcarrier spacing associated with the second pair of symbol groups is six subcarriers.

27. An apparatus for wireless communication for a user equipment (UE), comprising:
a memory; and
at least one processor coupled to the memory and configured to:
receive information associated with a time-division duplex (TDD) frame structure for narrowband communications; and
transmit a first symbol group of a first narrowband physical random access channel (NPRACH) preamble to a base station, a first length of the first symbol group being associated with the TDD frame structure;
wherein the first length of the first symbol group is shorter than a second length of a second symbol group of a second NPRACH preamble transmitted using a frequency-division duplex (FDD) frame structure.

28. The apparatus of claim 27, wherein the first length of the first symbol group is selected such that N symbol groups can be transmitted on N subframes.

29. The apparatus of claim 27, wherein the first length of the first symbol group is associated with one or more uplink durations of the TDD frame structure.

30. An apparatus for wireless communication for a user equipment (UE), comprising:
a memory; and
at least one processor coupled to the memory and configured to:
receive information associated with a time-division duplex (TDD) frame structure for narrowband communications; and
transmit a first symbol group of a first narrowband physical random access channel (NPRACH) preamble to a base station, a first length of the first symbol group being associated with the TDD frame structure;
wherein the first length of the first symbol group is longer than a second length of a second symbol group of a second NPRACH preamble transmitted using a frequency-division duplex (FDD) frame structure.

31. An apparatus for wireless communication for a user equipment (UE), comprising:
a memory; and
at least one processor coupled to the memory and configured to:
receive information associated with a time-division duplex (TDD) frame structure for narrowband communications; and
transmit a first symbol group of a first narrowband physical random access channel (NPRACH) preamble to a base station, a first length of the first symbol group being associated with the TDD frame structure;
wherein a first preamble format associated with the first NPRACH preamble is different than a second preamble format associated with a second NPRACH preamble transmitted using a frequency-division duplex (FDD) frame structure.

32. An apparatus for wireless communication for a user equipment (UE), comprising:
a memory; and
at least one processor coupled to the memory and configured to:
receive information associated with a time-division duplex (TDD) frame structure for narrowband communications;
determine a maximum number of symbol groups in a plurality of symbol groups associated with a narrowband physical random access channel (NPRACH) preamble that fit in an uplink occasion in the TDD frame structure; and
transmit a first subset of the plurality of symbol groups associated with the NPRACH preamble in a first uplink occasion in the TDD frame structure and a second subset of the plurality of symbol groups associated with the NPRACH preamble in a second uplink occasion in the TDD frame structure,
wherein the first subset includes the maximum number of symbol groups, and
wherein the second subset includes any remaining symbol groups in the plurality of symbol groups or the maximum number of symbol groups.

33. The apparatus of claim 32, wherein the plurality of symbol groups includes four symbol groups.

34. The apparatus of claim 32, wherein a length of a symbol group is a function of the TDD frame structure.

35. An apparatus for wireless communication for a user equipment (UE), comprising:
a memory; and
at least one processor coupled to the memory and configured to:
receive information associated with a time-division duplex (TDD) frame structure for communications; and
determine a first number of symbol groups of a narrowband physical random access channel (NPRACH) preamble to transmit in a first uplink occasion in the TDD frame structure, the first number of symbol groups including either two symbol groups or three symbol groups.

36. The apparatus of claim 35, wherein the first number of symbol groups includes the two symbol groups, the at least one processor is further configured to:
transmit a first symbol group of the two symbol groups in a first tone in the first uplink occasion and a second symbol group of the two symbol groups in a second tone in the first uplink occasion, a distance between the first tone and the second tone being either one tone or six tones.

37. The apparatus of claim 35, wherein the first number of symbol groups includes the three symbol groups, the at least one processor is further configured to:
transmit a first symbol group of the three symbol groups in a first tone of the first uplink occasion, a second symbol group of the three symbol groups in a second tone of the first uplink occasion, and a third symbol group of the three symbol groups in a third tone of the first uplink occasion, a first distance between tones used for at least one pair of the symbol groups is one tone, and a second distance between tones used for another pair of the symbol groups is six tones.

38. The apparatus of claim 37, wherein the at least one processor is further configured to:

transmit a fourth symbol group in a fourth tone in a second uplink occasion subsequent to the first uplink occasion, a third distance between the third tone and the fourth tone being one tone.

39. An apparatus for wireless communication for a user equipment (UE), comprising:
a memory; and
at least one processor coupled to the memory and configured to:
receive information associated with a time-division duplex (TDD) frame structure for narrowband communications;
determine a hopping pattern associated with two pairs of symbol groups of a narrowband physical random access channel (NPRACH) transmitted in one or more uplink occasions using the TDD frame structure; and
transmit a first pair of symbol groups and a second pair of symbol groups in a same uplink occasion or in adjacent uplink occasions in the TDD frame structure,
wherein a first subcarrier spacing associated with the first pair of symbol groups is a single subcarrier, and
wherein a second subcarrier spacing associated with the second pair of symbol groups is six subcarriers.

40. A non-transitory computer-readable medium storing computer executable code for a user equipment (UE), comprising code to:
receive information associated with a time-division duplex (TDD) frame structure for narrowband communications; and
transmit a first symbol group of a first narrowband physical random access channel (NPRACH) preamble to a base station, a first length of the first symbol group being associated with the TDD frame structure;
wherein the first length of the first symbol group is shorter than a second length of a second symbol group of a second NPRACH preamble transmitted using a frequency-division duplex (FDD) frame structure.

41. The non-transitory computer-readable medium of claim 40, wherein the first length of the first symbol group is selected such that N symbol groups can be transmitted on N subframes.

42. The non-transitory computer-readable medium of claim 40, wherein the first length of the first symbol group is associated with one or more uplink durations of the TDD frame structure.

43. A non-transitory computer-readable medium storing computer executable code for a user equipment (UE), comprising code to:
receive information associated with a time-division duplex (TDD) frame structure for narrowband communications; and
transmit a first symbol group of a first narrowband physical random access channel (NPRACH) preamble to a base station, a first length of the first symbol group being associated with the TDD frame structure;
wherein the first length of the first symbol group is longer than a second length of a second symbol group of a second NPRACH preamble transmitted using a frequency-division duplex (FDD) frame structure.

44. A non-transitory computer-readable medium storing computer executable code for a user equipment (UE), comprising code to:
receive information associated with a time-division duplex (TDD) frame structure for narrowband communications; and transmit a first symbol group of a first narrowband physical random access channel (NPRACH) preamble to a base station, a first length of the first symbol group being associated with the TDD frame structure;
wherein a first preamble format associated with the first NPRACH preamble is different than a second preamble format associated with a second NPRACH preamble transmitted using a frequency-division duplex (FDD) frame structure.

45. A non-transitory computer-readable medium storing computer executable code for a user equipment (UE), comprising code to:
receive information associated with a time-division duplex (TDD) frame structure for narrowband communications;
determine a maximum number of symbol groups in a plurality of symbol groups associated with a narrowband physical random access channel (NPRACH) preamble that fit in an uplink occasion in the TDD frame structure; and
transmit a first subset of the plurality of symbol groups associated with the NPRACH preamble in a first uplink occasion in the TDD frame structure and a second subset of the plurality of symbol groups associated with the NPRACH preamble in a second uplink occasion in the TDD frame structure,
wherein the first subset includes the maximum number of symbol groups, and
wherein the second subset includes any remaining symbol groups in the plurality of symbol groups or the maximum number of symbol groups.

46. The non-transitory computer-readable medium of claim 45, wherein the plurality of symbol groups includes four symbol groups.

47. The non-transitory computer-readable medium of claim 45, wherein a length of a symbol group is a function of the TDD frame structure.

48. A non-transitory computer-readable medium storing computer executable code for a user equipment (UE), comprising code to:
receive information associated with a time-division duplex (TDD) frame structure for narrowband communications; and
determine a first number of symbol groups of a narrowband physical random access channel (NPRACH) preamble to transmit in a first uplink occasion in the TDD frame structure, the first number of symbol groups including either two symbol groups or three symbol groups.

49. The non-transitory computer-readable medium of claim 48, wherein the first number of symbol groups includes the two symbol groups, and wherein the code is further configured to:
transmit a first symbol group of the two symbol groups in a first tone in the first uplink occasion and a second symbol group of the two symbol groups in a second tone in the first uplink occasion, a distance between the first tone and the second tone being either one tone or six tones.

50. The non-transitory computer-readable medium of claim 48, wherein the first number of symbol groups includes the three symbol groups, wherein the code is further configured to:
transmit a first symbol group of the three symbol groups in a first tone of the first uplink occasion, a second symbol group of the three symbol groups in a second tone of the first uplink occasion, and a third symbol group of the three symbol groups in a third tone of the first uplink occasion, a first distance between tones used for at least one pair of the symbol groups is one tone, and a second distance between tones used for another pair of the symbol groups is six tones.

51. The non-transitory computer-readable medium of claim 50, wherein the code is further configured to:
   transmit a fourth symbol group in a fourth tone in a second uplink occasion subsequent to the first uplink occasion, a third distance between the third tone and the fourth tone being one tone.

52. A non-transitory computer-readable medium storing computer executable code for a user equipment (UE), comprising code to:
   receive information associated with a time-division duplex (TDD) frame structure for narrowband communications;
   determine a hopping pattern associated with two pairs of symbol groups of a narrowband physical random access channel (NPRACH) transmitted in one or more uplink occasions using the TDD frame structure; and
   transmit a first pair of symbol groups and a second pair of symbol groups in a same uplink occasion or in adjacent uplink occasions in the TDD frame structure,
   wherein a first subcarrier spacing associated with the first pair of symbol groups is a single subcarrier, and
   wherein a second subcarrier spacing associated with the second pair of symbol groups is six subcarriers.

* * * * *